US012581564B2

(12) United States Patent
Tseng et al.

(10) Patent No.: US 12,581,564 B2
(45) Date of Patent: Mar. 17, 2026

(54) METHODS AND APPARATUS FOR PARTIAL SENSING UNDER SIDELINK DISCONTINUOUS RECEPTION MECHANISMS

(71) Applicant: SHARP KABUSHIKI KAISHA, Sakai City (JP)

(72) Inventors: Yung-Lan Tseng, Taipei (TW); Chia-Hao Yu, Taipei (TW); Hung-Chen Chen, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 744 days.

(21) Appl. No.: 17/727,005

(22) Filed: Apr. 22, 2022

(65) Prior Publication Data

US 2022/0346180 A1 Oct. 27, 2022

Related U.S. Application Data

(60) Provisional application No. 63/178,458, filed on Apr. 22, 2021.

(51) Int. Cl.
*H04W 76/28* (2018.01)
*H04W 72/20* (2023.01)
*H04W 74/0808* (2024.01)

(52) U.S. Cl.
CPC ........... *H04W 76/28* (2018.02); *H04W 72/20* (2023.01); *H04W 74/0808* (2013.01)

(58) Field of Classification Search
CPC .................................................. H04W 76/28
See application file for complete search history.

(56) References Cited

U.S. PATENT DOCUMENTS

| | | | |
|---|---|---|---|
| 2020/0053699 A1* | 2/2020 | Chen ...................... | H04W 72/02 |
| 2022/0225408 A1* | 7/2022 | Lee .......................... | H04W 4/40 |
| 2023/0066448 A1* | 3/2023 | Tseng ..................... | H04W 72/20 |
| 2023/0189152 A1* | 6/2023 | Liu ................... | H04W 52/0232 |
| | | | 370/311 |

(Continued)

FOREIGN PATENT DOCUMENTS

WO 2021/147959 A1 7/2021

OTHER PUBLICATIONS

LG Electronics: "Discussion on resource allocation for power saving", 3GPP Draft; R1-2103378 (Apr. 7, 2021), chapters 1-3.

(Continued)

*Primary Examiner* — Jason E Mattis
(74) *Attorney, Agent, or Firm* — ScienBiziP, P.C.

(57) ABSTRACT

A method performed by a user equipment (UE) is provided. In the method, one or more first resource pool configurations for one or more sidelink transmission resource pools are received. Each first resource pool configuration includes a partial sensing indication of whether to perform partial sensing on a corresponding sidelink transmission resource pool in a Sidelink Discontinuous Reception (SL-DRX) inactive time. The SL-DRX inactive time is determined based on a set of SL-DRX configurations stored in the UE. In the method, the partial sensing is performed, based on the partial sensing indication of each first resource pool configuration, on the corresponding sidelink transmission resource pool while the UE is implementing sidelink packet transmission.

18 Claims, 14 Drawing Sheets

S1101 — Receive one or more first resource pool configurations for one or more sidelink transmission resource pools, where each first resource pool configuration includes a partial sensing indication of whether to perform partial sensing on a corresponding sidelink transmission resource pool in a Sidelink Discontinuous Reception (SL-DRX) inactive time S1103 — perform the partial sensing based on the one or more partial sensing indications in the one or more first resource pool configurations while the UE is implementing sidelink packet transmission

(56) References Cited

U.S. PATENT DOCUMENTS

| | | | | |
|---|---|---|---|---|
| 2023/0284136 A1* | 9/2023 | Ganesan | ............... | H04W 76/28 370/311 |
| 2023/0362896 A1* | 11/2023 | Wu | ........................ | H04W 72/02 |
| 2024/0163963 A1* | 5/2024 | Han | ........................ | H04W 76/28 |
| 2024/0172321 A1* | 5/2024 | Wang | ................ | H04W 74/0808 |
| 2024/0214940 A1* | 6/2024 | Zhang | ............... | H04W 52/0229 |

OTHER PUBLICATIONS

3GPP TS 38.321, "3rd Generation Partnership Project; Technical Specification Group Radio Access Network; NR; Medium Access Control (MAC) protocol specification (Release 16)", V16.4.0 (Mar. 2021).

3GPP TS 38.213, "3rd Generation Partnership Project; Technical Specification Group Radio Access Network; NR; Physical layer procedures for control (Release 16)", V16.5.0 (Mar. 2021).

3GPP TS 38.214, "3rd Generation Partnership Project; Technical Specification Group Radio Access Network; NR; Physical layer procedures for data (Release 16)", V16.5.0 (Mar. 2021).

3GPP TS 38.331, "3rd Generation Partnership Project; Technical Specification Group Radio Access Network; NR; Radio Resource Control (RRC) protocol specification (Release 16)", V16.3.1 (Jan. 2021).

"3rd Generation Partnership Project ; Technical Specification Group Radio Access Network; NR; Radio Resource Control (RRC) protocol specification (Release 17)", 3GPP TS 38.331, V17.0.0 (Apr. 19, 2022), pp. 367-393, 411-412, 462-463, 993-1037, 1001-1003, 1114-1115, 1022-1024, 1034-1037, 1077, chapters 5.3.5, 5.3.7, 5.3.3, 5.4.2, 5.3.13, 5.2.

"3rd Generation Partnership Project ; Technical Specification Group Radio Access Network; NR; Physical layer procedures for data (Release 17)", 3GPP TS 38.214, V17.1.0 (Apr. 8, 2022), chapter 8.1.4.

"3rd Generation Partnership Project ; Technical Specification Group Radio Access Network; NR; Physical layer measurements (Release 17)", 3GPP TS 38.215, V17.1.0 (Apr. 1, 2022), chapter 5.1.27.

OPPO: "Power saving mechanisms in NR sidelink", 3GPP Draft; R1-2100141 (Jan. 19, 2021), chapters 1-2, 4.

Catt et al: "Discussion on resource allocation for power saving", 3GPP Draft; R1-2102606 (Apr. 7, 2021), chapters 1-4.

NEC: "Discussion on resource allocation for power saving", 3GPP Draft; R1-2103517 (Apr. 7, 2021), chapters 1-3.

APPLE: "Discussion on Sidelink Resource Allocation for Power Saving", 3GPP Draft; R1-2103121 (Apr. 7, 2021), chapters 1-3.

* cited by examiner

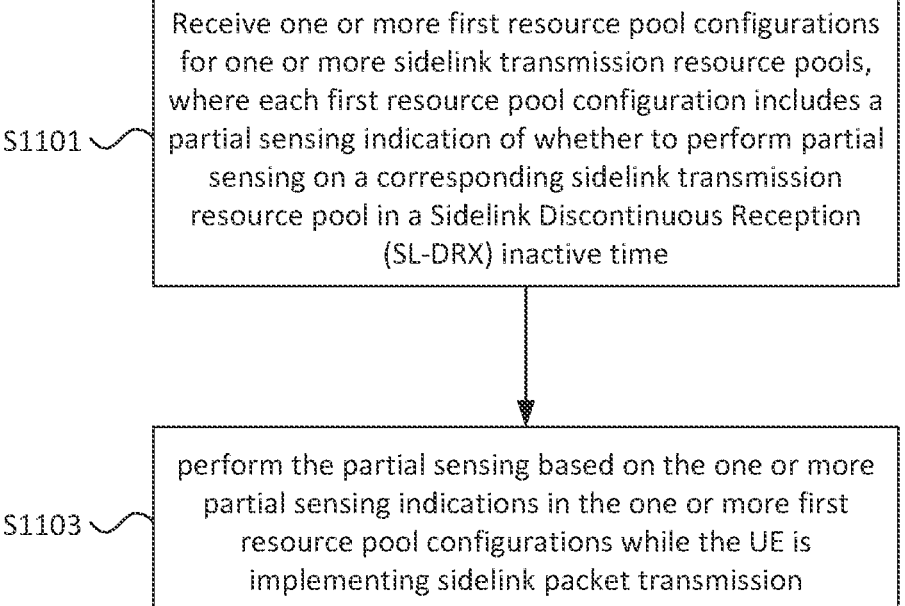

S1101

Receive one or more first resource pool configurations for one or more sidelink transmission resource pools, where each first resource pool configuration includes a partial sensing indication of whether to perform partial sensing on a corresponding sidelink transmission resource pool in a Sidelink Discontinuous Reception (SL-DRX) inactive time

S1103 perform the partial sensing based on the one or more partial sensing indications in the one or more first resource pool configurations while the UE is implementing sidelink packet transmission

FIG. 11

METHODS AND APPARATUS FOR PARTIAL SENSING UNDER SIDELINK DISCONTINUOUS RECEPTION MECHANISMS

CROSS-REFERENCE TO RELATED APPLICATION

The present application claims the benefit of and priority to U.S. Provisional Patent Application Ser. No. 63/178,458, filed on Apr. 22, 2021, entitled "SIDELINK DISCONTINUOUS RECEPTION CONTROL MECHANISMS," the content of which is hereby fully incorporated herein by reference for all purposes.

FIELD

The present disclosure generally relates to wireless communications and, more specifically, to methods for partial sensing under sidelink discontinuous reception (SL-DRX) mechanisms, and to user equipment (UE) configured to use such methods.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for next-generation wireless communication systems.

SUMMARY

The present disclosure is directed to a method for partial sensing under sidelink discontinuous reception (SL-DRX) mechanisms, and to user equipment (UE) configured to use the method.

In a first aspect of the present disclosure, a method performed by a UE is provided. The method includes: receiving one or more first resource pool configurations for one or more sidelink (SL) transmission resource pools, each first resource pool configuration comprising a partial sensing indication of whether to perform partial sensing on a corresponding SL transmission resource pool in an SL-DRX inactive time, the SL-DRX inactive time being determined based on a set of SL-DRX configurations stored in the UE; and performing, based on the partial sensing indication of each first resource pool configuration, the partial sensing on the corresponding SL transmission resource pool while the UE is implementing SL packet transmission.

In an implementation of the first aspect, performing, based on the partial sensing indication of each first resource pool configuration, the partial sensing on the corresponding SL transmission resource pool comprises: in the SL-DRX inactive time, not performing the partial sensing on the SL transmission resource pool that corresponds to the partial sensing indication of not performing the partial sensing in the SL-DRX inactive time.

In another implementation of the first aspect, performing, based on the partial sensing indication of each first resource pool configuration, the partial sensing on the corresponding SL transmission resource pool further comprises: in the SL-DRX inactive time, performing the partial sensing on the SL transmission resource pool that corresponds to the partial sensing indication of performing the partial sensing in the SL-DRX inactive time.

In another implementation of the first aspect, performing, based on the partial sensing indication of each first resource pool configuration, the partial sensing on the corresponding SL transmission resource pool comprises performing SL packet reception of Physical Sidelink Control Channels (PSCCHs) and Sidelink Reference Signal Received Power (SL-RSRP) measurement associated with the corresponding SL transmission resource pool.

In another implementation of the first aspect, each SL transmission resource pool is a SL normal transmission resource pool or a SL exceptional transmission resource pool.

In another implementation of the first aspect, the method further includes: receiving a second resource pool configuration for a specific SL transmission resource pool of the one or more SL transmission resource pools after receiving the one or more first resource pool configurations; and in a case that the second resource pool configuration is absent of the partial sensing indication and the specific SL transmission resource pool corresponds to one of the first resource pool configuration that comprises the partial sensing indication of not performing the partial sensing, restarting to perform the partial sensing on the specific SL transmission resource pool in the SL-DRX inactive time.

In another implementation of the first aspect, the method further includes: determining whether the UE is in the SL-DRX inactive time based on one or more activated SL-DRX configurations in the set of SL-DRX configurations. The one or more activated SL-DRX configurations in the set of SL-DRX configurations are associated with a Layer-2 Destination ID stored in the UE.

In another implementation of the first aspect, each first resource pool configuration is received from a first source of an SL pre-configuration, an SL configuration from a first serving cell through a first Uu interface via broadcasting system information or UE-specific dedicated control signaling, or an SL configuration from another UE via a PC5 air interface through Radio Resource Control (RRC) signaling. The method further comprises receiving the set of SL-DRX configurations from a second source of: an SL pre-configuration, an SL configuration from a second serving cell through a second Uu interface via broadcasting system information or UE-specific dedicated control signaling, or an SL configuration from another UE via a PC5 air interface through RRC signaling. The first source and the second source are independent.

In another implementation of the first aspect, the first serving cell is an Evolved Universal Terrestrial Radio Access (E-UTRA) cell or a New Radio (NR) cell, the second serving cell is an E-UTRA cell or an NR cell, the first Uu interface is an E-UTRA Uu interface or an NR Uu interface, and the second Uu interface is an E-UTRA Uu interface or an NR Uu interface. The first serving cell and the second serving cell are independent.

In a second aspect of the present disclosure, a UE is provided. The UE includes processing circuitry, a transceiver coupled to the processing circuitry and a memory coupled to the processing circuitry. The memory stores at least one computer-executable instructions that, when executed by the processing circuitry, causes the UE to receive, using the transceiver, one or more first resource pool configurations for one or more SL transmission resource pools, each first resource pool configuration comprising a partial sensing indication of whether to perform partial sensing on a corresponding SL transmission resource pool in an SL-DRX inactive time, the SL-DRX inactive time being determined based on a set of SL-DRX configurations stored in the memory; and perform, based on the partial sensing indication of each first resource pool configuration, the partial sensing on the corresponding SL transmission resource pool while the UE is implementing SL packet transmission.

In an implementation of the second aspect, the UE performing, based on the partial sensing indication of each first resource pool configuration, the partial sensing on the corresponding SL transmission resource pool comprises: in the SL-DRX inactive time, not performing the partial sensing on the SL transmission resource pool that corresponds to the partial sensing indication of not performing the partial sensing in the SL-DRX inactive time.

In another implementation of the second aspect, the UE performing, based on the partial sensing indication of each first resource pool configuration, the partial sensing on the corresponding SL transmission resource pool further comprises: in the SL-DRX inactive time, performing the partial sensing on the SL transmission resource pool that corresponds to the partial sensing indication of performing the partial sensing in the SL-DRX inactive time.

In another implementation of the second aspect, the UE performing, based on the partial sensing indication of each first resource pool configuration, the partial sensing on the corresponding SL transmission resource pool comprises performing SL packet reception of Physical Sidelink Control Channels (PSCCHs), Physical Sidelink Shared Channels (PSSCHs), and Sidelink Reference Signal Received Power (SL-RSRP) measurement associated with the corresponding SL transmission resource pool.

In another implementation of the second aspect, each SL transmission resource pool is a SL normal transmission resource pool or a SL exceptional transmission resource pool.

In another implementation of the second aspect, the computer-executable instructions, when executed by the processing circuitry, further cause the UE to: receive, using the transceiver, a second resource pool configuration for a specific SL transmission resource pool of the one or more SL transmission resource pools after receiving the one or more first resource pool configurations; and in a case that the second resource pool configuration is absent of the partial sensing indication and the specific SL transmission resource pool corresponds to one of the first resource pool configuration that comprises the partial sensing indication of not performing the partial sensing, restart to perform the partial sensing on the specific SL transmission resource pool in the SL-DRX inactive time.

In another implementation of the second aspect, the computer-executable instructions, when executed by the processing circuitry, further cause the UE to: determine whether the UE is in the SL-DRX inactive time based on one or more activated SL-DRX configurations in the set of SL-DRX configurations. The one or more activated SL- DRX configurations in the set of SL-DRX configurations are associated with a Layer-2 Destination ID stored in the memory.

In another implementation of the second aspect, each first resource pool configuration is received from a first source of an SL pre-configuration, an SL configuration from a first serving cell through a first Uu interface via broadcasting system information or UE-specific dedicated control signaling, or an SL configuration from another UE via a PC5 air interface through Radio Resource Control (RRC) signaling. The computer-executable instructions, when executed by the processing circuitry, further cause the UE to receive the set of SL-DRX configurations from a second source of: an SL pre-configuration, an SL configuration from a second serving cell through a second Uu interface via broadcasting system information or UE-specific dedicated control signaling, or an SL configuration from another UE via a PC5 air interface through RRC signaling. The first source and the second source are independent.

In another implementation of the second aspect, the first serving cell is an Evolved Universal Terrestrial Radio Access (E-UTRA) cell or a New Radio (NR) cell, the second serving cell is an E-UTRA cell or an NR cell, the first Uu interface is an E-UTRA Uu interface or an NR Uu interface, and the second Uu interface is an E-UTRA Uu interface or an NR Uu interface. The first serving cell and the second serving cell are independent.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

FIG. 11 is a flowchart illustrating a method of partial sensing under an SL-DRX mechanism according to an example implementation of the present disclosure.

DESCRIPTION

Figure 1:
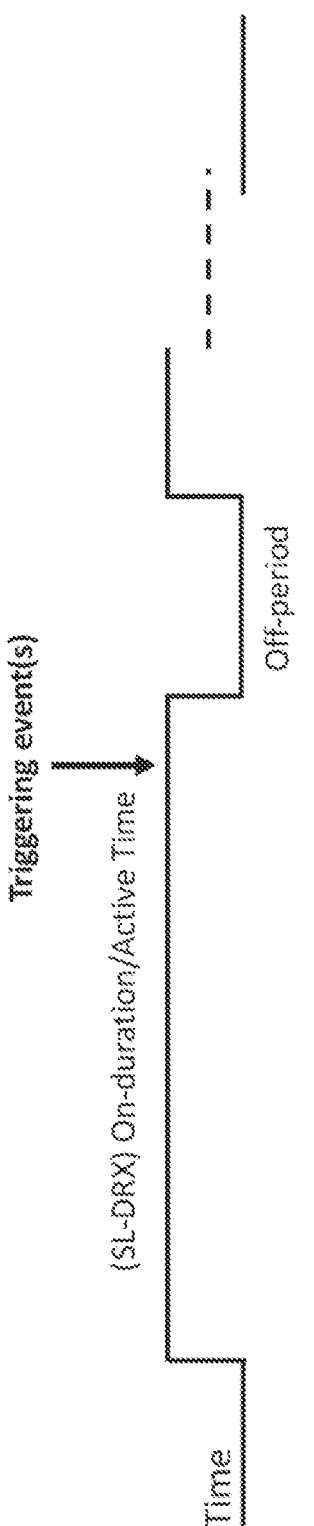
FIG. 1 is a timing diagram illustrating an occurrence of a triggering event according to an example implementation of the present disclosure.

Some of the terms mentioned in the present disclosure are defined as follows. Unless otherwise specified, the terms in the present disclosure have the following meanings.

| Abbreviation | Full name |
| --- | --- |
| BA | Bandwidth Adaptation |
| BSR | Buffer Status Report |
| BWP | Bandwidth Part |
| CA | Carrier Aggregation |
| CCCH | Common Control Channel |
| CE | Control Element |
| CH | Channel |
| CORESET | Control Resource Set |
| CSI | Channel State Information |
| CSS | Common Search Space |
| DCI | Downlink Control Information |
| DCP | DCI with CRC scrambled by PS-RNTI |
| DL | Downlink |
| DRX | Discontinuous Reception |
| ID | Identification |
| LBT | Listen Before Talk |
| LSB | Least Significant Bit |
| MAC | Medium Access Control |
| MAC CE | MAC Control Element |
| MCG | Master Cell Group |
| MIMO | Multi-In Multi-Out |
| MSB | Most Significant Bit |
| NR-U | New Radio Unlicensed |
| NW | Network |
| PDCCH | Physical Downlink Control Channel |
| PDSCH | Physical Downlink Shared Channel |
| PHR | Power Headroom Report |
| PUCCH | Physical Uplink Control Channel |
| PUSCH | Physical Uplink Shared Channel |
| RAR | Random Access Response |
| Rel | Release |
| RRC | Radio Resource Control |
| RRM | Radio Resource Management |
| SCS | Subcarrier Spacing |
| SL | Sidelink |
| SPS | Semi-Persistent Scheduling |
| SR | Scheduling Request |
| SS | Search Space |
| SSSG | Search Space Set Group |
| UE | User Equipment |
| UL | Uplink |
| USS | UE-specific search space |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the example implementations disclosed are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaptation may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

Sidelink Discontinuous Reception (SL-DRX) Mechanisms

To enhance the power-saving gain on the PC5 interface, UEs may be configured with a timer-based SL-DRX mechanism to allow a UE (e.g., Tx UE/Rx UE in PC5 interface) to stop monitoring the Physical Sidelink Control CHannel (PSCCH) and the Physical Sidelink Shared Channel (PSSCH), which may include the first stage Sidelink Control Information (SCI) (e.g., in the PSCCH) and/or the following second stage SCI(s) (e.g., in the PSSCH). In addition, the timer-based SL-DRX mechanism may be applied to a sidelink unicast group (e.g., based on the PC5 RRC signaling exchange between UEs), sidelink group-cast/multi-cast group, and sidelink broadcast group. In this disclosure, various embodiments based on sidelink group-cast/broadcast service on NR protocols are provided. It is noted that the proposed mechanisms would not be limited by the sidelink cast types or the Layer-2 protocols (e.g., NR protocols/E-UTRA protocols).

In some implementations, a UE may obtain an SL-DRX configuration through one of the following approaches:

1) Based on sidelink pre-configuration. In some implementations, the UE may obtain sidelink pre-configuration from its Universal Mobile Telecommunications System Subscriber Identity Module (USIM) or memory module.

2) Based on the sidelink System Information Block (SIB), such as SystemInformationBlockType12 (SIB12)/SystemInformationBlockType13 (SIB13) in NR protocols, broadcast by the serving cell (e.g., while the UE wants to implement NR sidelink service on the serving frequency carrier or other sidelink frequency carrier(s)) (e.g., in a non-serving frequency to the UE). Based on the sidelink SIB (e.g., SIB12/SIB13) broadcast in a non-serving sidelink frequency carrier while the UE is implementing sidelink cell (re)selection procedure on the target sidelink frequency carrier.

3) Based on UE-specific dedicated control signaling (e.g., RRC signaling of (LTE/NR) Uu interface) from its serving cell (e.g., special cell, such as PCell or PSCell) or serving base station (e.g., eNB, gNB, or NG eNB) to the UE.

4) Based on the PC5 RRC signaling exchange between UEs (e.g., between UEs within a sidelink unicast group).

5) Based on the sidelink broadcasting control signaling exchange between UEs (e.g., sidelink Master Information Block (MIB), PC5-S signaling or other control signaling).

However, it also means that UE may need to update (or re-configure, reset, release) the stored sidelink DRX configuration and/or apply a new SL-DRX configuration from one of the sources above while one or more triggering events happen (e.g., UE implements a cell (re)selection procedure and needs to update a received SL-SIB from a new camped cell). In addition, while the triggering event (associated with a Layer-2 sidelink destination) happens, the UE may stay in an SL-DRX on-duration (or SL-DRX active time) or an SL-DRX off-period on the (LTE/NR) PC5 interface (associated with a Layer-2 sidelink destination). In this disclosure, UE implementations during SL-DRX operations while one or more triggering events happen are identified. In addition, the triggering events for which the UE needs to update an SL-DRX configuration are also identified.

FIG. 1 is a timing diagram illustrating an occurrence of a triggering event according to an example implementation of the present disclosure.

Referring to FIG. 1, a triggering event may happen in an SL-DRX On-duration/Active Time. In some implementations, the UE may need to update its SL-DRX configuration after the triggering event happen.

In some implementations, the updated SL-DRX configuration may also include the "SL-DRX configuration Absent condition", which is illustrated below:

1) The UE may select a serving cell which does not support SL operation (e.g., serving cell or camped cell (re)selection procedure on the serving frequency carrier/non-serving cell (re)selection procedure while the UE is implementing a sidelink cell (re)selection procedure on a target sidelink frequency carrier).

2) The UE may select a cell which supports SL operation but does not deliver an SL-DRX configuration (e.g., serving cell or camped cell (re)selection procedure on the serving frequency carrier/non-serving cell (re)selection procedure while the UE is implementing sidelink cell (re)selection procedure on a target sidelink frequency carrier). For example, the selected cell may configure SL-DRX timer configurations for SL-unicast service. However, the selected cell may or may not configure SL-DRX timer configurations for SL-multi-cast (groupcast) service/SL-broadcast service, while the last selected cell may configure SL-DRX timer configurations for SL-multi-cast service/SL-broadcast service. In this condition, it is also possible that one explicit indicator is transmitted in the SIB (e.g., SL-SIB or V2X-SIB) or UE-specific dedicated control signaling (e.g., DL RRCReconfiguration message) to 'disable' SL-DRX operation associated with one, a subset, or all L2 Destination ID(s) directly. In some other conditions, the SL-DRX timers (e.g., SL-DRX ondurationTimer or SL-DRX Inactivity Timer) may be absent in the SL-SIB and the UE may release the stored SL-DRX timers while the selected cell does not configure SL-DRX timers (e.g., SL-DRX timers for SL-unicast service/SL-multi-cast service/SL-broadcast services).

3) No SL-DRX configuration is pre-installed in the sidelink pre-configuration stored in the UE side.

4) No SL-DRX configuration is received through (LTE/NR) PC5 (RRC) signaling within a SL unicast group or SL group-cast group.

Therefore, the updated SL-DRX configuration may also include the condition which no SL-DRX configuration is configured, which means that the UE may stop the active SL-DRX operations (associated with one or any combination of SL-DRX configurations stored by the UE). Then, the UE may need to stop the running/active SL-DRX operation associated with at least one L2 Destination ID in (LTE/NR) PC5 interface.

In some implementations, in the (LTE/NR) PC5 interface, the Layer-2 (sidelink) Destination ID may be associated with an SL-unicast group, or an SL-groupcast group, or an SL-broadcast group. In some implementations, an SL-configuration and the running SL-DRX operation configured based on the SL-configuration may be associated with a specific Layer-2 Destination.

In some implementations, an SL-configuration and the running SL-DRX operation configured based on the SL-DRX configuration may be associated with a cast-type. For a UE, all the Layer-2 Destinations of the same sidelink service types (e.g., SL-unicast, SL-groupcast, SL-broadcast service) may be associated with the same SL-DRX configuration and the same SL-DRX operation (e.g., the same SL-DRX Active Time/SL-DRX off-period and the same running SL-DRX timers). In some implementations, the SL-configuration and the running SL-DRX operation configured based on the SL-DRX configuration may be associated with the UE (or the MAC entity of the UE side). Therefore, all the Layer-2 Destinations of the UE may be associated with the same SL-DRX configuration and the same SL-DRX operation (e.g., the same SL-DRX Active Time/SL-DRX off-period and the same running SL-DRX timers).

However, in some implementations, the UE may implement one or more active SL-DRX operations jointly. Then, to the UE side, the UE may decide it is in an (sidelink/SL-DRX) Active Time by jointly considering all of the active SL-DRX operations. For example, the UE is staying in (sidelink/SL-DRX) Active Time while at least one of the active (/activated) SL-DRX operations is staying in SL-DRX Active Time. On the other hand, the UE is staying in (sidelink/SL-DRX) Inactive Time while all of the active (/activated) SL-DRX operations are staying in SL-DRX off-periods. In some implementations, the UE may be the SL-Tx UE (for sidelink packet delivery with/without sidelink HARQ ACK/NACK information transmission) or SL-Rx UE (for sidelink packet reception with/without sidelink HARQ ACK/NACK information transmission).

In some implementations, different sidelink timers may be configured respectively for different sidelink cast types (e.g., different sl-drx-OnDuration(s), sl-DRXInactivityTimer(s), or sl-drx-RetransmissionTimer(s) may be configured for sidelink unicast/groupcast/broadcast services respectively).

Several solutions about how a UE may implement an SL-DRX configuration update while at least one triggering event happens are provided below.

Figures 2A, 2B:
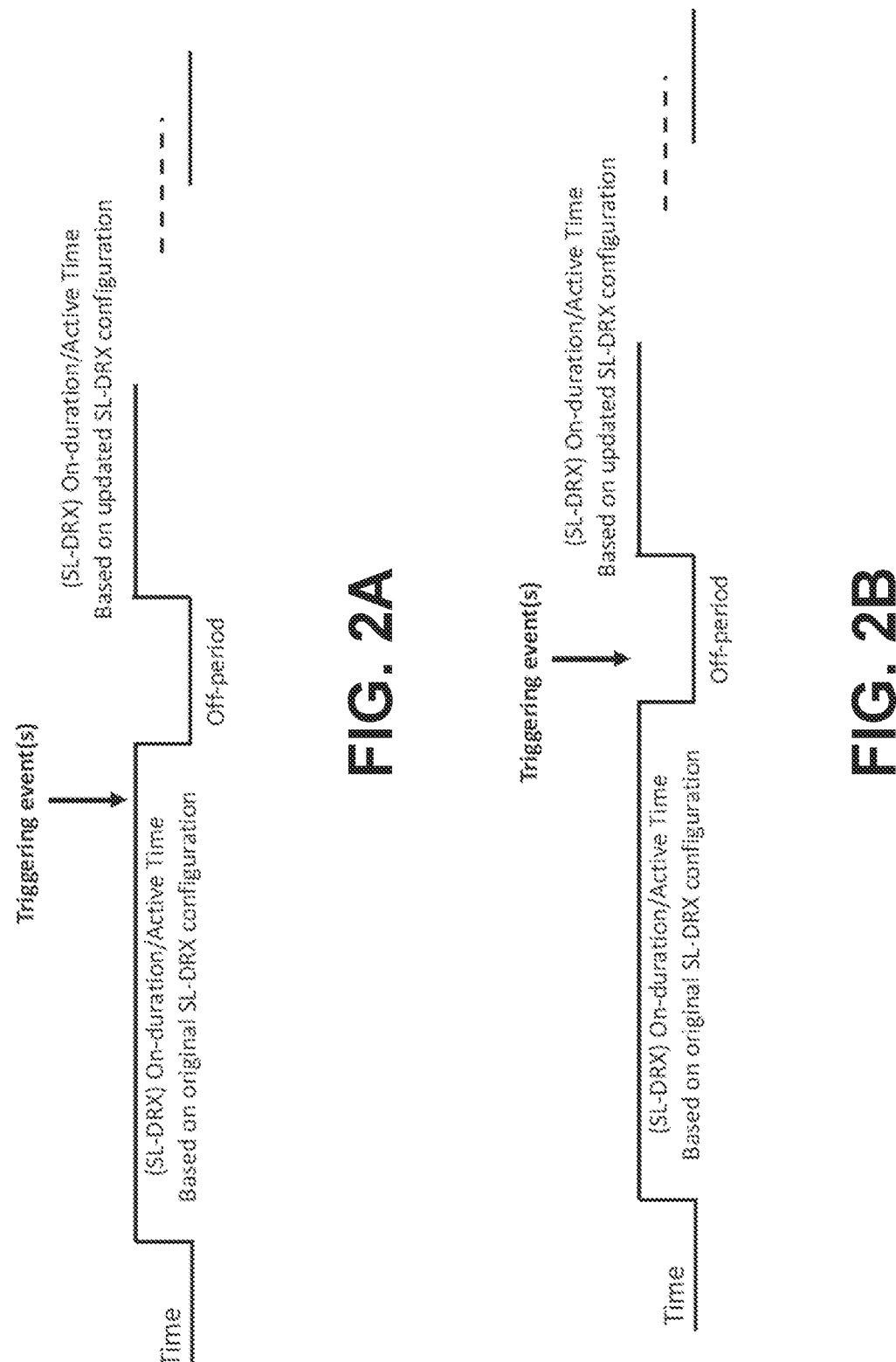
FIG. 2A and FIG. 2B are timing diagrams illustrating a sidelink discontinuous reception (SL-DRX) configuration update according to example implementations of the present disclosure.

FIG. 2A and FIG. 2B are timing diagrams illustrating an SL-DRX configuration update according to example implementations of the present disclosure.

Referring to FIG. 2A, the triggering event happens in SL-DRX On-duration/Active Time.

In some implementations, the SL-DRX mechanism (e.g., SL-DRX configuration for broadcast/group-cast service) may not be impacted immediately by the triggering events. Instead, the SL-DRX mechanism and the UE would update the values of SL-DRX-related Timers after the running active SL-DRX timer(s) (e.g., the SL-drx-onDurationTimer or SL-drx-InactivityTimer, which is counting while the triggering event happens) expires. For example, the associated SL-DRX Timers may be re-configured based on the updated SL-DRX configuration on the next Active Time (or SL-DRX On period/On-duration) in an SL-DRX cycle. In some implementations, the UE may start to apply the updated SL-DRX configuration in the next SL-DRX cycle. In this case, the time span of the off-period may be decided by the original SL-DRX configuration rather than the updated SL-DRX configuration.

Referring to FIG. 2B, the triggering event happens in an SL-DRX off-period.

In some implementations, the triggering event may happen while the UE is staying in SL-DRX off-periods. In this condition, the UE may update the SL-DRX configuration (e.g., the SL-DRX timers associated with the original SL-DRX configuration, such as the running SL-drx-onDuration-Timer or SL-drx-InactivityTimer) upon the UE starting the next SL-DRX cycle (e.g., based on the newly received SL-DRX configuration). In addition, the UE may continue the running SL-DRX cycle based on the stored SL-DRX configuration (which the UE has stored before the triggering event happens, e.g., the stored SL-DRX cycle length). Then, UE may apply the SL-DRX operation in the next SL-DRX cycle. In this case, the timespan of the off-period may be decided by the original SL-DRX configuration rather than the updated SL-DRX configuration.

Figures 3A, 3B:
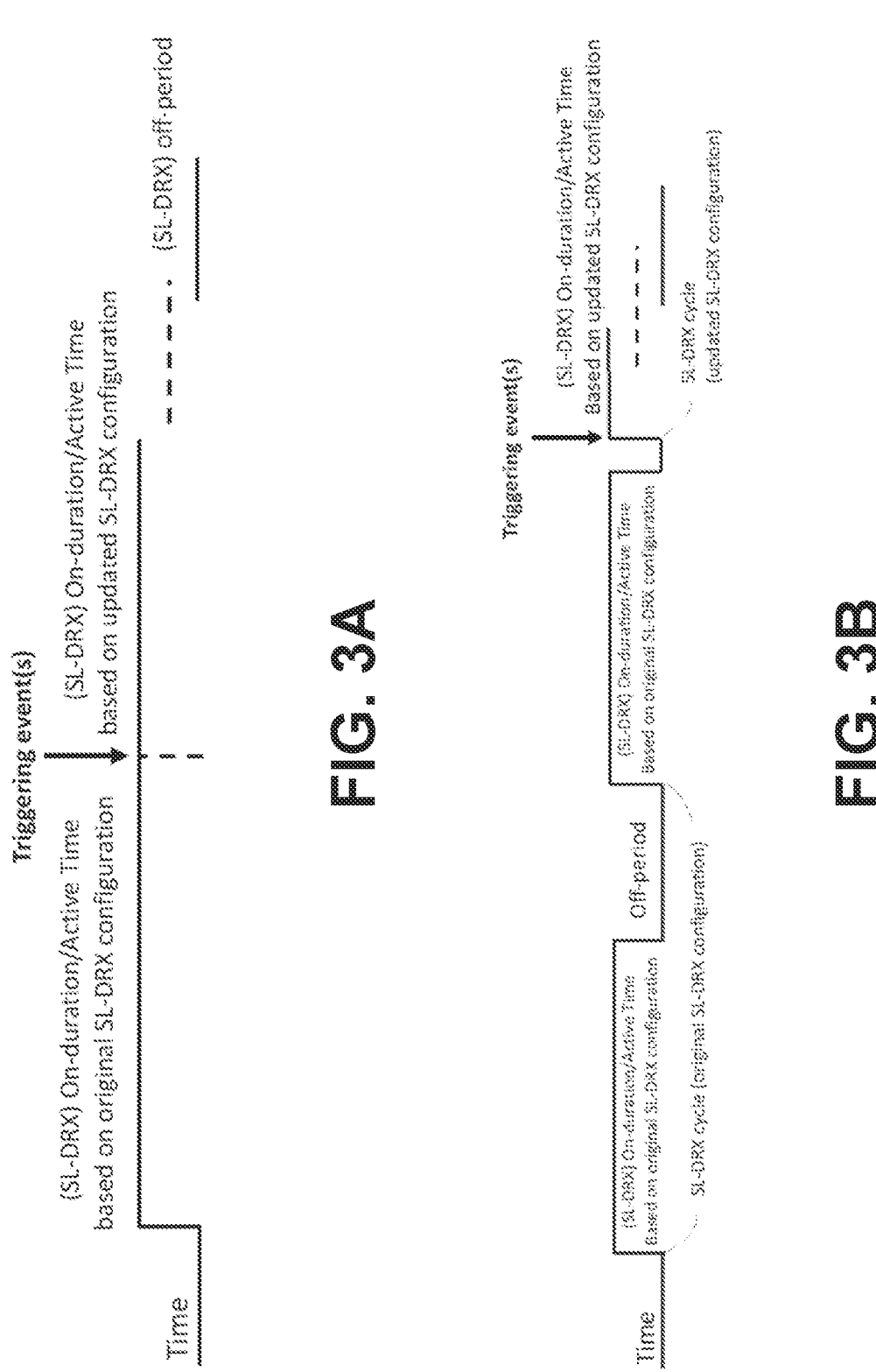
FIG. 3A and FIG. 3B are timing diagrams illustrating an SL-DRX configuration update according to example implementations of the present disclosure.

FIG. 3A and FIG. 3B are timing diagrams illustrating an SL-DRX configuration update according to example implementations of the present disclosure. In some cases, the SL-DRX configuration is immediately updated while the UE is staying in the SL-DRX on-duration/Active Time.

Referring to FIG. 3A, in some implementations, the UE is triggered to implement the SL-DRX configuration while the UE is staying in SL-DRX On-duration/Active Time, and the UE may reset all of the running SL-DRX timers (or a subset of the running SL-DRX timers) based on the new SL-DRX configuration immediately. In this case, the SL-DRX on-duration may be prolonged/extended (for example, the UE may reset and re-count the SL-DRX on-duration timer) while the triggering event happens, as shown in FIG. 3A.

However, it is noted that some SL-DRX timers may be associated with sidelink packet delivery states. Therefore, for such SL-DRX timers, the running SL-DRX timers may be released only while the SL packets have delivered successfully (e.g., while the Tx UE receives an SL-HARQ ACK message from the Rx UE or the Rx UE has decoded one SL transport block successfully), or has reached a (pre-defined) maximum number of (re)transmission limitations, or while an SL-DRX timer(s) associated with active SL-HARQ process(s) (e.g., running drx-HARQ-RTT-TimerSL and/or drx- RetransmissionTimerSL, which may be associated with the SL-HARQ process in the SL-Tx UE side or in the SL Rx UE side) has expired even though the triggering event has already happened. For the SL-packet transmission that happens after the triggering event happens, the UE may set (configure/start) the associated SL-DRX timers based on the updated SL-DRX configuration.

Referring to FIG. 3B, in some implementations, the UE is triggered to implement SL-DRX configuration while the UE is staying in SL-DRX off-period (based on the original SL-DRX configuration) and the UE may re-start a SL packet transmission immediately upon the triggering event occurring. The UE may receive a new SL-DRX configuration (and/or the UE may need to configure an updated SL-DRX configuration which is stored in the UE side) upon one (or more) of the triggering events happening (e.g., serving cell (re)selection procedure for sidelink operation). In addition, as shown in FIG. 3B, the UE may start a new SL-DRX cycle (and also the SL-DRX timers) based on the newly received SL-DRX configuration. This condition may happen to an SL-broadcasting service while the UE re-selects a serving cell (for sidelink operation) on a serving frequency or a non-serving frequency.

Figures 4A, 4B:
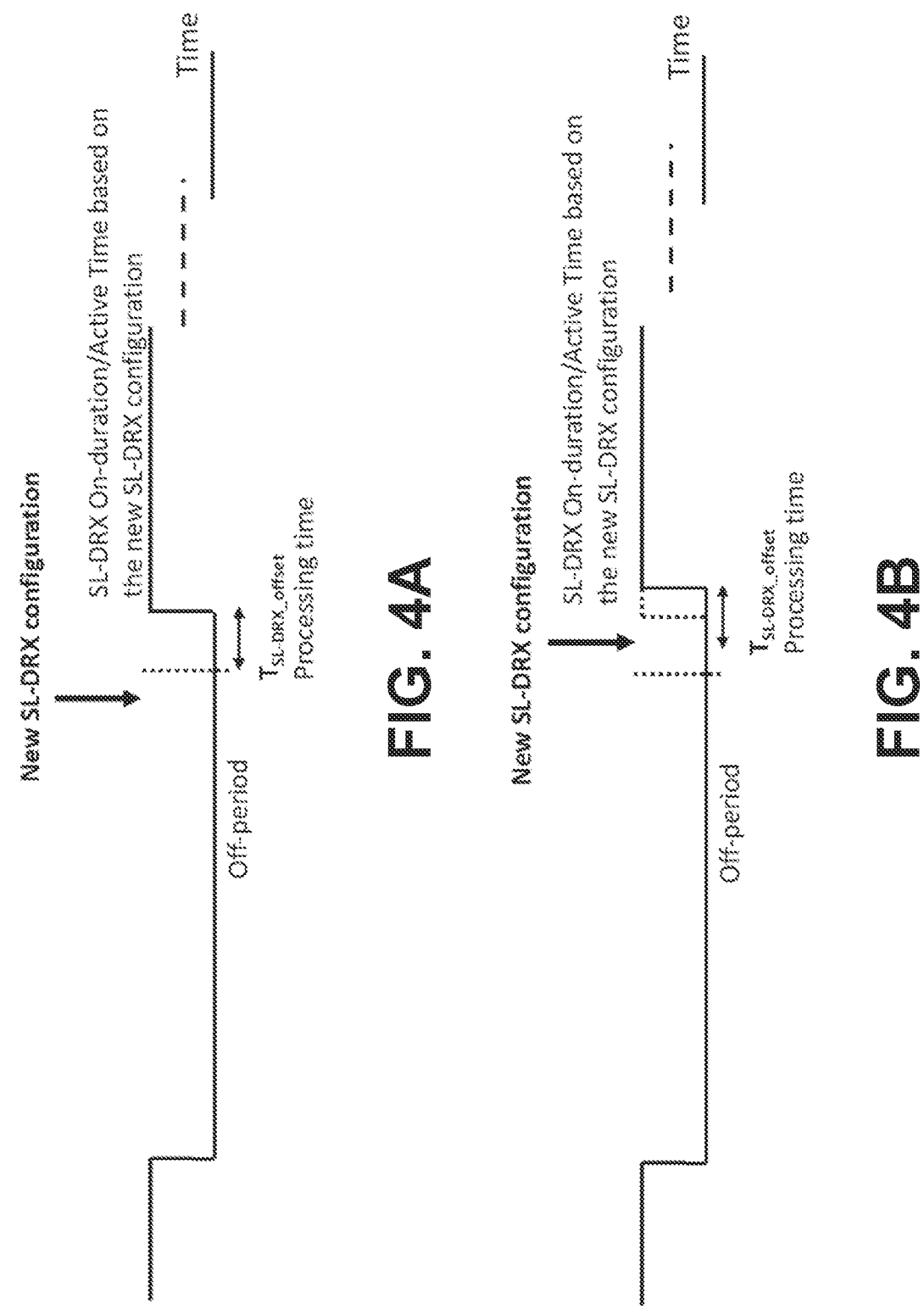
FIG. 4A, FIG. 4B, and FIG. 4C are timing diagrams illustrating an SL-DRX configuration update according to example implementations of the present disclosure.
Figure 4C:
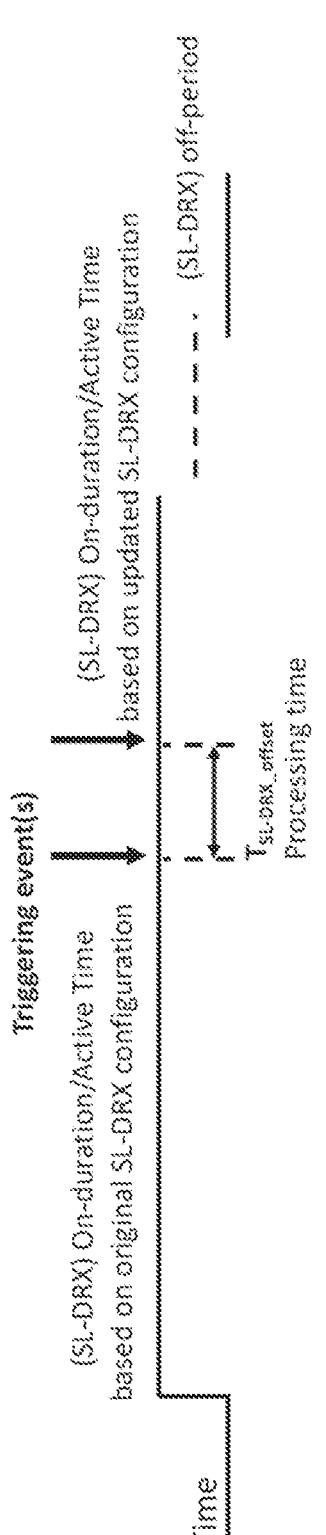

FIG. 4A, FIG. 4B, and FIG. 4C are timing diagrams illustrating an SL-DRX configuration update according to example implementations of the present disclosure.

Referring to FIG. 4A, triggering events may happen more than a given $T_{SL-DRX\_offset}$ prior to the end of a running SL-DRX (based on the stored SL-DRX configuration) and the UE may start the next SL-DRX cycle based on the newly received SL-DRX configuration in the next SL-DRX cycle.

In some implementations, the UE may apply a new SL-DRX configuration on an SL-DRX On-duration/Active Time only while the UE receives the new SL-DRX configuration more than $T_{SL-DRX\_offset}$ (processing time) prior to the beginning of the SL-DRX On-duration/Active Time, as shown in FIG. 4A.

Otherwise (e.g., the UE receives the new SL-DRX configuration or the triggering event happens later than $T_{SL-DRX\_offset}$ (processing time) prior to the beginning of the SL-DRX On-duration/Active Time based on the stored SL-DRX configuration), the UE may not apply the new SL-DRX configuration on the concerned SL-DRX On-duration/Active time. Instead, the UE may still apply the stored SL-DRX configuration (e.g., the stored value of SL-DRX cycle length) for this coming SL-DRX cycle. Then, the UE may apply the new SL-DRX configuration (e.g., the new configured SL-DRX cycle length) on the next SL-DRX On-duration/Active time.

In some implementations, the processing time may include the processing time of Layer 1 and Layer 2 (e.g., the UE device processing time in the RRC layer and/or MAC layer and/or PHY layer).

Referring to FIG. 4B, triggering events may happen less than a given $T_{SL-DRX\_offset}$ prior to the end of a running SL-DRX (based on the stored SL-DRX configuration) and the UE may extend the running SL-DRX off period until the UE can apply the updated SL-DRX configuration.

In some implementations, after receiving the new SL-DRX configuration, the UE may stop the ongoing SL-DRX operation immediately. For example, if the UE needs to apply a new SL-DRX configuration while the UE is staying in an SL-DRX off-period, the UE may stay in the SL-DRX off-period until that the UE could apply the SL-DRX configuration on its AS layer (and so the length of the SL-DRX cycle may be extended based on the SL-DRX cycle length in the stored SL-DRX configuration). As shown in FIG. 4B, if the UE is triggered to apply a new SL-DRX configuration while the UE is staying in an SL-DRX off-period, the UE may switch to SL-DRX on-duration/Active Time only after the UE can apply SL-DRX configuration based on the new SL-DRX configuration. That is, the UE may stay in SL-DRX off-period longer than the original SL-DRX configuration until the UE makes sure that the UE is available to implement the new SL-DRX configuration in its AS layer configuration. It is noted that the extension design may also be applicable to the UE staying in the SL-DRX Active Time (e.g., the UE may extend the SL-DRX Active Time to apply the newly received SL-DRX configuration and then the UE may apply the new SL-DRX configuration directly).

Referring to FIG. 4C, triggering events may happen while the UE is staying in SL-DRX Active Time/On-duration. Then, the UE may spend a short processing time period ($T_{SL\text{-}DRX\text{-}offset}$) to re-configure the updated SL-DRX configuration.

As shown in FIG. 4C, the triggering event may happen while the UE is staying in the SL-DRX Active Time/SL-DRX On-duration. In this case, the UE may spend a short processing time to re-configure the updated SL-DRX configuration. Then, after the $T_{SL\text{-}DRX\text{-}offset}$ processing time (e.g., $T_{SL\text{-}DRX\text{-}offset}=0$), the UE may start the SL-DRX timers based on the updated SL-DRX configuration. Therefore, the UE may keep staying in the SL-DRX Active Time/SL-DRX On-duration during the SL-DRX update procedure. It is noted that the value of $T_{SL\text{-}DRX\text{-}offset}$ may be presented by second/millisecond/microsecond or OFDM symbol length/slot length/subframe length/radio frame length in LTE/NR radio frame structure.

Figures 5A, 5B:
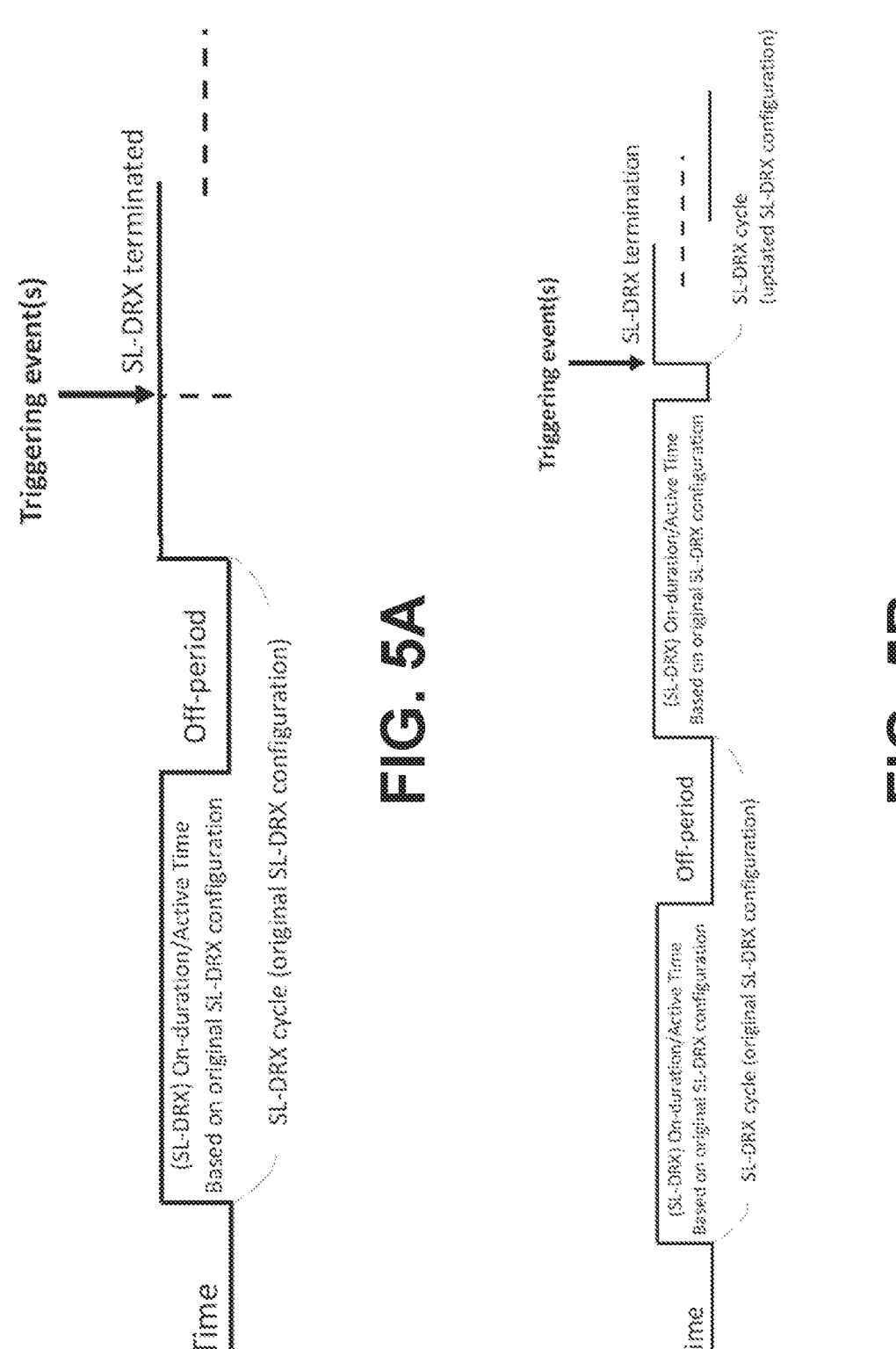
FIG. 5A and FIG. 5B are timing diagrams illustrating an SL-DRX configuration update according to example implementations of the present disclosure.

FIG. 5A and FIG. 5B are timing diagrams illustrating an SL-DRX configuration update according to example implementations of the present disclosure. The SL-DRX configuration may be absent/disabled when the triggering event happens.

Referring to FIG. 5A, in some implementations, the triggering event happens in SL-DRX On-duration/Active Time, and the updated SL-DRX mechanism is absent (or SL-DRX operation is disabled) after the triggering event happens. In this case, the UE may terminate/stop the SL-DRX On-duration/Active Time immediately, and as such the UE may keep monitoring the PSCCH (and the following sidelink packets exchange for SL-unicast service/SL-multicast service/SL-Broadcast service) while the SL-DRX operation is terminated/stopped, as shown in FIG. 5A. In some implementations, the UE may also stop the running SL-DRX operation directly after the triggering event happens (e.g., no matter whether the UE is staying in the SL-DRX Active Time or SL-DRX off-period). In this case, the UE may resume the PSCCH monitoring/transmission and the following sidelink packet exchange with neighbor UEs.

Referring to FIG. 5B, in some implementations, the triggering event happens while the UE is staying in the SL-DRX off-period, and the updated SL-DRX mechanism is absent (or is disabled) after the triggering event happens. In this case, the UE may terminate/stop the SL-DRX off-period immediately. Then, the UE may resume/continue PSCCH monitoring/transmission procedure for first stage SCI transmission/reception (and the following second stage SCI and sidelink packets exchange on the Physical Sidelink Share CHannel (PSSCH)) after the SL-DRX operation is terminated/stopped, as shown in FIG. 5B.

In some implementations, the UE which has updated SL-DRX mechanism may not move to SL-DRX On-duration/Active Time directly after the SL-DRX mechanism has updated. Instead, the UE may move to SL-DRX On-duration/Active Time only while the UE has pending sidelink packets (e.g., new sidelink packets arrive from the upper layers of the UE side) to be transmitted or the UE is configured to receive SL packets on one or more configured sidelink Reception Resource Pools (and/or sidelink exceptional resource pools). In some implementations, the UE may move to SL-DRX On-duration/Active Time only while the UE has pending sidelink packets (e.g., new sidelink packets arrive from the upper layers of the UE side), where at least one of the ProSe Per Packet Priority (PPPP) value associated with each of pending sidelink packets is larger than a given PPPP threshold, to be transmitted or the UE is configured to receive SL packets on one or more configured sidelink Reception Resource Pools (and/or sidelink exceptional resource pools). In some implementations, the given PPPP threshold may be part of the SL-DRX configuration and so the UE may obtain the PPPP threshold value from the sidelink pre-configuration/SL-SIB broadcast by the serving cell/DL UE-specific RRCReconfiguration message from the serving cell/PC5 RRC signaling from the paired UE in an SL-unicast group.

It should be noted that the SL-DRX operation may cover the SL-Tx UE side and the SL-Rx UE side.

In some implementations, the SL-Rx UE may determine the subframe associated with the start of the SL-DRX cycle by using the received SL-DRX configuration (e.g., the SL-DRX cycle and SL-DRX start offset value).

In some implementations, the SL-Rx UE may start the SL-DRX timers (e.g., sl-drx-onDurationTimer after sl-drx-slotOffset) from the beginning of the subframe.

In some implementations, the Rx UE's active time includes the time in which (at least one of the configured) sl-drx-onDurationTimer is running.

In some implementations, the SL-Tx UE may also maintain the SL-DRX cycle, SL-DRX StartOffset, and sl-drx-onDurationTimer, and may consider the SL-Rx UE(s) to be active at least during the time in which the (at least one of the configured) sl-drx-onDurationTimer is running.

It is also noted that the SL-Rx UE may (re)start the SL-DRX Inactivity Timer at one of the following timings:
  A) In the first slot after the end of SCI reception.
  B) In the first slot after a MAC PDU header associated with sidelink operation is decoded.
  C) A configured or pre-defined number of slots after the end of SCI reception.
  D) Following transmission of Physical Sidelink Feedback Control CHannel (PSFCH) (if the associated sidelink transmission is SL-HARQ-enabled).

On the other side, the SL-Tx UE may (re)start the SL-DRX Inactivity Timer at one of the following timings:
  A) In the first slot following an SCI (re)transmission to the SL-Rx UE.
  B) A configured or pre-defined number of slots after a (re)transmission to the SL-Rx UE.
  C) Following reception of SL-HARQ feedback on PSFCH (e.g., ACK or NACK message) if the associated sidelink transmission is SL-HARQ enabled).

In some implementations, the paired UEs grouped for a target SL unicast service may exchange a sidelink configuration through PC5 RRC signaling (e.g., which contains the RRCReconfigurationSidelink IE). In some implementations, a Tx UE may transmit an updated SL-DRX configuration to an Rx UE via the PC5 RRC signaling. On the Rx UE side, the Rx UE may reply (at least) one RRCReconfiguration-SidelinkComplete message to the Tx UE (also via the PC5 RRC connection) after receiving (and re-configuring) its PC5 RRC connection based on the given RRCReconfigurationSidelink message from the Tx UE. If the Rx UE fails to configure its PC5 RRC connection based on the given RRCReconfigurationSidelink message, the Rx UE may reply an RRCReconfigurationSidelinkFailure message to the Tx UE (also via the PC5 RRC connection).

In some cases, the Rx UE may apply the updated SL-DRX configuration after receiving the RRCReconfigurationSidelink message from the Tx UE. Then, the Tx UE may apply the updated SL-DRX configuration after receiving the RRCReconfigurationSidelinkComplete message from the Tx UE. In some cases, the Tx UE may apply the updated SL-DRX configuration after (or upon) transmitting the RRCReconfigurationSidelink message to the Rx UE. Then, the Rx UE may apply the updated SL-DRX configuration after (or upon) transmitting the RRCReconfigurationSidelinkComplete message to the Tx UE.

In some other cases, if the Rx UE transmits an RRCReconfigurationSidelinkFailure message to the Tx UE, then both the Tx UE and Rx UE may remain on the original SL-DRX configuration (and so the running SL-DRX timers configured based on the original SL-DRX configuration may (or may not) be stopped/released). In addition, the counting SL-DRX timers may continue.

Several triggering events for UE to start SL-DRX configuration update are provided below. It is noted that the triggering events may include the triggering events from an SL-Tx UE point of view and the triggering events from an SL Rx UE point of view. In addition, the SL-DRX operations may also include the SL-DRX operation from an SL-Tx UE side and the SL-DRX operation from an SL Rx UE side.

In some implementations, upon the triggering event happening (e.g., upon the UE reselecting a serving cell for sidelink operation), the UE may:

a) continue the SL-DRX operation (e.g., the UE may stay in SL-DRX Active Time, SL-DRX off-period, and the transition between the SL-DRX Active Time/Off-period) based on the stored SL-DRX configuration until the UE has obtained the valid SL-DRX configuration (e.g., upon the UE obtaining SL-SIB after the cell (re)selection procedure); and/or b) suspend/release the SL-DRX operation (e.g., the UE may resume the PSSCH monitoring/transmission procedure and the following sidelink packet exchange) until the UE has obtained the valid SIB after the cell (re)selection procedure; and/or c) update/re-configure the SL-DRX operation (e.g., the UE may re-configure and then re-start the SL-DRX timers) based on the stored SL-DRX configuration with/without a processing time.

The triggering events may be applicable to NR protocols/E-UTRA protocols in the Uu interface.

The triggering events may be applicable to NR sidelink communication or E-UTRA V2X sidelink communication.

In some implementations, the triggering events may happen on the RRC entity of the UE side (or other entities excepts the RRC entity/IAC entity in the UE side). Then, the RRC entity may instruct the MAC entity of the UE side to stop the SL-DRX operation (and also to stop the running SL-DRX timers) by instructing a MAC reset (or sidelink-specific MAC reset for a specific PC5 RRC connection) to the MAC entity. Please also note that the MAC entity here may be the MAC entity associated with the Master Cell Group of the SL-Tx UE/SL-Rx UE.

Triggering Events Related to Sidelink SIB Reception

In some implementations, the valuetag associated with the stored SL-SIB may change (e.g., while the UE is staying with the same serving cell for sidelink operation) and the UE may be triggered to receive the updated SL-SIB.

In some implementations, the stored SL-SIB may be associated with the systeminformationareaID (e.g., the areascope associated with the SL-SIB is "true"). In this condition, the UE may need to perform an SL-SIB update while the UE re-selects to a serving cell which is broadcasting SL-SIB with a different associated systeminformationareaID.

In some implementations, the sidelink SIB may be segmented into several parts (e.g., several SL-SIB segments) and the UE may need to assemble all of the segments to obtain a valid sidelink SIB. The stored SIB-segments (e.g., the SIB-segments of SL SIB) may not be considered as a valid SL-SIB. Therefore, a triggering event "SL-SIB update success" may represent that the assembling of the SL-SIB segments is successful. The UE may not apply SL-DRX configuration (e.g., while the SL-preconfiguration does not include SL-DRX configuration) before the UE has successfully assembled the whole SL-SIB which includes the SL-DRX configuration.

Triggering Events Related to Cell (Re)Selection Procedure

In some implementations, an NR cell may broadcast SL-DRX configuration in broadcasting system information. The UE in the (NR) RRC Connected/Inactive/Idle state may obtain the SL-DRX configuration by receiving the broadcast SL-SIB message from its serving cell in the serving (sidelink) frequency carrier.

In some implementations, an E-UTRA cell may broadcast SL-DRX configuration in broadcasting system information. The UE in the (E-UTRA) RRC Connected/Inactive/Idle state may obtain the SL-DRX configuration by receiving broadcast SL-SIB message from its serving cell in the serving (sidelink) frequency carrier.

In some implementations, the SL-DRX configuration broadcasted by (NR/E-UTRA) cell may be applicable UEs in the RRC Connected/Inactive/Idle state.

In some implementations, the cell (re)selection procedure may also include the UE reselecting a serving cell on a non-serving frequency for sidelink operation.

In some implementations, the cell (re)selection procedure may include the UE reselecting a serving cell (e.g., Primary cell, Primary Secondary cell, secondary cell) on a serving frequency.

In some implementations, the SL-DRX operation (and the stored SL-DRX configuration) may not be impacted by the cell (re)selection procedure if the UE obtains the SL-DRX configuration, but not from the serving RAN (e.g., the SL-DRX configuration is obtained via Sidelink pre-configuration or via a PC5 RRC signaling from the paired UE in a PC5 RRC connection). Therefore, the SL-DRX timers may keep counting without being impacted by the cell (re)selection procedure.

In some implementations, the UE may implement an SL-DRX configuration from a serving cell only when the cell is a suitable cell to the UE.

In some implementations, the UE may release the stored original SL-DRX configuration and store the updated SL_DRX configuration after the UE re-selects to the new serving cell (or camped cell).

In some implementations, the running SL-DRX timers (e.g., the On-durationTimer) may or may not be stopped immediately after the UE re-selects to a new serving cell.

In some implementations, the UE may trigger SL-DRX update procedure while the UE (re)selects its serving cell (e.g., from NR cell to NR cell or from E-UTRA cell to E-UTRA cell) on the serving (sidelink) frequency carrier.

In some implementations, the UE may release the stored original SL-DRX configuration and store the updated SL_DRX configuration (obtained from the SL-SIB broadcasted by the new serving cell) after the UE re-selects to the new serving cell (or camped cell).

In some implementations, the running SL-DRX timers (e.g., the running On-durationTimer) may or may not be stopped immediately after the UE re-selects to a new serving cell, as shown in FIG. 1.

It is noted that the implementations may apply to a serving frequency carrier (e.g., the UE (re)selects a camped cell on an interested sidelink frequency carrier, where the UE realizes sidelink operation based on the sidelink configuration provided by the serving cell) and non-serving frequency carrier (e.g., the UE (re)selects a camped cell on an interested sidelink frequency carrier while the UE's serving cell is operating on another frequency carrier).

In some implementations, the UE may trigger the SL-DRX update procedure while the UE (re)selects its serving cell during an inter-RAT scenario (e.g., from E-UTRA cell to NR cell or from NR cell to E-UTRA cell) on the serving (sidelink) frequency carrier.

In some implementations, the UE may release the stored original SL-DRX configuration and store the updated SL_DRX configuration obtained from the SL-SIB broadcasted by the new serving cell after the UE re-selects to the new serving cell (or camped cell).

In some implementations, the running SL-DRX timers (e.g., the running On-durationTimer) may or may not be stopped immediately after the UE re-selects to a new serving cell, as shown in FIG. 1.

In some implementations, the UE may not be allowed to implement sidelink operation (and so the SL-DRX configuration) based on the SL-SIB from a camped cell while the UE is staying in "camped on any cell" state and the camped cell is an acceptable cell to the UE in the concerned (sidelink) frequency carrier.

In some implementations, the UE may apply an SL-DRX operation based on the SL-DRX configuration pre-installed in the sidelink pre-configuration while the UE is staying in "camped on any cell" state or "any cell selection" state.

Triggering Events Related to Failure Events on Uu Interface

The failure events on the (LTE/NR) Uu interface may include:

1) Radio link failure event, which may also include RLC failure event.
2) Beam failure recovery failure.
3) Listen-Before-Talk (LBT) failure event.
4) Handover failure event.
5) RRCReconfiguration Failure event.
6) (Conditional) Handover failure event.

In some implementations, the UE may trigger a radio link failure event (or Master Cell Group (MCG) failure event) on the Uu interface while:

a) RLC failure event (e.g., the RLC entity (of a radio bearer) informs that an RLC packet re-transmission has reached the pre-configured maximum number); and/or
b) T310 (e.g., associated with the PCell) expires; and/or
c) T312 (e.g., associated with the PCell) expires; and/or
d) Beam failure recovery failure with the PCell; and/or
e) Random access problem (with the MCG); and/or
f) Uplink Listen-Before-Talk failure event.

In some implementations, the UE in an RRC Connected state may apply an SL-DRX operation based on the SL-DRX configuration obtained through UE-specific dedicated control signaling.

In some implementations, the UE in an RRC Connected state may apply an SL-DRX operation based on the SL-DRX configuration obtained through broadcasting SL-SIB.

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE), which is the serving cell associated with a radio failure event. Then, the UE may resume/re-start the PSSCH monitoring/transmissions and the following second stage SCI/sidelink packet exchange after the SL-DRX operation is stopped.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the serving cell through an SL-SIB from the serving cell (e.g., via a SIB12 or SIB13 in the broadcasting system information to the UE) when the radio link failure event happens.

In some implementations, the UE may not stop the SL-DRX operation (and so the UE may not release the stored SL-DRX configuration) if the stored SL-DRX configuration is not provided by the serving cell (e.g., the SL-DRX configuration is obtained through sidelink-preconfiguration, through a broadcasting SL-SIB or through the PC5 RRC signaling from a paired UE in a PC5 RRC Connection).

In some implementations, while the suggested failure event (e.g., radio link failure (RLF) event) happens on the Uu interface with the serving cell (e.g., on a serving frequency or non-serving frequency), the UE may continue (e.g., the UE may stay in SL-DRX Active Time, SL-DRX off-period, and the transition between the SL-DRX Active Time/Off-period) the SL-DRX operation based on the stored SL-DRX configuration until the UE re-obtains a valid SL-SIB (or a dedicated sidelink configuration, e.g., NR dedicated sidelink configuration via the RRCReconfiguration message) via the cell (re)selection procedure/RRC re-establishment procedure after the radio link failure event.

In some implementations, while the suggested failure event (e.g., radio link failure (RLF) event) happens on the Uu interface with the serving cell (e.g., on a serving frequency or non-serving frequency), the UE may suspend/release the SL-DRX operation (e.g., the UE may resume the PSCCH monitoring/transmission procedure (e.g., for first stage SCI transmission/reception) and the following second stage SCI transmission/reception and sidelink packet exchange on PSSCH) until the UE has obtained the valid SL-SIB after the cell (re)selection procedure or the UE re-obtains a dedicated sidelink configuration from the serving cell (e.g., via RRCReconfiguration message while the UE is staying in RRC Connected state).

Some different designs about the timing that UE stops SL-DRX operation during/upon a radio link failure event are provided below.

In some of the following implementations, the T310 procedures associated with PCell (and so MCG) in NR protocols (based on 3GPP TS 38.331 v 16.3.1) are described. However, such implementations do not rule out the possibility to implement the proposed mechanism when the T310 (associated with SCG) expires.

In some implementations, the UE may release the stored SL-DRX configuration (e.g., the SL-DRX configuration received from the serving cell) while the running T310 expires.

In some implementations, the UE may stop the running SL-DRX operation (and so the running SL-DRX timer(s) e.g., the running SL-DRX OndurationTimer) while T310 expires. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while T310 expires.

In some of the following implementations, the T311 procedures associated with PCell (and so MCG) in NR protocols (based on 3GPP TS 38.331 v 16.3.1) are described.

In some implementations, the UE may release the stored SL-DRX configuration (e.g., the SL-DRX configuration received from the serving cell) while the UE starts to count the T311.

In some implementations, the UE may stop the running SL-DRX operation (and so the running SL-DRX timer(s), e.g., the running SL-DRX OndurationTimer) and the UE may start to count the T311 (i.e., while the UE initiates RRC Connection re-establishment procedure). Then, the UE may resume/re-start the PSCCH monitoring/transmissions (for first stage SCI transmission/reception) and the following second stage SCI/sidelink packet exchange after the SL-DRX operation is stopped.

In some implementations, the UE may not stop the running SL-DRX operation immediately (e.g., the running SL-DRX OndurationTimer) while the UE starts to count the T311.

In some of the following implementations, the T312 procedures associated with PCell (and so MCG) in NR protocols (based on 3GPP TS 38.331 v 16.3.1) are described. However, it does not rule out the possibility to implement the proposed mechanism when the T312 (associated with SCG) expires.

In some implementations, the UE may release the stored SL-DRX configuration (e.g., the SL-DRX configuration received from the serving cell) while the running T312 expires.

In some implementations, the UE may stop the running SL-DRX operation (and so the running SL-DRX timer(s), e.g., the running SL-DRX OndurationTimer) while T312 expires. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while T312 expires.

In some implementations, the UE may release the stored SL-DRX configuration (e.g., the SL-DRX configuration received from the serving cell) while the beam failure recovery failure event (e.g., associated with the PCell or MCG) happens.

In some implementations, the UE may stop the running SL-DRX operation (and so the running SL-DRX timer(s), e.g., the running SL-DRX OndurationTimer) while the beam failure recovery failure event happens. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while the beam failure recovery failure event (associated with PCell/MCG) occurs. So, the UE may continue the SL-DRX operation based on the stored SL-DRX configuration.

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE) when the beam failure event happens.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may release the stored SL-DRX configuration (e.g., the SL-DRX configuration received from the serving cell) while the RRC entity receives a "random access problem indication" from the MAC entity associated with MCG or PCell.

In some implementations, the UE may stop the running SL-DRX operation (and so the running SL-DRX timer(s), e.g., the running SL-DRX OndurationTimer) while the RRC entity receives a "random access problem indication" from the MAC entity. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while the RRC entity receives a "random access problem indication" from the MAC entity. As mentioned before, the UE may release/stop the SL-DRX timers later (e.g., after the running SL-DRX On duration/Active Time is stopped).

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE) when the random access problem happens.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL- DRX configuration) (only) if the stored SL-DRX configuration is provided by the serving cell through an SL-SIB from the serving cell (e.g., via a SIB12 or SIB13 in the broadcasting system information to the UE) when the random access problem happens.

In some implementations, the UE may not stop the SL-DRX operation (and so the UE may not release the stored SL-DRX configuration) if the stored SL-DRX configuration is not provided by the serving cell (e.g., the SL-DRX configuration is obtained through sidelink-preconfiguration, through a broadcasting SL-SIB or through the PC5 RRC signaling from a paired UE in a PC5 RRC Connection).

In some implementations, the UE may release the stored SL-DRX configuration (e.g., the SL-DRX configuration received from the serving cell) while the RRC entity receives an "Uplink Listen-Before-Talk Failure indication" from the MAC entity associated with MCG or PCell.

In some implementations, the UE may stop the running SL-DRX operation (and so the running SL-DRX timer(s), e.g., the running SL-DRX OndurationTimer) while the RRC entity receives an "Uplink Listen-Before-Talk Failure indication" from the MAC entity. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while the RRC entity receives an "Uplink Listen-Before-Talk Failure indication" from the MAC entity. As mentioned above, the UE may release/stop the SL-DRX timers later (e.g., after the running SL-DRX On duration/Active Time is stopped).

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE) when the LBT failure event happens.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the serving cell through an SL-SIB from the serving cell (e.g., via a SIB12 or SIB13 in the broadcasting system information to the UE) when the random access problem happens.

In some implementations, the UE may not stop the SL-DRX operation (and so the UE may not release the stored SL-DRX configuration) if the stored SL-DRX configuration is not provided by the serving cell (e.g., the SL-DRX configuration is obtained through sidelink-preconfiguration, through a broadcasting SL-SIB or through the PC5 RRC signaling from a paired UE in a PC5 RRC Connection).

In some implementations, the UE may release the stored SL-DRX configuration (e.g., the SL-DRX configuration received from the serving cell) while the UE declares radio link failure due to the reaching of maximum number of retransmissions from the MCG RLC entity.

In some implementations, the UE may stop the running SL-DRX operation (and so the running SL-DRX timer(s), e.g., the running SL-DRX OndurationTimer) while the UE declares radio link failure due to the reaching of maximum number of retransmissions from the MCG RLC. Then, the LIE may resume/re-start the PSCCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately while the UE declares radio link failure due to the reaching of maximum number of retransmissions from the MCG RLC. As mentioned above, the UE may release/stop the SL-DRX timers later (e.g., after the running SL-DRX On duration/Active Time is stopped).

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE) when the RLC failure event happens.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the serving cell through an SL-SIB from the serving cell (e.g., via a SIB12 or SIB13 in the broadcasting system information to the UE) when the LBT failure event happens.

In some implementations, the UE may not stop the SL-DRX operation (and so the UE may not release the stored SL-DRX configuration) if the stored SL-DRX configuration is not provided by the serving cell (e.g., the SL-DRX configuration is obtained through sidelink-preconfiguration, through a broadcasting SL-SIB or through the PC5 RRC signaling from a paired UE in a PC5 RRC Connection).

In some implementations, the UE may release the stored SL-DRX configuration (e.g., the SL-DRX configuration received from the serving cell) while the RRC entity finds a "Re-configuration Failure event" happens associated with an MCG or PCell in which the UE receives the RRCReconfiguration message.

In some implementations, the UE may stop the running SL-DRX operation (and so the running SL-DRX timer(s), e.g., the running SL-DRX OndurationTimer) when the RRC entity finds that the "Re-configuration Failure event" has happened. Then, the UE may resume/re-start the PSSCH monitoring/transmissions and the following second stage SCI/sidelink packet exchange after the SL-DRX operation is stopped.

In some implementations, the UE may not stop the running SL-DRX operation (e.g., the running SL-DRX OndurationTimer) immediately when the RRC entity finds that a "Re-configuration Failure event" has happened. As mentioned above, the UE may release/stop the SL-DRX timers later (e.g., after the running SL-DRX On duration/ Active Time is stopped).

In some implementations, the UE may stop the running SL-DRX operation (with/without releasing the stored SL-DRX configuration) (only) if the stored SL-DRX configuration is provided by the serving cell through a UE-specific sidelink configuration from the serving cell (e.g., via an SL-ConfigDedicatedNR or an SL-ConfigDedicatedEUTRA in an RRCReconfiguration message to the UE) when the "Re-configuration Failure event" happens.

In some implementations, the UE may not stop the SL-DRX operation (and so the UE may not release the stored SL-DRX configuration) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the serving cell through an SL-SIB from the serving cell (e.g., via a SIB12 or SIB13 in the broadcasting system information to the UE) when the "Re-configuration Failure event" happens.

In some implementations, the UE may not stop the SL-DRX operation (and so the UE may not release the stored SL-DRX configuration) if the stored SL-DRX configuration is not provided by the serving cell (e.g., the SL-DRX configuration is obtained through sidelink-preconfiguration, through a broadcasting SL-SIB or through the PC5 RRC signaling from a paired UE in a PC5 RRC Connection).

In some implementations, T304 may be started by the LIE upon the UE receiving the RRCReconfiguration message including reconfigurationwithsync IE or upon conditional reconfiguration execution, e.g., when the UE applies a stored RRCReconfiguration message including re-configuration-withSync (e.g., upon the UE triggering the conditional handover procedure/conditional PCell change procedure/ conditional reconfiguration procedure by selecting a target cell). Then, the UE may consider that a handover failure event (or re-configuration failure event) may happen while the T304 expires. It is noted that a running T304 may be stopped upon successful completion of random access on the corresponding SpCell.

In some implementations, while the (conditional) handover failure event happens (e.g., a running T304 expires), the UE may revert back to the UE (RRC) configuration used in the source cell. For example, the UE may revert the NR sidelink radio configurations configured by the source cell (e.g., the SL-ConfigDedicatedNR configured by the source cell via a UE-specific RRCReconfiguration message or SIB12/SIB13 transmitted by the source cell through a broadcasting approach or through a UE-specific RRC signaling to the LIE). That is, the UE may revert the stored SL-DRX configuration associated with the source cell if the handover failure event happens. In this case, the UE may or may not reset the running SL-DRX operation while the UE reverts to the stored SL-DRX configuration associated with the source cell.

In some implementations, the UE may stop the running SL-DRX operation (associated with a UE/Layer-2 Destination ID) while the UE reverts to the sidelink radio configuration provided by the source cell (and so a new SL-DRX operation may or may not be re-started based on the reverted sidelink radio configurations). This may happen (only) if the stored SL-DRX configuration is provided by the source cell through a UE-specific sidelink configuration (e.g., via an SL-ConfigDedicatedNR or an SL-ConfigDedicatedEUTRA in an RRCReconfiguration message to the UE or through the broadcasting SL-SIB to the LIE) before a handover event/ conditional reconfiguration event happens.

In some implementations, the UE may not stop the SL-DRX operation (and so the UE may not release the stored SL-DRX configuration and so the UE may keep counting the active SL-DRX timers) if the stored SL-DRX configuration is not provided by the serving cell (e.g., the SL-DRX configuration is obtained through SL pre-configuration, or through (NR) PC5 RRC signaling from a paired UE in a PC5 RRC Connection). Then, while the SL-DRX operation is stopped/terminated/suspended, the UE may resume/re-start the PSCCH monitoring/transmissions and the following second stage SCI/sidelink packet exchange on PSSCH after the SL-DRX operation is stopped. This may happen while the target cell does not provide an SL-DRX configuration to the UE in the handover command message and so the UE may not receive the updated SL-DRX configuration in the UE-specific control signaling which triggers the handover command.

Triggering Events Related to (Conditional) Handover Procedure

In some implementations, the target cell may provide the SL-DRX configuration to a UE in a handover command (e.g., via the relaying of the source cell after the source cell). For example, the source cell (which is also the serving cell of the UE) may first transmit a handover request message to one or more target cells (for handover procedure preparation through the X2/Xn interface in backhaul connection). In addition, the handover request message may include the UE's assistance information about NR sidelink communication (e.g., the sidelink related UEAssistanceInformation which the UE has transmitted to the serving RAN/source cell and/or SL-DRX configuration which the source cell has configured to the UE with/without associated Layer-2 Destination UE ID(s)) and/or E-UTRA V2X sidelink communication. Then, a target cell may reply with the handover command message (e.g., via an inter-node signaling exchange through backhaul X2/Xn connection between the source base station (which configures the source cell) and the target base station (which configures the target cell)) to the source cell to allow the UE to handover to this target cell.

In some implementations, the target cell/target base station may configure NR sidelink radio configuration (which may include an updated SL-DRX configuration) to the UE in the handover command message to the source cell. After receiving the handover command message from the target cell/target base station, the source cell/source base station may relay the NR sidelink radio configuration (which may include an updated SL-DRX configuration) to the UE (e.g., via the RRCReconfiguration message with re-configuration-withsync). After receiving the RRCReconfiguration message with re-configurationwithsync, the UE may need to trigger handover procedure to the target cell and re-configure the PC5 interface associated with at least one Layer-2 Destination ID (e.g., the PC5 RRC connections with at least one paired UE) based on the NR sidelink radio configuration (which may include an updated SL-DRX configuration) received from the target cell.

In some implementations, the NR sidelink radio configurations provided by the target cell may be included in a UE-specific Information Element (e.g., SL-ConfigDedicatedNR, which may be configured specifically for the UE).

In some other implementations, the NR sidelink radio configurations provided by the target cell may be included in the IE, which includes sidelink system information blocks (e.g., SIB12) in the RRCReconfiguration message sent to the UE.

In some implementations, the target cell may not deliver the SL-DRX configuration to the UE during a handover procedure (e.g., by attaching the NR sidelink radio configuration in the UE-specific control signaling for handover procedure triggering). Instead, the SL-DRX configuration may be delivered only in the broadcasting SL-SIB in the target cell.

In some implementations, the UE may release/suspend the stored SL-DRX configuration (e.g., the SL-DRX configuration received from the serving cell) while the UE initiates handover procedure upon receiving the instruction from the serving cell (e.g., RRCReconfiguration message with IE reconfigurationwithsync), which instructs a handover procedure or PCell changes to the UE. This may happen while the target cell does not provide SL-DRX configuration to the UE in the handover command message and so the UE may not receive the updated SL-DRX configuration in the UE-specific control signaling which triggers the handover command.

In some implementations, the UE may stop/terminate/suspend the running SL-DRX operation (and so the running SL-DRX timer(s), e.g., the running SL-DRX OndurationTimer) while the RRC entity (on the UE side) initiates a handover procedure upon receiving the instruction from the serving cell (e.g., RRCReconfiguration message with IE reconfigurationwithsync), which instructs the handover procedure or PCell changes to the UE. Then, the SL-DRX operation is stopped/terminated/suspended, the UE may resume/re-start the PSCCH monitoring/transmissions and the following second stage SCI/sidelink packet exchange on PSSCH after the SL-DRX operation is stopped. This may happen while the target cell does not provide SL-DRX configuration to the UE in the handover command message and so the UE may not receive the updated SL-DRX configuration in the UE-specific control signaling which triggers the handover command.

In some implementations, the UE may update/apply the running SL-DRX operation (and so the running SL-DRX timer(s), e.g., the running SL-DRX OndurationTimer, may be re-started) while the RRC entity (on the UE side) initiates a handover procedure upon receiving the instruction from the serving cell (e.g., RRCReconfiguration message with IE reconfigurationwithsync), which instructs the handover procedure or PCell changes to the UE. This may happen while the UE receives an updated SL-DRX configuration from the target cell via the RRCReconfiguration message which triggers the UE to initiate the handover procedure.

In some implementations, the UE may not stop the running SL-DRX operation (e.g., the running SL-DRX OndurationTimer) immediately while the RRC entity initiates the handover procedure to the target cell. In some implementations, as mentioned above, the UE may re-initiate/re-apply/re-start the SL-DRX operation based on the updated SL-DRX configuration provided by the target cell.

In some implementations, the SL-DRX operation/SL-DRX configuration may not be impacted by the handover procedure. In some implementations, the target cell may update the SL-DRX configurations only associated with a subset of the Layer-2 Destination IDs (or only associated with specific sidelink service types) in the UE side. For example, the target cell may only provide the SL-DRX configuration associated with sidelink group-cast services/sidelink broadcast services, and the SL-DRX configuration associated with SL-unicast services may be absent in the UE-specific control signaling. In this case, the UE may only update the SL-DRX configuration indicated by the target cell (via the UE-specific control signaling which triggers the handover procedure) (and so the SL-DRX operation may or may not be re-started with the update of SL-DRX configuration). In another case, the UE may not update the SL-DRX configuration which is not modified by the target cell (via the UE-specific control signaling which triggers the handover procedure) (and so the SL-DRX operation associated with these not-modified SL-DRX configuration may be still active without being impacted by the handover procedure). For example, a first UE may keep an active PC5 RRC connection associated with a Layer-2 Destination ID (e.g., a second UE) before the handover event. The first UE may implement SL-DRX operation based on an SL-DRX configuration transmitted by the second UE through a UE-specific PC5 RRC control signaling (e.g., via a RRCReconfigurationsidelink message on the PC5 interface). Then, during the handover procedure, the target cell may not transmit/instruct SL-DRX configuration associated with the second UE in the handover command message to the source cell (and to the first UE). In this case, the first UE may keep the active SL-DRX operation (and the SL-DRX configuration obtained from the second UE) during the handover procedure. In addition, the active SL-DRX timers associated with the second UE may not be impacted by the handover procedure on the Uu interface.

In some implementations, the UE may stop the running SL-DRX operation (with/without releasing the stored SL-DRX configuration) (only) if the stored SL-DRX configuration is provided by the source cell through a UE-specific sidelink configuration (e.g., via an SL-ConfigDedicatedNR or an SL-ConfigDedicatedEUTRA in an RRCReconfiguration message to the UE) before the source cell triggers the handover event.

In some implementations, the UE may not stop the SL-DRX operation (and so the UE may not release the stored SL-DRX configuration and so the UE may keep counting the active SL-DRX timers) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the source cell through an SL-SIB from the source cell (e.g., via a SIB12 or SIB13 in the broadcasting system information to the UE) before the source cell triggers the handover event.

In some implementations, the UE may not stop the SL-DRX operation (and so the UE may not release the stored SL-DRX configuration and so the UE may keep counting the active SL-DRX timers) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the target cell may provide the SL-DRX configuration to a UE in a conditional handover procedure (e.g., via the relaying of the source cell after the source cell). For example, the source cell (which is also the serving cell) of the UE may firstly transmit a handover request message to one or more candidate of target cells for handover procedure preparation. The handover request message may include the UE's assistance information about NR sidelink communication (e.g., the sidelink related UEAssistanceInformation which the UE has transmitted to the serving RAN/source cell and/or SL-DRX configuration which the source cell has configured to the UE with/without associated Layer-2 Destination UE ID(s)) and/or E-UTRA V2X sidelink communication. Then, one or more candidate target cells may reply with a handover command message (e.g., via an inter-node signaling exchange through backhaul X2/Xn connection between the source base station (which configures the source cell) and the target base station (which configures the target cell)) to the source cell to allow the UE to handover to this target cell.

After receiving the replies from one or more candidate target cells through the inter-node signaling exchange, the source cell may than generate the "conditional reconfiguration" message to the UE through a UE-specific DL control signaling (e.g., RRCReconfiguration message) to the UE. In some implementations, the source cell may configure an IE CondReconfigToAddModList, where each entity in the CondReconfigToAddModList may be associated with a candidate target cell. In the signaling design, each entity in the CondReconfigToAddModList may include: configuration ID (e.g., condReconfigId), a triggering event (e.g., measurement configuration) for the UE to select the candidate target ell (e.g., condExecutionCond), and the dedicated (NR) radio configurations associated with the candidate target cell (e.g., RRCReconfiguration). The "conditional reconfiguration" message (which includes the RRCReconfiguration message associated with different candidate target cells) may be merged and delivered to the UE through an RRCReconfiguration message (associated with the source cell/serving cell) for the UE to trigger a conditional handover procedure/CPC procedure/conditional reconfiguration procedure in the near future.

In some implementations, the serving cell may transmit a first RRCReconfiguration message (associated with the source cell), which includes a first CondReconfigToAddModList, to the UE. After receiving the first CondReconfigToAddModList, the UE may store the first CondReconfigToAddModList as the stored CondReconfigToAddModList in the UE side. Then, the serving cell may transmit a second RRCReconfiguration message (associated with the source cell), which includes a second CondReconfigToAddModList, to the UE. After receiving the second CondReconfigToAddModList, the UE may update/modify the store CondReconfigToAddModList also based on the second CondReconfigToAddModList. Therefore, the UE may also update the stored NR sidelink radio configurations/SL-DRX configuration by jointly considering the first CondReconfigToAddModList and the second CondReconfigToAddModList.

In some implementations, the target cell/target base station may configure an NR sidelink radio configuration (which may include an updated SL-DRX configuration) to the UE in the handover command message to the source cell. Then, after receiving the handover command message from one or more target cell(s)/target base station(s) through inter-node signaling, the source cell/source base station may transmit an UE-specific DL control signaling (e.g., RRCReconfiguration message with an IE "conditional reconfiguration" (the "conditional handover" IE covers the RRCReconfiguration message associated with each candidate target cell(s) in a CondReconfigToAddModList) for the UE to trigger the conditional handover (CHO) procedure or conditional PCell change (CPC) procedure based on the associated condExecutionCond) to the UE. The UE-specific DL control signaling may include one or more candidate target cells for the UE to trigger CHO/CPC procedure. In addition, one or more triggering events (e.g., measurement event associated with a MeasID in the condExecutionCond) associated with these candidate target cells for the UE to decide when the UE should select a target cell to trigger the CHO/CPC procedure. In this case, an RRCReconfiguration message associated with a candidate target cell may also be configured with (NR) sidelink radio configurations with/without an SL-DRX configuration.

In some implementations, the serving cell may also transmit one or more condReconfigToRelease messages, which may include one or more condReconfigId(s) to indicate the stored RRCReconfiguration (associated with one or more candidate target cell(s)) that the UE should remove from the stored CondReconfigToAddModList. Similarly, the serving cell may also transmit one or more condReconfigToRelease messages to instruct the UE to remove one or more RRCReconfiguration messages associated with one or more candidate target cells. In addition, the sidelink radio configurations (with/without SL-DRX configuration) included in the removed RRCReconfiguration message may also be removed by the UE after receiving the condReconfigToRelease message.

In some implementations, for a target candidate cell of the CHO/CPC procedure, an NR sidelink radio configuration may be provided to be associated with the target candidate cell in the UE-specific DL control signaling (e.g., the UE-specific DL control signaling which includes the "conditional reconfiguration" IE). In addition, the NR sidelink radio configuration associated with the candidate target cell may or may not include an SL-DRX configuration.

In some implementations, for a target candidate cell of the CHO/CPC procedure, an NR sidelink radio configuration may not be provided to be associated with the target candidate cell in the UE-specific DL control signaling (e.g., the UE-specific DL control signaling which includes the "conditional reconfiguration" IE).

After receiving the UE-specific DL control signaling which includes a conditional reconfiguration, the UE may initiate a CHO/CPC procedure by selecting a target cell (among the one or more candidate target cells) based on the given triggering events in the same UE-specific DL control signaling for the target of CHO/CPC procedure. In the RRCReconfiguration message with the "conditional reconfiguration" IE, the UE may or may not receive the NR sidelink radio configurations (e.g., SL-DRX configuration) associated with the selected target cell. Therefore, different UE implementations may be needed based on whether an updated NR sidelink radio configuration/SL-DRX configuration is provided with the selected target cell.

In some implementations, the candidate target cell may transmit NR sidelink radio configuration (with/without SL-DRX configuration) via the handover command message to the source cell before the source cell decides to transmit the "conditional reconfiguration" IE to the UE via an RRCReconfiguration message (associated with the source cell). Then, the source cell may relay the received NR sidelink radio configuration (which may include an updated SL-DRX configuration) to the UE (e.g., via the RRCReconfiguration message with the "conditional reconfiguration" IE). After receiving the RRCReconfiguration message with the "conditional reconfiguration", the UE may trigger the conditional reconfiguration procedure to a selected target cell while the target cell fulfills a pre-defined triggering event. Upon the UE triggering the conditional reconfiguration procedure, the UE may re-configure the PC5 interface associated with at least one Layer-2 Destination ID (e.g., the PC5 RRC connections with at least one paired UE) based on the NR sidelink radio configuration (which may include an updated SL-DRX configuration) received from the target cell (through the relay of the source cell).

In some implementations, the NR sidelink radio configurations provided by the target cell may be included in an UE-specific IE (e.g., SL-ConfigDedicatedNR, which may be configured specifically for the UE).

In some implementations, the NR sidelink radio configurations provided by the target cell may be included in the IE, which includes sidelink system information blocks (e.g., SIB12), in the RRCReconfiguration message sent to the UE.

In some implementations, the target cell may not deliver a SL-DRX configuration to the UE during a conditional handover procedure (e.g., by attaching the NR sidelink radio configuration in the UE-specific control signaling for conditional handover procedure triggering). Instead, the SL-DRX configuration may be delivered only in the broadcasting SL-SIB in the target cell.

In some implementations, the UE may release/suspend the stored SL-DRX configuration (e.g., the SL-DRX configuration received from the serving cell) while the UE initiates a conditional handover procedure/conditional PCell change procedure/conditional reconfiguration procedure based on the received instruction from the serving cell (e.g., RRCReconfiguration message with IE "conditional reconfiguration" from the source cell), which instructs a CHO/CPC procedure to the UE. This may happen while the target cell (selected by the UE) does not provide the SL-DRX configuration for the UE in the handover command message (as the reply of a handover request message from the source cell) and so the UE may not receive the updated SL-DRX configuration in the UE-specific control signaling which includes the "conditional reconfiguration" IE from the source cell.

In some implementations, the UE may stop/terminate/release/suspend the running SL-DRX operation (and so the running SL-DRX timer(s), e.g., the running SL-DRX OndurationTimer, would also be stopped/terminated/released) while the LIE initiates conditional handover procedure/conditional PCell change procedure/conditional reconfiguration procedure based on the received instruction from the serving cell (e.g., RRCReconfiguration message with IE "conditional reconfiguration" from the source cell). This condition may happen while the target cell (selected by the UE) does not provide a SL-DRX configuration for the LIE in the handover command message (as the reply of a handover request message from the source cell) and so the UE may not receive the updated SL-DRX configuration in the UE-specific control signaling which includes the "conditional reconfiguration" IE from the source cell. Then, while the SL-DRX operation is stopped/terminated/suspended, the UE may resume/re-start the PSSCH monitoring/transmissions and the following second stage SCI/sidelink packet exchange after the SL-DRX operation is stopped.

In some implementations, the UE may update/apply the running SL-DRX operation (and so the running SL-DRX timer(s), e.g., the running SL-DRX OndurationTimer may be re-started) while the RRC entity initiates a conditional handover procedure/conditional reconfiguration procedure/conditional PCell change procedure after receiving a target cell based on the received instruction from the serving cell (e.g., RRCReconfiguration message with IE "conditional reconfiguration"). This may happen while the UE receives an updated SL-DRX configuration associated with the selected target cell via the RRCReconfiguration message with the "conditional reconfiguration" IE.

In some implementations, the UE may not stop the running SL-DRX operation (e.g., the running SL-DRX OndurationTimer) immediately while the UE receives the RRCReconfiguration message with the "conditional reconfiguration" IE. Instead, the UE may stop the running SL-DRX operation while the RRC entity (in the UE side) initiates a conditional handover procedure/conditional reconfiguration procedure/conditional PCell change procedure to the target cell selected by the UE. Then, as described above, the UE may re-initiate/re-apply/re-start the SL-DRX operation based on the updated SL-DRX configuration provided by the target cell.

In some implementations, the SL-DRX operation/SL-DRX configuration may not be impacted by the CHO/CPC procedure. In some implementations, the target cell (selected by the UE for the CHO/CPC procedure) may update the SL-DRX configurations only associated with a subset of the Layer-2 Destination IDs (or only associated with specific sidelink service types) in the UE side. For example, the selected target cell may only provide a SL-DRX configuration associated with sidelink group-cast services/sidelink broadcast services, and the SL-DRX configuration associated with SL-unicast services may be absent in the UE-specific control signaling. In this case, the UE may only update the SL-DRX configuration indicated by the selected target cell and so the SL-DRX operation may or may not be re-started with the update of SL-DRX configuration. In another case, the UE may not update the SL-DRX configuration which is not modified by the selected target cell and so the SL-DRX operation associated with these not-modified SL-DRX configurations may be still active without being impacted by the conditional handover/conditional reconfiguration/conditional PCell change procedure. For example, a first UE may keep an active PC5 RRC connection associated with a Layer-2 Destination ID (e.g., a second UE) before the CHO/CPC procedure. The first UE may implement an SL-DRX operation based on an SL-DRX configuration transmitted by the second UE through a UE-specific PC5 RRC control signaling (e.g., via a RRCReconfigurationsidelink message on the PC5 interface). During the CHO/CPC procedure, the selected target cell may not transmit/instruct a SL-DRX configuration associated with the second UE in the handover command message to the source cell (and to the first UE). Therefore, the first UE may keep the active SL-DRX operation (and the SL-DRX configuration obtained from the second UE) during the CHO/CPC procedure. In addition, the active SL-DRX timers associated with the second UE may not be impacted by the handover procedure on the Uu interface.

In some implementations, the UE may stop the running SL-DRX operation (with/without releasing the stored SL-DRX configuration) (only) if the stored SL-DRX configuration is provided by the source cell through a UE-specific sidelink configuration (e.g., via an SL-ConfigDedicatedNR or an SL-ConfigDedicatedEUTRA in an RRCReconfiguration message to the UE) before the UE initiates the CHO/CPC/conditional reconfiguration message.

In some implementations, the UE may not stop the SL-DRX operation (and so the UE may not release the stored SL-DRX configuration and so the UE may keep counting the active SL-DRX timers) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

In some implementations, the UE may stop the running SL-DRX operation (with/without releasing the stored SL-DRX configuration) (only) if the stored SL-DRX configuration is provided by the source cell through an SL-SIB from the source cell (e.g., via a SIB12 or SIB13 in the broadcasting system information to the UE) before the UE initiates the CHO/CPC/conditional reconfiguration procedure.

In some implementations, the UE may not stop the SL-DRX operation (and so the UE may not release the stored SL-DRX configuration and so the UE may keep counting the active SL-DRX timers) if the stored SL-DRX configuration is not provided by the serving cell through a UE-specific sidelink configuration and/or from broadcasting system information (e.g., the SL-DRX configuration is obtained through sidelink-preconfiguration, through a broadcasting SL-SIB or through the PC5 RRC signaling from a paired UE in a PC5 RRC Connection).

Triggering Events Related to RRC State Transitions

In some implementations, a UE may move from the RRC Connected state to the RRC Inactive/Idle state, and the UE may be configured with an SL-DRX configuration through UE-specific dedicated RRC signaling while the UE is staying in the RRC Connected state. In addition, the serving RAN may broadcast the SL-DRX configuration through SL-SIB.

In some implementations, while the UE moves from the RRC Connected state to the RRC Inactive/Idle state, the UE may release the original SL-DRX configuration and apply the updated SL-DRX configuration which is broadcasted by the serving RAN through broadcasting approach (or through the SI-on-demand procedure).

In some implementations, while the UE moves from the RRC Connected state to the RRC Inactive/Idle state, the UE may or may not stop the running SL-DRX timers immediately while the UE moves from RRC Connected state to RRC Inactive/Idle state, as described above.

In some implementations, while the UE moves from the RRC Inactive/Idle state to the RRC connected state, the UE may release the original SL-DRX (e.g., the SL-DRX configuration which the UE receives from the broadcasting SL-SIB) immediately while the UE moves to the RRC Connected state.

In some implementations, while the UE moves from the RRC Inactive/Idle state to the RRC connected state, the UE may (re)start the SL-DRX operation only after receiving the SL-DRX configuration from the UE-specific RRC signaling.

In some implementations, the UE may keep the original SL-DRX configuration while its RRC state changes (e.g., while the UE moves from the RRC Inactive/Idle state to the RRC connected state, while the UE moves from the RRC connected state to the RRC Inactive/Idle state, while the UE moves from the RRC Inactive state to the RRC Idle state, or while the UE moves from the RRC Idle state to the RRC Inactive state). In this case, the running SL-DRX operation may also not be impacted by the RRC state changes.

Triggering Events Related to SL-DRX Absent Condition (Out-of-Coverage Scenario)

In some implementations, in a target sidelink frequency carrier, the UE may move from an in-coverage condition (e.g., while the UE has a serving cell) to an out-of-coverage condition. In some cases, no pre-installed SL-DRX configuration in the UE side (e.g., SL-DRX configuration may be installed in the SL-preconfiguration). In these cases, the UE may resume the PSCCH monitoring/transmission procedure (with the following sidelink packet exchange and second stage SCI transmission/reception in PSSCH) while the UE moves out of the coverage of serving RAN (on a sidelink frequency carrier).

Triggering Events Related to MAC Reset

In some implementations, the UE may be configured/instructed to implement a "sidelink specific reset" of the MAC entity for one or more specific PC5-RRC connections by the upper layers (e.g., the RRC entity in the LIE side). In this case, the UE may:

1) stop the SL-DRX operation associated (only) with the PC5-RRC connection (e.g., the PC5 RRC connection associated with an SL-unicast group or associated with a Layer-2 Destination ID); and/or 2) stop the SL-DRX timers associated to the PC5-RRC connection (e.g., SL-drx-onDurationTimer, SL-drx-InactivityTimer, drx-HARQ-RTT-TimerSL_Rx, drx-RetransmissionTimerSL Rx, drx-HARQ-RTT-TimerSL_Tx, and/or drx-RetransmissionTimerSL Tx).

It is noted that the SL-DRX operation (and so the running SL-DRX timers) associated with other PC5 RRC connections, which are not reset, may not be impacted (and so the UE may keep counting the active SL-DRX timers).

It is also noted that the SL-DRX operation (and so the running SL-DRX timers) associated with other Layer-2 Destination IDs (which may be associated with sidelink group-cast services or sidelink broadcast services) may not be impacted (and so the UE may keep counting the active SL-DRX timers).

In some implementations, the UE may be configured/instructed to implement a "sidelink specific reset" of the MAC entity for specific sidelink service types (e.g., sidelink broadcast services or sidelink groupcast services) by the upper layers (e.g., the RRC entity in the UE side). In this case, the UE may stop the SL-DRX operation associated with the specific sidelink service type (e.g., UE may stop the SL-DRX timers associated with all of the running SL-groupcast services or all of the running SL-broadcast services. The stopped timer may be any combination of SL-drx-onDurationTimer, SL-drx-InactivityTimer, drx-HARQ-RTT-TimerSL_Rx, drx-RetransmissionTimerSL_Rx, drx-HARQ-RTT-TimerSL_Tx, and drx-RetransmissionTimerSL_Tx).

It is noted that the SL-DRX operation (and so the running SL-DRX timers) associated with other sidelink services, which are not reset by the upper layers, may not be impacted (and so the UE may keep counting the active SL-DRX timers).

In some implementations, the MAC reset instructions provided by upper layers may also impact the SL-DRX operation while the associated SL-DRX configuration is provided by the serving cell. For example, while a reset of the MAC entity (e.g., the MAC entity associated with the master cell group) is requested by upper layers, the MAC entity may:

1) stop all of the active SL-DRX operations in the MAC entity of the UE side (and so all of the active SL-DRX timers in the UE side may be stopped), and the UE may resume/re-start the PSCCH monitoring/transmissions and the following second stage SCI/sidelink packet exchange in the PSSCH after the SL-DRX operation is stopped; and/or 2) stop all of the active SL-DRX operations only associated with a specific sidelink service type. For example, the UE may stop all of the active SL-DRX operations associated with sidelink group-cast services (and so all of the active SL-DRX timers associated with sidelink group-cast services in the UE side may be stopped). Then, the UE may resume/re-start the PSCCH monitoring/transmissions and the following second stage SCI/sidelink packet exchange in PSSCH after the SL-DRX operation is stopped. In contrast, the SL-DRX operation associated with SL-unicast groups (based on an active PC5 RRC connection) may not be impacted.

In some implementations, the MAC entity may stop the SL-DRX operation associated with a Layer-2 Destination ID only while the SL-DRX configuration associated with the SL-DRX operation is delivered by the serving RAN.

In some implementations, the MAC entity may not stop the SL-DRX operations (and so the associated SL-DRX timers may keep counting) if the UE receives the associated SL-DRX configurations through PC5 RRC signaling or sidelink pre-configuration.

In some implementations, the UE may stop/release (one of, more than one of, or all of) the SL-DRX configuration associated with all of the (Layer-2) Destinations on the (LTE/NR) PC5 interface while the UE receives a MAC reset from the upper layers. In some implementations, the UE may also stop the DRX operation jointly while the UE stops the SL-DRX operation on the NR PC5 interface.

Triggering Events Related to Dual Active Protocol Stack (DAPS) Handover Procedure In some implementations, the UE may be served by an LTE primary cell and the UE may stay in an (E-UTRA) RRC Connected state. In some implementations, the UE may be served by an NR primary cell and the UE may stay in an (NR) RRC Connected state.

The UE may be configured with DAPS handover by its serving (source) (E-UTRA/NR) cell to handover to a target (LTE/NR) cell.

If DAPS handover is configured, the UE continues the downlink user data reception from the source eNB until releasing the source cell and continues the uplink user data transmission to the source eNB until a successful random access procedure to the target eNB. Upon reception of the handover command, the UE may maintain only PCell connection with both source and target cells. Any other configured serving cells, NR sidelink configurations and V2X sidelink configurations may be released (by the network) before the handover command is sent to the UE. Then, UE may also release the SL-DRX configuration (and so stop SL-DRX operation) with the release of the NR sidelink configuration.

According to the above descriptions, several triggering events for the UE to start an SL-DRX configuration update, and several solutions about how a UE implements the SL-DRX configuration update while at least one triggering event happens, are provided.

Sidelink Discontinuous Reception (SL-DRX) Designs

Connected Mode DRX (C-DRX) mechanisms have been applied in the LTE/NR Uu interface for power saving in the UE side. However, in the LTE/NR (V2X) sidelink communication, there is no similar mechanism to decrease the power wastage in the UE side. In the disclosure, SL-DRX mechanisms are introduced, and the definition of SL-DRX On-Duration/off-period and the related UE behaviors during the defined SL-DRX On-Duration/Off-period are also introduced.

In the following discussion, the SL-DRX mechanisms are introduced based on the condition that the UE(s) is in the RRC Connected state, but such mechanisms are not limited thereto. The introduced SL-DRX mechanisms may also be implemented to the UEs in the RRC Inactive state and/or the RRC Idle state.

In the following disclosures, the SL-DRX mechanisms are introduced based on the condition that the UEs are implementing sidelink communication under the coverage of serving Radio Access Network(s) (e.g., sidelink unicast group, sidelink multi-cast group and the whole group are under the coverage of the serving RAN(s)), but such mechanisms are not limited thereto. The introduced SL-DRX mechanisms may also be implemented to the sidelink unicast/multi-cast groups that are out-of-coverage (without active Uu interface with any RAN) or partial-in-coverage (only a subset of group members in the group having an active Uu interface with their serving RAN).

In the following disclosures, the SL-DRX mechanisms are introduced based on the New Radio (NR) RAT (e.g., NR Uu interface and NR PC5 interface), but such mechanisms are not limited thereto. The introduced SL-DRX mechanisms may also be applicable to other RATs (e.g., LTE Uu interface and LTE PC5 interface).

In some of the following implementations, the concept of short-DRX cycle and long-DRX cycle (and the switch between short-DRX cycle/long-DRX cycle) in the C-DRX mechanism may be re-used in the SL-DRX mechanism. However, in some other implementations, the concept of short-DRX cycle(s) or long-DRX cycle(s) may be configured in the SL-DRX mechanism.

In some implementations, an SL-DRX Command may be transmitted by the serving Radio Access Network (which composes one or more than one serving cell(s)/base station(s)/gNB(s)) to UEs through dedicated control signaling (e.g., PHY signaling (e.g., DCI through PDCCH, MAC CE, or dedicated RRC signaling transmitted through PDSCH), or any combination of the three signalling methods, through (LTE/NR) Uu interface.

In some implementations, an SL-DRX Command may be transmitted by a UE (e.g., a platoon leader in a sidelink unicast/group-cast group) to UEs through dedicated control signaling (e.g., MAC CE multiplexed with other sidelink packets in PSSCH and/or dedicated PC5-RRC signaling (e.g., through an associated PSSCH), which are transmitted through PSSCH) through a PC5 interface. In some implementations, the SL-DRX Command may be delivered through at least one SCI in an associated PSCCH.

Figure 6:
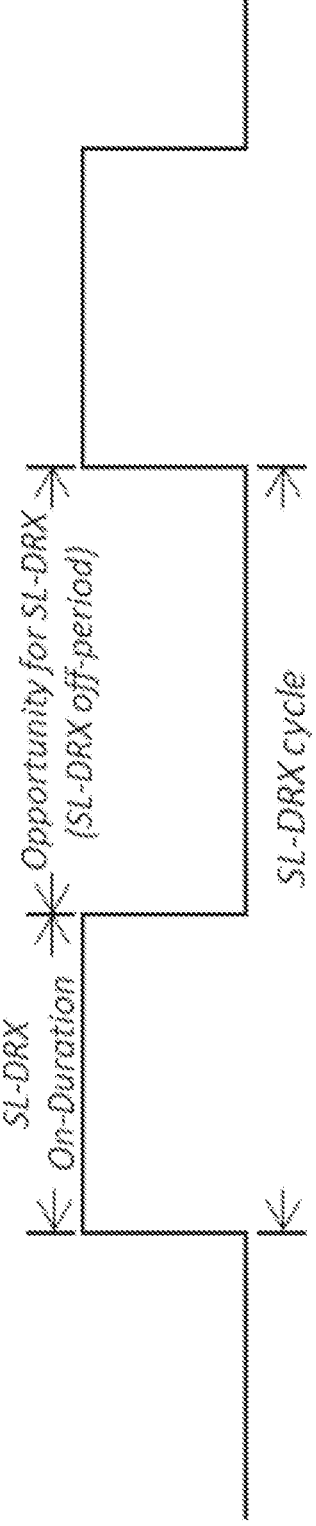
FIG. 6 is a timing diagram illustrating an SL-DRX configuration according to an example implementation of the present disclosure.

FIG. 6 is a timing diagram illustrating an SL-DRX configuration according to an example implementation of the present disclosure.

Referring to FIG. 6, in a PC5 interface, the UE may "wake up" at the beginning of the SL-DRX On-Duration. Then, the UE may implement SL-DRX mechanisms during the SL-DRX On-Duration(s). Then, the UE may switch from the SL-DRX On-Duration (or from the SL-DRX Active Time) to the SL-DRX off-period based on defined condition(s). In some implementations, the UE may stay in the SL-DRX off-period for a time period and the UE behaviors when staying in the SL-DRX off-period are provided in the following disclosures. As shown in FIG. 6, the SL-DRX off-period may be terminated while the UE wakes up at the beginning of the next SL-DRX On-Duration.

In some implementations, the UE "wake up" may imply that the UE may start to monitor control information from the associated physical control channels (e.g., the UE would wake up to monitor SCI(s) from at least one associated PSCCH(s) in (LTE/NR) PC5 interface and/or the UE may wake up to monitor DCI(s) from at least one associated PDCCH(s) in the (LTE/NR) Uu interface).

In some implementations, the UE "wake up" may imply that the UE may stay in the DRX (e.g., C-DRX and/or SL-DRX) Active Time(s).

In some implementations, the UE "wake up" may imply that the UE may start a drx-onDurationTimer (and/or an SL-drx-onDurationTimer in a (LTE/NR) PC5 interface).

In some implementations, the UE "wake up" may imply that the UE may (re-)start a drx-onDuration Timer (and/or an SL-drx-onDurationTimer in a (LTE/NR) PC5 interface).

In some implementations, the UE "wake up" may imply that the UE may (re-)start a drx-InactivityTimer (and/or an SL-drx-InactivityTimer in a (LTE/NR) PC5 interface).

In some implementations, an SL-DRX cycle is composed of an SL-DRX On-Duration and a following SL-DRX off-period. The parameters (and the control mechanisms/rules about the UE/RAN behaviors during the SL-DRX Active Times/SL-DRX off-periods in the SL-DRX cycles introduced in the disclosure) for SL-DRX mechanism (e.g., values of SL-DRX cycle/SL-DRX On-Duration) may be explicitly configured by the serving RAN through a broadcasting message (e.g., system information broadcasting or through SI on-demand procedure) or through dedicated control signaling (e.g., RRC(Connection)Reconfiguration message or other RRC messages, such as an RRC Reconfiguration message, RRC Release message, RRC Release message with suspend configuration, and RRC Release message without suspend configuration) in Uu interface.

In some implementations, the parameters (and the control mechanisms/rules about the UE/RAN behaviors during the SL-DRX Active Times/SL-DRX off-periods in the SL-DRX cycles introduced in the disclosure) for SL-DRX mechanism may be configured by other UEs (e.g., through broadcasting SL-MIB or dedicated PC5-RRC signaling) through a (LTE/NR) PC5 interface. Specifically, the SL-DRX corresponding parameters (e.g., values of SL-DRX cycle/SL-DRX On-Duration) may be configured via a DRX configuration for SL which may be configured per MAC entity and/or cell group (e.g., MCG/SCG). In addition, an SL-DRX cycle may include a short SL-DRX cycle and/or a long SL-DRX cycle and the UE may decide which SL-DRX cycles to apply based on pre-defined rules.

In some implementations, the parameters (and the control mechanisms/rules about the UE/RAN behaviors during the SL-DRX Active Times/SL-DRX off-periods in the SL-DRX cycles introduced in the disclosure) for an SL-DRX mechanism may be pre-defined in technical specifications or pre-installed in the memory module (e.g., USIM) of the UE side.

In some implementations, at least part of the SL-DRX parameters may be re-used with the C-DRX parameters.

For example, based on the parameters provided for C-DRX, the UE may configure the length of SL-DRX On-Duration as drx-onDurationTimer; and/or the UE may configure the length of a SL-DRX cycle as drx-ShortCycle.

In some implementations, long DRX cycle-related design may also be applied to an SL-DRX configuration. Moreover, in some implementations, the UE may be configured with a long SL-DRX cycle by reusing the received drx-LongCycle-StartOffset received in the DRX-Config.

Moreover, the UE may 'wake up' in both the (LTE/NR) Uu interface and (LTE/NR) PC5 interface simultaneously. For example, a MAC entity of the UE may perform the associated DRX operations for the Uu interface and another MAC entity of the UE may perform the associated SL-DRX operations for the PC5 interface. For another example, a MAC entity of the UE may perform same DRX operations on both the Uu interface and the PC5 interface jointly (and simultaneously). Then, in some implementations, the UE may transit into DRX off-period in the Uu interface and transit into SL-DRX off-period in the PC5 interface at different times (e.g., depending on the packet exchange status (or depending on the different DRX operations) in the Uu interface and PC5 interface) respectively.

In some implementations, the UE may be configured with two C-DRX groups with two different sets of parameters. In addition, the SL-DRX mechanism may re-use one or more parameters of one of the two different sets of parameters, which correspond to one of the two C-DRX groups. The selection between the different sets of parameters may be indicated by the serving RAN (e.g., through dedicated RRC signaling) or other UEs (e.g., through dedicated PC5-RRC signaling) in the same sidelink unicast/group-cast/broadcast group(s) with the target UE. The two C-DRX groups may be configured for the same MAC entity and/or cell group (e.g., MCG/SCG).

UE Behaviors During the SL-DRX On-Durations/Off-Period(s)

In the following disclosure, the SL-DRX may have impact on the UE behaviors in the following Aspects (1) to (5).

Aspect (1) Sidelink Transmission: the UE may stop some implementations of sidelink packet transmission while the UE stays in the SL-DRX off-period(s).

In this disclosure, an SL-Tx UE is defined as a UE who wants to transmit sidelink data packets and/or control signaling to other UEs through the (LTE/NR) PC5 interface. On the other hand, an SL-Rx UE is defined as the UE who wants to receive sidelink packets and/or control signaling from other UEs through the (LTE/NR) PC5 interface. In some cases, a UE may be either an SL-Tx UE or an SL-Rx UE and the UE may switch its role between the SL-Tx UE and the SL-Rx UE. In some cases, a UE may be an SL-Tx UE and an SL-Rx UE at the same time. It is noted that the SL-Tx UE behaviors introduced in this disclosure are not limited to be applicable to the SL-Tx UEs but also to be applicable to the SL-Rx UEs. On the other hand, the SL-Rx UE behaviors introduced in this disclosure are not limited to be applicable to the SL-Rx UEs but also to be applicable to SL-Tx UEs. For example, sensing procedure in general is required for the SL-TX UEs for transmission. However, an SL-Rx UE may also perform sensing procedure (in the background implementation) since it may act as an SL-Tx UE when requesting to deliver sidelink packets.

In some implementations, the UE may stop transmitting SCI in configured PSCCH(s) during the SL-DRX off-periods (even if there is at least one pending sidelink packet in the UE side and there has an available sidelink resource (pool) during the SL-DRX off-periods). Therefore, the UE may not transmit sidelink packets (with multiplexed De-Modulation Reference Signal (DMRS)) in the PSSCHs during the SL-DRX off-periods as well.

In some implementations, the UE may stop accessing Type 1 sidelink configured grant(s) while the UE is staying in SL-DRX off-periods. Therefore, for the RAN side, the serving RAN may re-allocate the sidelink resource to other UEs which are staying in the SL-DRX Active Time.

In some implementations, the UE may still access (all or a subset of) Type 1 sidelink configured grant(s) while the UE is staying within the SL-DRX off-periods.

In some implementations, the UE may stop accessing 'active' Type 2 sidelink configured grant(s) while the UE is staying in SL-DRX off-periods. Therefore, for the RAN side, the serving cell may re-allocate the sidelink resource to other UEs during the SL-DRX off-periods of the UE(s)).

In some implementations, the UE may still access (all or a subset of) active Type 2 sidelink configured grant(s) while the UE is staying within the SL-DRX off-periods.

Regarding Mode 2 sidelink resource configuration, in some implementations, the UE may stop accessing sidelink pool(s) while the UE is staying in SL-DRX off-periods.

Regarding sidelink exceptional resource pool(s), in some implementations, the UE may stop accessing sidelink exceptional resource pool(s) while the UE is staying in SL-DRX off-periods.

Regarding the SL-HARQ procedure, in some implementations, the UE may suspend ongoing (or active) SL-HARQ procedure(s) after the UE moves to the SL-DRX off-period. The UE may keep the suspended SL-HARQ procedure(s) (e.g., the UE may suspend all of the active counters/timers associated with the SL-HARQ procedures) while the UE is staying in the SL-DRX off-period. For example, for the SL-HARQ processes associated with low priority (e.g., the Sidelink logical channel with high PPPP value, such as 7, 8), the SL-HARQ processes with these low priority sidelink logical channel(s) may be suspended during the SL-DRX off-periods. In addition, a PPPP-threshold may be further configured to the UE (e.g., through dedicated (PC5-)RRC signaling or broadcasting system information). The sidelink logical channel(s) with associated PPPP value(s) higher (and equal) to the given PPPP-threshold value may be considered as low priority sidelink logical channel(s). Then, the SL-HARQ processes associated with these low priority SL-HARQ processes would be suspended during the SL-DRX off-periods. The implementation and mapping rules of sidelink logical channels and PPPP values may be referred to LTE V2X (sidelink) communication.

The aforementioned sidelink resources may cross one or more than one sidelink frequency carriers which is/are configured for the UE to transmit sidelink packets (and sidelink control signaling, such as PC5-RRC signaling). Therefore, the UE may implement an SL-DRX mechanism across multiple sidelink frequency carriers simultaneously. In some implementations, the UE may be configured with more than one SL-DRX parameter sets, where each SL-DRX parameter set is applied to different sets of sidelink frequency carriers (e.g., two SL-DRX parameter sets for sidelink frequency carriers in frequency range 1 (FR1), e.g., the frequency carriers under 7 GHz, and frequency range 2 (FR2), e.g., the frequency carriers above 7 GHz).

In some implementations, a subset of sidelink transmission resource pools (e.g., one or more sidelink transmission resource pools) may be configured for a UE to transmit sidelink packets even during the SL-DRX off-periods. For example, a set of SL-DRX-Tx Resource pool configurations (e.g., one or more SL-DRX Tx Resource Pool configurations) may be configured to UEs (e.g., through sidelink pre-configuration; through dedicated control signaling in Uu interface, such as an RRC(Connection)Reconfiguration message; through dedicated signaling in PC5 interface, such as PC5-RRC signaling; through broadcasting message, such as system information; through SI on-demand procedure). Then, the UE may start to access the SL-DRX-Tx Resource pools, including performing sidelink sensing or partial sensing to select the target sidelink resource blocks for sidelink packet delivery, after the UE moves to the SL-DRX off-periods. In some implementations, the SL-DRX-Tx resource pool configuration may further compose the sidelink exceptional resource pool(s), which is configured for an SL-Tx UE to transmit sidelink packets when at least one exceptional condition is fulfilled. It is noted that the definition of SL-DRX Active Time may only consider the counting of SL-drx-onDurationTimer. In other words, the UE may transit from SL-DRX On-Durations to SL-DRX off-periods directly after the SL-drx-onDurationTimer expires (and the (SL-DRX) Active Time in PC5 interface is also finished). Then, within SL-DRX cycles, the UE may apply different sets of sidelink transmission resources within SL-DRX On-Durations/SL-DRX off-periods respectively.

In some implementations, the UE may stop transmitting PC5-RRC signaling to peer UEs while the UE is staying in SL-DRX off-periods. Then, the PC5-RRC signaling may be stored in the buffer of the SL-Tx UE side. The SL-Tx UE may re-start the PC5-RRC signaling transmission in the next SL-DRX On-Duration. Therefore, some specific procedures (e.g., sidelink UE capability enquiry/exchange signaling and sidelink resource (pool) configuration/enquiry procedures in PC5 interface) may also be suspended while the UE is staying in PC5 off-periods. Therefore, the RRC procedures associated with these PC5-RRC signaling may also be suspended while the UE is staying in SL-DRX off-periods. Moreover, the active/ongoing counters or timers associated with these suspended PC5-RRC procedures may also be suspended during the SL-DRX off-periods. Then, UE may re-count the suspended counters/timers after the UE moves to SL-DRX On-Durations again.

Note that the above-mentioned sidelink resources for sidelink transmission may include one or more than one sidelink frequency carrier which the UE may monitor for sidelink packet transmission.

Note that for a UE staying in the SL-DRX off-periods, the UE may decide whether to transit to SL-DRX On-Duration (e.g., to start the SL-drx-onDurationTimer after SL-drx-SlotOffset ($\geq$0) from the beginning of the corresponding subframe in PC5 interface) based on whether there are any pending sidelink packets (sidelink control signaling) in the UE side. In other words, the UE may transit from SL-DRX off-period to SL-DRX On-Duration (and so start the SL-drx-onDurationTimer after SL-drx-SlotOffset from the beginning of the corresponding subframe) at the beginning of SL-DRX cycle if there is any pending sidelink packet in the buffer. On the other hand, the UE may decide to stay in SL-DRX off-period (and so not to start the SL-drx-onDurationTimer after SL-drx-SlotOffset from the beginning of the corresponding subframe) if there is no pending packet in the buffer.

In LTE V2X sidelink communication and NR sidelink operation, an SL-Tx UE may implement sidelink sensing or partial sensing mechanism to select the target sidelink resource blocks for sidelink packet delivery.

In some implementations, the UE may stop implementing a sidelink sensing or partial sensing mechanism during the SL-DRX off-periods.

Figure 7:
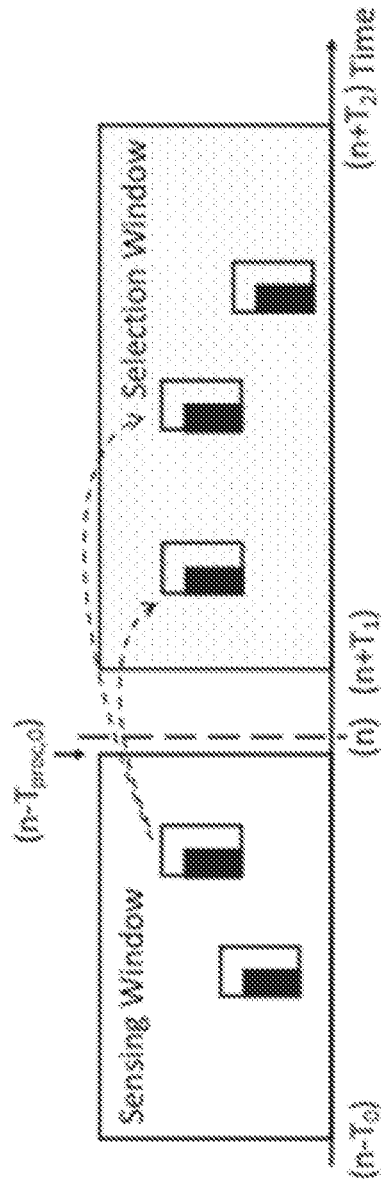
FIG. 7 is a timing diagram illustrating a sensing mechanism according to an example implementation of the present disclosure.

FIG. 7 is a timing diagram illustrating a sensing mechanism according to an example implementation of the present disclosure. Specifically, FIG. 7 illustrates an example of a sidelink sensing mechanism.

Referring to FIG. 7, a UE may perform sidelink resource selection after arrival of a sidelink Transport Block from the upper layers at slot (n). The UE may decide the location of physical resources for pending sidelink TB transmission during the configured 'sidelink selection window' between $(n+T_1)$ and $(n+T_2)$ in time domain based on the UE's sensing results during the previous 'sidelink sensing window' between $(n-T_0)$ and $(n-T_{proc,0})$ before slot (n).

In some implementations, UE selection of $T_1$ and $T_2$ may fulfill the condition of $0 \leq T_1 \leq T_{proc,1}$ (which is a (pre-defined) Layer-1 processing time). In some implementations, when the Subcarrier Carrier Spacing (SCS) of the sidelink BWP is 15, 30, 60, or 120 kHz, the length of $T_{proc,1}$ would be configured as 3, 5, 9, or 17 slots, respectively) and $T_{2min} \leq T_2 \leq$ remaining Packet Delay Budget (PDB) of the pending sidelink TB.

In some implementations, the value of $T_{2min}$ may be $\{1, 5, 10, 20\} \times 2^{\mu}$, where $\mu=0$, 1, 2, or 3 that correspond to the SCS of 15, 30, 60, or 120 kHz, respectively. In addition, the UE may determine the value of $T_{2min}$ from this value set according to the priority (e.g., ProSe Per Pack Priority (PPPP)) associated with the pending sidelink TB. When $T_{2min}$ is greater than remaining PDB, $T_2$ may be set to the remaining PDB to ensure that the UE transmits the packet within the required latency.

In addition, as for the sensing window between $(n-T_0)$ and $(n-T_{proc,0})$, the value of $T_0$ is (pre)configured to be 100 or 1100 ms, which is configurable and may depend on whether the sidelink resource reservation for a different sidelink TB is enabled/disabled for the selected sidelink transmission (Tx) resource pool. $T_{proc,0}$ is also a requirement for Layer-1 processing time decided based on the SCS on the sidelink BWP.

While the sidelink sensing mechanism is applied, the UE may construct a set of candidate resources ($S_A$) by taking all sidelink resources within the sidelink selection window as an initial candidate set. Then, the UE may exclude candidate resources based on the following rules:

1) (Rule #1) In some implementations, the UE may skip monitoring some slots within the sidelink sensing window due to some reasons (e.g., uplink packet transmission under half-duplex limit). Here, the UE may automatically assume that one or more 'hypothetical' SCI (e.g., New Radio SCI format 1-A) has be transmitted in the slots skipped by the UE. In addition, the UE may further assume that some candidate resources in some of the slots in the $S_A$ would have been reserved/ indicated by the hypothetical SCI (e.g., based on the rules of sidelink periodical resource reservation defined in NR sidelink protocols). So, to avoid possible sidelink packet collisions, the UE would remove those candidate resources which could be indicated/configured by this hypothetical SCI.

2) (Rule #2) By skipping some slots during the sidelink sensing window, the UE may decode the SCI (e.g., the first stage SCIs) of the PSCCHs, which are transmitted by neighbor UEs, in the remaining slots in the sidelink sensing window. By decoding the SCIs transmitted by neighbor UEs, the UE may identify the candidate resources which are already reserved by other UEs in the $S_A$. In addition, during (partial) sensing, when the UE detects an SCI in the sidelink sensing window successfully, the UE may additionally measure a sidelink RSRP value corresponding to the received PSCCH or sidelink RSRP of PSSCH scheduled by the PSCCH depending on the sidelink Tx resource pool configuration. If the measured sidelink RSRP of the scheduled PSSCH is greater than a corresponding SL-RSRP threshold and the indicated/reserved resource(s) are within the sidelink selection window according to the time and frequency assignment fields and/or periodic reservation information in the decoded SCI, the UE will exclude these resource(s) from the candidate set $S_A$.

By excluding more and more candidate physical resources based on the (partial) sensing rules above, it is possible that fewer and fewer remaining candidate physical resources remain for the UE to choose. To make sure that the UE would have enough candidate sidelink resources to choose, a minimum threshold X % may also be pre-defined to the UE. Then, during the (partial) sensing procedure, if the remaining candidate resources in set SA are less than X % of the total candidate resources before the resource exclusion Rule #1 and Rule #2 (i.e., the initial set $S_A$), the UE may increase the SL-RSRP threshold by 3 dB and repeat this entire Rule #1 and Rule #2 until the X % of remaining candidate resources is reached. In some implementations, a set of X % may be (pre)configured for the sidelink Tx resource pool and the possible values are $\{20, 35, 50\}$. The UE determines an X % from the value set according to the PPPP value of sidelink data packet to be sent. Similarly, the SL-RSRP threshold(s) that should be used for resource exclusion is also related to the transmission priority (i.e., the PPPP value) of the sidelink data packet to be sent, as well as the reception priority indicated in the received SCI. The UE then takes the remaining resources in the set $S_A$ after the resource exclusion process above as the candidate resource set for final selection.

It is noted that, to save the power consumption during full sensing mechanism, partial sensing mechanism is also introduced to decrease the candidate PSCCHs that the UE needs to decode. In some implementations, the UE may be configured with periodic-based partial sensing (PBPS) and/or contiguous partial sensing (CPS) for partial sensing on a sidelink Tx resource pool. To implement partial sensing, the UE may monitor the slots (e.g., in the sidelink sensing window) at $t_{y-k*Preserve}$, where $t_y$ is a slot among the selected (or remaining) candidate slots (e.g., in the sidelink selection window) and Preserve is a set of periodicity values (pre-configured or configured) to the UE. In some implementations, the UE may decide the values of k based on the most recent sensing occasion earlier than $t_{y0}-(T_{proc,1}+T_{proc,0})$ (e.g., within the sidelink sensing window). Here, $t_{y0}$, which is the first slot of the candidate resource set in time domain (e.g., within the sidelink selection window, so the UE would not monitor the slots not earlier than $(n-T_0)$). In some implementations, the UE may further be configured to monitor several additional slots within the sidelink sensing window and so the UE may further decide the value of k to fulfill the additional requirement of sensing slots. In some implementations, the UE may also be configured with contiguous partial sensing by monitoring the slots between the range $[(n+T_A), (n+T_B)]$, where the $(n+T_A)$ may be M consecutive (logical) slots earlier than slot $t_{y0}$ and (n+TB) may be $(T_{proc,1}+T_{proc,0})$ slots earlier than slot $t_{y0}$. $t_{y0}$ is the first slot of the candidate resources for periodic-based partial sensing. It is also noted that, in some implementations, the UE may further be configured to implement a periodic-based partial sensing and/or contiguous partial sensing mechanism by jointly considering periodic reservation for another TB (e.g., different M values for CPS may be configured to the UE based on whether periodical reservation for another TB is enabled or disabled).

It is noted that, when the UE is configured/enabled to perform SL monitoring/reception of PSCCH and SL-RSRP measurement for partial sensing (e.g., PBPS and/or CPS) on slots in SL-DRX Inactive Time, the UE may monitor only (at least) one pre-defined/pre-configured default periodic sensing occasions (e.g., the most recent sensing occasion) from the slots. In some implementations, the UE may monitor a minimum of m contiguous slots from the slots if the UE performs contiguous partial sensing from the slots. In some implementations, the value of m may be configurable. In some other implementations, a default value of m may also be pre-configured/pre-defined to the UE.

Figures 8A, 8B:
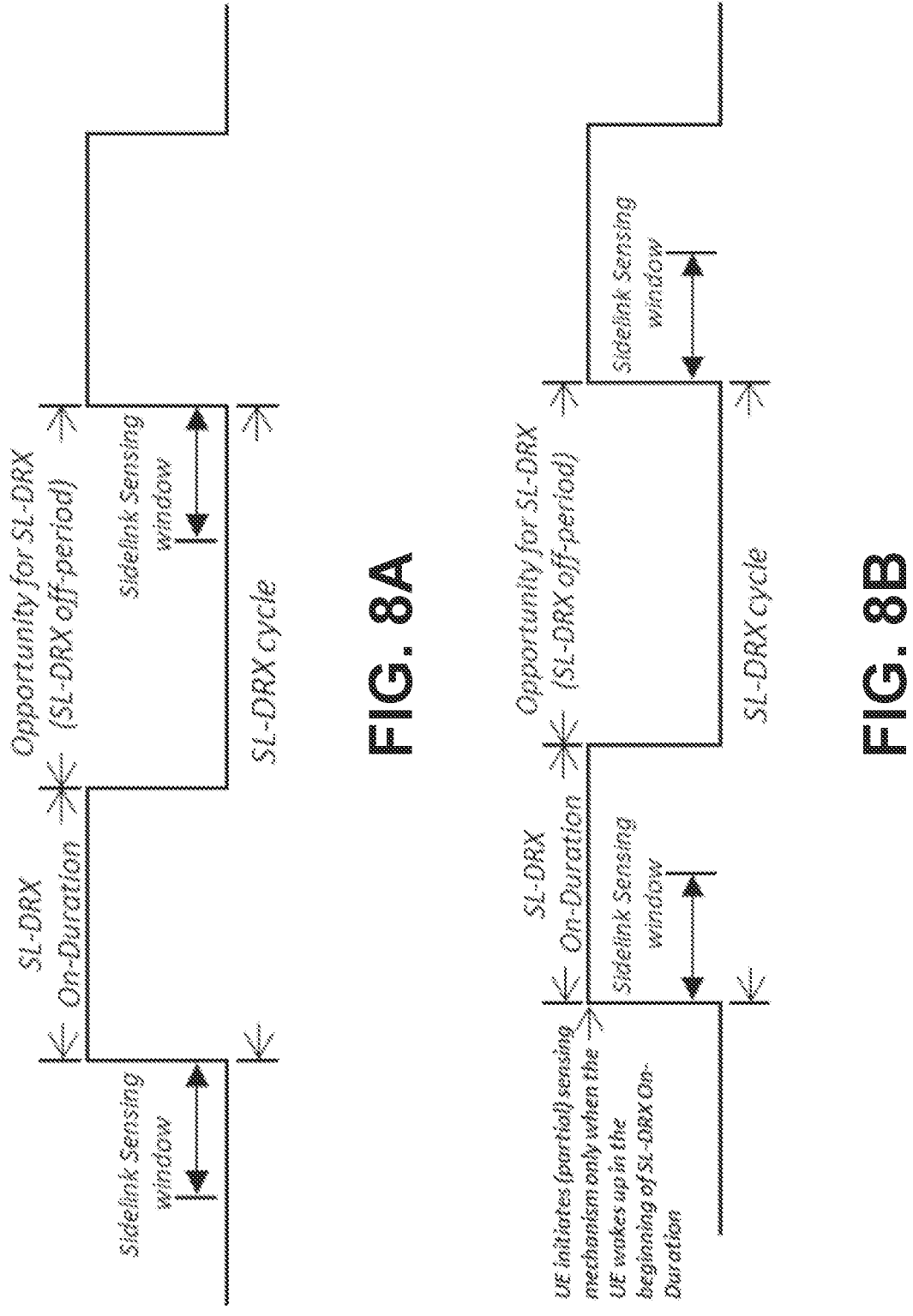
FIG. 8A, FIG. 8B, and FIG. 8C are timing diagrams illustrating a sidelink sensing window configuration according to example implementations of the present disclosure.
Figure 8C:
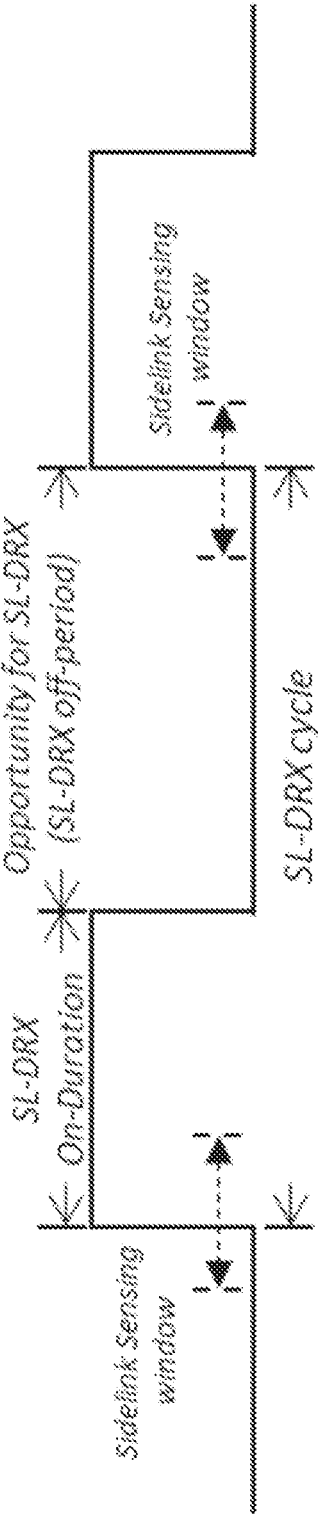

FIG. 8A, FIG. 8B, and FIG. 8C are timing diagrams illustrating a sidelink sensing window configuration according to example implementations of the present disclosure.

Referring to FIG. 8A, in some implementations, the UE may be configured with a "sidelink sensing window" (e.g., which is a time period) during the SL-DRX off-period(s). Before the starting of SL-DRX On-Duration, the UE may start to implement sidelink sensing or partial sensing mechanism in advance for the preparation of sidelink packet delivery in the coming SL-DRX On-Duration.

In some implementations, the UE may monitor and decode the PSCCHs (and/or PSSCHs) located within the sidelink sensing window. In some implementations, the UE may not decode SCIs in the PSCCH(s)/PSSCH(s) within the sidelink sensing window. That is, the UE may just monitor the received signal strengths (or the received power density) of the PSCCH(s) (e.g., by detecting each Physical Resource Blocks (PRBs) associated with the PSCCH)/PSSCH(s) in the configured sidelink sensing window. In some implementations, the UE may monitor a power saving signaling (PSS) or a wake up signaling (WUS) in the (LTE/NR) Uu interface for sidelink in the sidelink sensing window. Then, the UE may wake up in the (LTE/NR) PC5 interface after the UE receives the PSS or WUS from the serving cell through the Uu interface.

Specifically, the PSS could be referred to WUS, PDCCH-WUS, PDCCH-skipping, and/or go-to sleep signaling. The PSS may be scrambled by a specific Radio Network Temporary Identifier (RNTI), e.g., PS-RNTI. The PSS may include one or more than one of the following information: power saving technique associated with C-DRX (e.g., wake up and/or go to sleep), cross-slot scheduling, triggering reference signal transmission, CSI-RS measurement report, single/multi-cell operation, bandwidth part information (e.g., BWP ID), SCell information (e.g., SCell ID), MIMO layer adaptation (e.g., maximum number of MIMO layer), number of antenna, indication of CORESET/search space/candidate of subsequent PDCCH decoding, PDCCH monitoring periodicity, PDCCH skipping, skipping number of C-DRX monitoring, Semi-Persistent-Scheduling (SPS) activation, C-DRX configuration, C-DRX cycle, etc.

The monitoring occasion of PSS may "indicate" to the UE by the NW an offset before and/or at the beginning (e.g., start symbol/slot/subframe) of C-DRX ON-Duration. Said "indicate" may imply an explicit signaling by higher layer signaling or implicit indication through the CORESET/search space. For example, the serving RAN may configure an offset to the UE. The serving RAN may configure a specific CORESET and/or search space for PSS. The serving RAN may configure a specific period for PSS, e.g., the period may be associated with the period of DRX cycle.

The UE may monitor the PSS on the offset before and/or at the beginning (e.g., start symbol/slot/subframe) of C-DRX ON-Duration on the specific CORESET and/or search space. The WUS may have a field to indicate that the UE needs to wake up or not wake up in the newly coming C-DRX cycle.

Alternatively, the WUS may not have an explicit field/format to indicate that the UE needs to wake up or not. When the UE receives the WUS, it may imply that the serving RAN indicates the UE to wake up (e.g., to monitor the PDCCH on the following C-DRX On-Duration and as such the UE may start the drx-onDuration Timer at the beginning of the subsequent C-DRX cycle).

If the UE does not receive any WUS on the WUS occasion, it may imply that the serving RAN indicates the UE not to wake up (e.g., not to monitor the PDCCH(s) and stays in the C-DRX off-periods (e.g., not to start the drx-onDurationTimer at the beginning of the subsequent C-DRX cycle).

In some implementations, the UE may decide whether to initiate the (partial) sensing mechanism in the beginning of sidelink sensing window based on whether the UE has pending sidelink packets in the buffer. For example, the UE may initiate a (partial) sensing mechanism only when there is any pending sidelink packets in the SL-Tx UE side. On the other hand, the UE would not trigger the sidelink (partial) sensing mechanism and the sidelink sensing window if the UE does not have pending packets in its buffer. In some implementations, the UE may decide whether to continue monitoring during the sensing window based on a specific indication (e.g., PSS and/or WUS), where the specific indication may be indicated during the sensing window.

Referring to FIG. 8B, in some implementations, the sidelink sensing window may be configured as part of SL-DRX On-Duration. In this case, the UE may initiate sidelink (partial) sensing mechanism (only) when the UE wakes up at the beginning the SL-DRX On-Duration. The UE may decide whether to transmit sidelink packets in this SL-DRX On-Duration based on the (partial) sensing results.

Referring to FIG. 8C, in some implementations, the sidelink sensing window may be configured as extending from the SL-DRX off-period to the SL-DRX On-Duration. Therefore, the UE may initiate sidelink (partial) sensing mechanism while a new sidelink packet arrives at the buffer in the UE side while the UE is staying in the SL-DRX off-period. In some implementations, the UE may apply this rule only to new sidelink packet(s) belonging to some specific (pre-configured) sidelink logical channel(s) (e.g., logical channel with high priority, such as sidelink logical channels associated with low PPPP values).

In some implementations, an SL-Tx UE may be configured to implement either a sensing mechanism or partial sensing mechanism based on the SL-DRX mechanism. For example, an SL-Tx UE may implement a (partial) sensing mechanism during SL-DRX On-Durations (e.g., while at least one of the SL-Rx UEs associated with the SL-Tx UE are staying in SL-DRX On-Duration. So, the SL-Tx UE is staying in SL-DRX/sidelink Active Time). On the other hand, the SL-Tx UE may implement partial sensing mechanism while the SL-Tx UE is staying in SL-DRX off-periods (e.g., while all of the SL-Rx UEs associated with the SL-Tx UE are staying in SL-DRX off-periods, so the SL-Tx UE is staying in SL-DRX/sidelink Inactive Time).

In some implementations, the (full/partial) sensing mechanism may not be interrupted during the transitions between the SL-DRX On-Durations and SL-DRX off-periods.

In some implementations, the UE may stop a (partial/full) sensing mechanism while the UE transits from the SL-DRX On-Duration (or SL-DRX Active Time) to the SL-DRX off-periods (e.g., while all of the SL-Rx UEs associated with the SL-Tx UE move to or stay in SL-DRX off-periods) or while the UE transits from the C-DRX On-Duration (or C-DRX Active Time) to the C-DRX off-period. In addition, the UE may also release the stored sensing results if the (partial) sensing mechanism is stopped.

In some implementations, the UE may stop implementing Channel Busy Ratio (CBR) measurement during the SL-DRX off-periods.

In some implementations, the UE may be configured with another sidelink CBR window. The sidelink CBR window may follow the above-mentioned designs of the sidelink sensing window, which therefore are not repeated herein.

In some implementations, the CBR measurement is not interrupted while the UE transits from SL-DRX On-Durations (or SL-DRX Active Times) to SL-DRX off-periods and/or while the UE transits from the SL-DRX off-periods to SL_DRX Active Times.

In some implementations, the UE may stop implementing channel occupancy ratio measurement during the SL-DRX off-periods.

In some implementations, the UE may be configured with another sidelink channel occupancy window. The sidelink channel occupancy window may follow the above-mentioned designs of the sidelink sensing window, which therefore are not repeated herein.

In some implementations, the channel occupancy measurement is not interrupted while the UE transits from SL-DRX On-Durations (or SL-DRX Active Times) to SL-DRX off-periods and/or while the UE transits from the SL-DRX off-periods to SL_DRX On-Durations.

In some implementations, the UE may exchange sidelink buffer status reports (SL-BSR) through an NR PC5 interface (e.g., through PC5-RRC signaling).

In some implementations, the UE may not initiate an SL-BSR to neighbor UEs through a PC5 interface while the UE stays in SL-DRX off-periods.

In some implementations, the UE may still initiate an SL-BSR procedure to neighbor UEs through a PC5 interface while the UE stays in SL-DRX off-periods. In addition, an ongoing SL-BSR procedure would not be impacted by the transitions between SL-DRX On-Durations/SL-DRX off-periods.

In some implementations, the UE may initiate a sidelink Scheduling Request (SL-SR) procedure with at least one neighbor UE through a PC5 interface (e.g., through PC5-RRC signaling).

In some implementations, a UE would not initiate an SL-SR to neighbor UEs through a PC5 interface while the UE stays in SL-DRX off-periods.

In some implementations, the UE may still initiate an SL-SR procedure to neighbor UEs through a PC5 interface while the UE stays in SL-DRX off-periods. In addition, an ongoing SL-SR procedure would not be impacted by the transitions between SL-DRX On-Durations/SL-DRX off-periods.

In some implementations, the UE may initiate a sidelink Power Headroom Report (SL-PHR) procedure with at least one neighbor UE through PC5 interface (e.g., through PC5-RRC signaling).

In some implementations, the UE would not initiate an SL-PHR to neighbor UEs through a PC5 interface while the UE stays in SL-DRX off-periods.

In some implementations, the UE may still initiate an SL-PHR procedure to neighbor UEs through PC5 interface while the UE stays in SL-DRX off-periods. In addition, an ongoing SL-PHR procedure would not be impacted by the transitions between SL-DRX On-Durations/SL-DRX off-periods.

In some implementations, the UE may break the rules of stopping sidelink packet transmissions (through sidelink dynamic grant/Type 1 sidelink configured grant/Type 2 sidelink configured grant/Mode 2 sidelink resource pool configuration/Exceptional resource pool) while at least one exceptional condition is met. The at least one exceptional condition may include:

a) the T310 or T311 of (NR/LTE) RRC protocols is running;

b) T301 of (NR/LTE) RRC protocols is running;

c) T304 of (NR/LTE) RRC protocols is running;

d) the (partial) sensing result on the sidelink resource (pools) configured to the UE is not yet available;

e) from the moment of the UE initiating (NR/LTE) RRC connection establishment until the UE receiving an RRC(Connection)Reconfiguration including sidelink resource (pool) configuration or until the UE receiving an RRC(Connection)Release or an RRC(Connection) Reject message; and f) the UE is initiated to transmit a PC5-RRC signaling (e.g., SL-SR procedure/SL-BSR procedure or SL-PHR procedure) to other UEs through the PC5 interface or the UE is initiated to transmit an SL-SR/BSR procedure or SL-PHR procedure to the UE's serving cell through (LTE/NR) Uu interface while the UE is staying in the SL-DRX off-periods.

In addition, the SL-DRX off-period may be terminated while at least one of the listed exceptional conditions is met, and then the UE may wake up and transit to the next SL-DRX On-Duration (e.g., the UE may start the SL-drx-onDurationTimer after SL-drx-SlotOffset ($\geq$0) from the beginning of the corresponding subframe in the associated (LTE/NR) PC5 interface).

Aspect (2) Sidelink Reception: the UE may stop some implementations of sidelink packet reception while the UE stays in SL-DRX off-period(s).

In some implementations, the UE may not monitor SCI in PSCCH(s) and the following associated PSSCH from available sidelink resources while the UE is staying in the SL-DRX off-periods. The available sidelink resources may include all sidelink reception resource pools.

It is noted that the above-mentioned sidelink reception resource pools may include one or more than one sidelink frequency carrier on which the UE would monitor for sidelink packet reception.

In some implementations, a subset of sidelink reception resource pools (e.g., one or more sidelink reception resource pools) may be configured for a UE to monitor even during the SL-DRX off-periods. For example, a set of SL-DRX-Rx Resource pool configurations (e.g., one or more SL-DRX-Rx Resource pool configurations) may be configured to UEs (e.g., through sidelink pre-configuration; through dedicated control signaling in a Uu interface, such as RRC(Connection)Reconfiguration message; through dedicated signaling in a PC5 interface, such as PC5-RRC signaling; through broadcasting message, such as system information; through SI on-demand procedure). Then, the UE may start to monitor the SL-DRX-Rx Resource pools after the UE moves to the SL-DRX off-periods. Then, the UE may monitor the whole configured sidelink reception resource pools after the UE moves to the SL-DRX On-Duration in the next SL-DRX cycle. In some implementations, the SL-DRX-Rx resource pool configuration may further compose the sidelink exceptional resource pool(s), which is configured for an SL-Tx UE to transmit sidelink packets when at least one of the exceptional conditions is fulfilled. It is noted that the definition of SL-DRX Active Time may only consider the counting of SL-drx-onDurationTimer. In other words, the UE may transit from SL-DRX On-Durations to SL-DRX off-periods directly after the SL-drx-onDurationTimer expires (and the Active Time in PC5 interface is also finished). Then, within SL-DRX cycles, UE may apply different sets of sidelink reception resource pool(s) in SL-DRX On-Durations/SL-DRX off-periods respectively.

Aspect (3) Sidelink-Uu related mechanisms to RAN (in Uu interface): the UE may stop some implementations of UE reporting to RAN (through (LTE/NR) Uu interface) while the UE is staying in SL-DRX off-period(s), or the UE may stop monitoring RAN instructions while the UE is staying in SL-DRX off-period(s).

In some implementations, a UE may not monitor PDCCHs (e.g., for sidelink dynamic grant(s) reception) while the UE is staying in the SL-DRX off-period(s). Therefore, the UE may not try to decode the PDCCHs by using the RNTI configured for the sidelink dynamic grant(s) reception.

In some implementations, a UE may monitor PDCCHs from the serving RAN during the Active Time of Uu interface when the UE is staying in SL-DRX off-periods (e.g., while all of the SL-Rx UEs associated with the SL-Tx UE are staying in SL-DRX off-periods) of a PC5 interface.

In some implementations, a UE may not monitor PDCCHs only while the UE is staying in the SL-DRX off-period(s) and C-DRX off-periods.

In some implementations, a UE may not monitor PDCCHs (e.g., if the UE is configured with Type 2 sidelink configured grant, the UE may not monitor PDCCHs for sidelink configured grant activation/de-activation from the serving RAN) while the UE is staying in the SL-DRX off-period(s). Therefore, the UE may not try to decode the PDCCHs by using the RNTI configured for the Activation/De-activation of sidelink configured grant(s). In some implementations, the UE may skip the activated Type 2 sidelink configured grant on the PC5 interface while the UE is staying in the SL-DRX off periods (e.g., while all of the SL-Rx UEs associated with the SL-Tx UE are staying in SL-DRX off-periods).

In some implementations, a UE may not monitor PDCCHs (e.g., if the UE is configured with LTE (V2X) sidelink semi-persistent scheduling (SPS) grant, the UE may not monitor PDCCHs (e.g., by trying to implement blind decoding via the given SL semi-persistent scheduling vehicle RNTI (V-RNTI)) for sidelink SPS grant activation/de-activation from the serving RAN) while the UE is staying in the SL-DRX off-period(s). Therefore, the UE may not try to decode the PDCCHs by using the RNTI (which is the SL semi-persistent scheduling V-RNTI) configured for the Activation/De-activation of (LTE V2X) sidelink SPS grant(s). In some implementations, the UE may skip the activated LTE V2X sidelink SPS grant on PC5 interface while the UE is staying in the SL-DRX off-periods (e.g., while all of the SL-Rx UEs associated with the SL-Tx UE are staying in SL-DRX off-periods, so the SL-Rx UE is staying in SL-DRX/sidelink Inactive Time).

In some implementations, a UE may monitor PDCCHs (e.g., for NR sidelink configured grant activation/de-activation and/or LTE V2X sidelink SPS grant activation/de-activation from the serving RAN) during the Active Time of (NR/LTE) the Uu interface when the UE is staying in SL-DRX off-periods of PC5 interface.

In some implementations, a UE may not monitor PDCCHs (e.g., for sidelink configured grant activation/de-activation from the serving RAN) only while the UE is staying in the SL-DRX off-period(s) and C-DRX off-periods.

In some implementations, a UE may not trigger SL-SR procedure(s) for the sidelink logical channel(s) to the serving RAN (e.g., through Uu interface) while the UE is staying in SL-DRX off-periods.

In some implementations, a UE may trigger SL-SR procedure(s) for the sidelink logical channel(s) to the serving RAN during the Active Time of the Uu interface while the UE is staying in SL-DRX off-periods of PC5 interface.

In some implementations, a UE may not initiate an SL-SR to the UE's serving cell through the Uu interface while the UE stays in the C-DRX off-periods (and/or SL-DRX off-periods).

In some implementations, a UE may not trigger SL-BSR procedure(s) to report BSRs of sidelink logical channel(s) to the serving RAN while the UE is staying in SL-DRX off-periods.

In some implementations, a UE may report BSRs of sidelink logical channel(s) to the serving RAN during the Active Time of the Uu interface when the UE is staying in SL-DRX off-periods of PC5 interface.

In some implementations, a UE may not initiate SL-BSR to the UE's serving cell through the Uu interface while the UE stays in the C-DRX off-periods (and/or SL-DRX off-periods).

In some implementations, a UE may not trigger SL-PHR procedure(s) to report the PHRs to the serving RAN while the UE is in SL-DRX off-periods.

In some implementations, a UE may trigger SL-PHR procedure(s) to the serving RAN during the Active Time of the Uu interface when the UE is staying in SL-DRX off-periods of PC5 interface.

In some implementations, a UE may not initiate SL-PHR to the UE's serving cell through the Uu interface while the UE stays in the C-DRX off-periods (and/or SL-DRX off-periods).

In some implementations, a UE may not transmit SL-HARQ feedback information to the serving RAN while the UE is staying in SL-DRX off-periods.

In some implementations, a UE may transmit SL-HARQ feedback to the serving RAN during the Active Time of the Uu interface when the UE is staying in SL-DRX off-periods of PC5 interface.

In some implementations, UE may not transmit SL-HARQ feedback information to the serving RAN only while the UE is staying in the C-DRX off-period(s) (and/or SL-DRX off-periods).

Aspect (4) Sidelink synchronization: the UE may stop broadcasting sidelink synchronization signal block (SL-SSB) (with/without MIB-SL or MIB-SL-V2X) while the UE is staying in SL-DRX off periods even the UE is configured as a (LTE/NR) SyncRef UE. Then, the UE may broadcast the SL-SSB (with/without MIB-SL or MIB-SL-V2X) again after the UE wakes up at the beginning of the SL-DRX On-Duration (in the next SL-DRX cycle).

A UE may become a SyncRef UE, which broadcasts sidelink synchronization messages (e.g., Sidelink Synchronization Sequence block set (SL-SSB set) and SL-MIB/SL-MIB-V2X) continuously.

In some implementations, a UE may stop transmitting sidelink synchronization messages while the UE is staying in SL-DRX off-periods. Then, the UE may transmit sidelink synchronization messages continuously after the UE moves to SL-DRX On-Duration again.

In some implementations, a SyncRef UE may keep broadcasting an SL-SSB set and its associated SL-MIB/SL-MIB-V2X (e.g., through Physical Sidelink Broadcast Channels (PSBCHs)) continuously without being impacted by the transitions between SL-DRX On-Durations and SL-DRX off-periods.

Aspect (5) Sidelink discovery: the UE (e.g., an SL-Tx UE) may stop delivering (LTE/NR) sidelink discovery messages (associated with one or all sidelink unicast/groupcast/broadcast services realized by the UE) while the UE is staying in SL-DRX off-periods (e.g., while all of the SL-Rx UEs associated with the SL-Tx UE are staying in SL-DRX off-periods, so the SL-Tx UE may stay in SL-DRX/sidelink Inactive Time) or while the UE is staying in SL-DRX off periods associated with any combinations of the SL-Rx UEs associated with the SL-Tx UE. Then, the UE may (re)-start to deliver the (LTE/NR) sidelink discovery messages again after the UE wakes up at the beginning of the following SL-DRX On-Duration(s) or (SL-DRX) Active Time.

In some implementations, the (LTE/NR) sidelink discovery messages may include any combination of (Layer-3) sidelink discovery message or (Layer-2) sidelink discovery message associated with (at least) one specific sidelink unicast/group-cast/broadcast service. In some implementations, the UE may decide the SL-DRX Active time/SL-DRX off-periods/SL-DRX Inactive Time associated with a specific sidelink (unicast/group-cast/broadcast) service and so the UE may decide whether to transmit the sidelink discovery messages associated with the specific sidelink unicast/group-cast/broadcast service (only) based on the SL-DRX configuration associated with the specific sidelink unicast/group-cast/broadcast service.

In some implementations, to the SL-Rx UE side, the UE may stop receiving/decoding/monitoring (LTE/NR) sidelink discovery messages (associated with one or all sidelink unicast/groupcast/broadcast services realized by the SL-Rx UE) while the (SL-Rx) UE is staying in SL-DRX off periods (e.g., while all of the SL-Rx UEs associated with the SL-Tx UE are staying in SL-DRX off-periods, so the SL-Rx UE may stay in SL-DRX/sidelink Inactive Time) or while the UE is staying in SL-DRX off periods associated with any combinations of the SL-Tx UEs associated with the SL-Rx UE. Then, the (SL-Rx) UE may (re)-start to deliver the (LTE/NR) sidelink reception messages again after the UE wakes up at the beginning of the following SL-DRX On-Duration(s) or (SL-DRX) Active Time. In some implementations, the (SL-Rx) UE may decide the SL-DRX Active time/SL-DRX off-periods/sidelink Inactive Time associated with a specific sidelink (unicast/group-cast/broadcast) service and so the (SL-Rx) UE may decide whether to receive the sidelink discovery messages associated with the specific sidelink unicast/group-cast/broadcast service (only) based on the SL-DRX configuration associated with the specific sidelink unicast/group-cast/broadcast service.

In some implementations, the sidelink discovery message may be associated with (Layer-2/Layer-3) Relay services (e.g., (Layer-2/Layer-3) Relay discovery messages).

In (LTE/NR) sidelink discovery mechanism, a UE may be configured to transmit/receive sidelink discovery messages. The contents of sidelink discovery messages may include any combination of service types, service ID, source (Layer-2) ID, destination (Layer-2) ID and some control parameters associated with upper layers (e.g., V2X layer or PC5-S protocols). The sidelink discovery messages may be transmitted in specific Physical Sidelink Discovery CHannels (PSDCHs) or in common PSSCHs.

In some implementations (e.g., for some commercial sidelink discovery services), a UE may stop transmitting/receiving sidelink discovery messages while the UE is staying in SL-DRX off-periods. Then, the UE may re-transmit sidelink discovery messages continuously after the UE moves to SL-DRX On-Duration/(SL-DRX) Active Time again.

In some implementations, to the sidelink discovery messages for specific services (e.g., for public safety services), a UE may keep delivering sidelink discovery messages continuously without being impacted by the transitions between SL-DRX On-Durations and SL-DRX off-periods.

In some implementations (e.g., for some commercial sidelink discovery services), a UE may stop monitoring sidelink discovery messages while the UE is staying in SL-DRX off-periods. Then, the UE may start to monitor sidelink discovery messages continuously again after the UE moves to SL-DRX On-Duration.

In some implementations, to the sidelink discovery messages for specific services (e.g., for public safety services), the UE may keep monitoring sidelink discovery messages continuously without being impacted by the transitions between SL-DRX On-Durations and SL-DRX off-periods.

Counters/Timers Related to SL-DRX Mechanisms

In this following disclosure, details of UE behaviors in various situations are provided, including:

1) UE behaviors for triggering the UE to transit from the SL-DRX off-period to the SL-DRX On-Duration;
2) UE behaviors while the UE is staying in the SL-DRX On-Duration(s);
3) UE behaviors for triggering the UE to transit from the SL-DRX On-Duration (or SL-DRX Active Time) to the SL-DRX Off-periods; and
4) UE behaviors while the UE is staying in the DRX Active Time (for Uu interface and/or for PC5 interface).

On the UE side, the RRC sublayer may control SL-DRX operation by configuring the following parameters:

SL-drx-onDurationTimer: the duration at the beginning of an SL-DRX Cycle;

SL-drx-SlotOffset: the delay before starting the SL-drx-onDurationTimer;

SL-drx-InactivityTimer: the duration after the PSCCH occasion in which a PSCCH indicates a new SL transmission/reception for the concerned MAC entity;

drx-RetransmissionTimerSL_Rx (e.g., for each SL-HARQ reception process which UE needs to transmit SL-HARQ feedback information to the associated SL-Tx UE): the maximum duration until an SL retransmission is received;

drx-RetransmissionTimerSL_Tx (e.g., per SL-HARQ transmission process which the UEs needs to re-transmit SL MAC PDU based on the SL-HARQ feedback information replied by at least one SL-Rx UE): the maximum duration until a grant for SL retransmission is received;

SL-drx-LongCycleStartOffset: the Long SL-DRX cycle and drx-StartOffset which defines the subframe where the Long and Short SL-DRX Cycle starts;

SL-drx-ShortCycle (optional): the Short SL-DRX cycle;

SL-drx-ShortCycleTimer (optional): the duration the UE may follow the Short SL-DRX cycle;

drx-HARQ-RTT-TimerSL_Rx (e.g., for each SL-HARQ reception process which the UE needs to transmit SL-HARQ feedback information to the associated SL-Tx UE): the minimum duration before a SL assignment for SL-HARQ reception is expected by the MAC entity;

drx-HARQ-RTT-TimerSL_Tx (e.g., per SL-HARQ transmission process which the UEs needs to re-transmit an SL MAC PDU based on the SL-HARQ feedback information replied by at least one SL-Rx UE): the minimum duration before an SL-HARQ retransmission grant is expected by the MAC entity.

The UE may receive the configured values of these parameters through at least one of: sidelink pre-configuration; dedicated control signaling in a (LTE/NR) Uu interface, such as RRC(Connection)Reconfiguration message; dedicated signaling in a (LTE/NR) PC5 interface, such as PC5-RRC signaling; broadcasting message, such as system information (e.g., (NR/LTE) V2X-specific SIB) in a Uu interface; and SI on-demand procedure in a Uu interface.

In the PC5 interface, when an SL-DRX cycle is configured, the Active Time of PC5 interface includes the time period while:

SL-drx-onDurationTimer, SL-drx-InactivityTimer, drx-RetransmissionTimerSL_Tx, or drx-Retransmission-TimerSL_Rx is running; or an SR for the sidelink dynamic grant request is sent on PUCCH (Uu interface) and is pending; or a PSCCH indicating one (or more than one) new transmission addressed to at least one of the UE's MAC entities associated with the ((Layer-2) sidelink source identity, (Layer-2) sidelink destination identity).

A UE may start to count the SL-drx-onDurationTimer (e.g., after SL-drx-SlotOffset from the beginning of the subframe) while the UE wakes up at the beginning of SL-DRX On-Duration.

A UE may stop counting the SL-drx-onDurationTimer if a DRX command MAC CE (or an SL-DRX Command) or a Long DRX Command MAC CE (or an SL-Long DRX Command MAC CE) is received from the serving cell.

In some implementations, a UE may receive the DRX Command MAC CE/SL-DRX Command from the serving RAN through (LTE/NR) Uu interface. In some implementations, the UE may receive the DRX Command MAC CE/SL-DRX Command from other UEs (e.g., platoon leader or a sidelink scheduler) through (LTE/NR) PC5 interface. In some implementations, the SL-DRX Command or SL-Long DRX Command in the (LTE/NR) PC5 interface may be included in one (or more than one) PC5-RRC signaling or SCI(s) between UEs.

A UE may start SL-drx-onDurationTimer after SL-drx-SlotOffset from the beginning of the subframe if the Long SL-DRX Cycle is used, and [(SFN×10)+subframe number] modulo (SL-drx-LongCycle)=SL-drx-StartOffset in the associated (LTE/NR) PC5 interface. Note that the subframe number may be associated the subframe number that the UE obtained from the serving RAN through the (LTE/NR) Uu interface or may be associated with the subframe number that the UE obtained from other UEs through the (LTE/NR) PC5 interface.

If the MAC entity is in PC5 Active Time (also referred to as SL-DRX Active Time in this disclosure), the UE may monitor the PSCCH continuously for one (or more than one) sidelink frequency carrier. After that, if a monitored PSCCH indicates a new sidelink packet transmission (or indicates sidelink control signaling) to the UE or the UE transmits SCI on a PSCCH, the UE may start or restart SL-drx-InactivityTimer in the first symbol after the end of the associated PSCCH.

In some implementations, a UE may:

1> if SL-drx-InactivityTimer expires or a DRX Command MAC CE (or an SL-DRX Command) is received:

2> if the Short SL-DRX cycle is configured:

3> start or restart SL-drx-ShortCycleTimer in the first symbol after the expiry of SL-drx-Inactivity- Timer or in the first symbol after the end of DRX Command MAC CE (or an SL-DRX Command) reception;

3> use the Short SL-DRX Cycle (note: and the UE may transit to the SL-DRX off-period from the SL-DRX On-Duration or SL-DRX Active Time).

2> else:

3> use the Long SL-DRX cycle (note: and the UE may transit to the SL-DRX off-period from the SL-DRX On-Duration or SL-DRX Active Time).

A UE may stop counting SL-drx-InactivityTimer if a DRX command MAC CE (or an SL-DRX Command) or a Long DRX Command MAC CE (or an SL-Long DRX Command MAC CE) is received from the serving cell.

In some implementations, the UE may receive the DRX Command MAC CE/SL-DRX Command from the serving RAN through the (LTE/NR) Uu interface. In some implementations, the UE may receive the DRX Command MAC CE/SL-DRX Command from other UEs (e.g., a platoon leader or a sidelink scheduler) through the (LTE/NR) PC5 interface. In some implementations, the SL-DRX Command or SL-Long DRX Command in the (LTE/NR) PC5 interface may be included in one (or more than one) PC5-RRC signaling between UEs.

In some implementations, the UE may, if the MAC entity is in (SL-DRX) Active Time, 2> monitor the PSCCH continuously on one (or more than one) sidelink frequency carriers;

2> if a received PSCCH indicates an SL transmission:

3> start the drx-HARQ-RTT-TimerSL_Rx for the corresponding SL-HARQ process in the first symbol after the end of the corresponding UE transmission carrying the SL-HARQ feedback (note that in some implementations, the UE may not start the drx-HARQ-RTT-TimerSL_Rx if the UE is not configured to transmit SL-HARQ feedback to the corresponding sideink destination identity);

3> stop the drx-RetransmissionTimerSL_Rx for the corresponding SL-HARQ process.

In some implementations, when an SL-DRX is configured, the MAC entity of the UE may:

1> if a sidelink MAC PDU associated with the UE's associated sidelink source identity and/or interested sidelink destination identity is received in a configured sidelink assignment:

2> start the drx-HARQ-RTT-TimerSL_Rx for the corresponding sidelink HARQ process in the first symbol after the end of the corresponding transmission carrying the SL-HARQ feedback (e.g., if the UE is configured to transmit SL-HARQ feedback information on the corresponding sidelink HARQ process associated with corresponding destination identity);

2> stop the drx-RetransmissionTimerSL_Rx for the corresponding sidelink HARQ process.

In some implementations, when an SL-DRX is configured, the MAC entity of the UE may:

1> if the drx-HARQ-RTT-TimerSL_Rx expires and if the data of the corresponding SL-HARQ process was not successfully decoded:

3> start the drx-RetransmissionTimerSL_Rx for the corresponding SL-HARQ process in the first symbol after the expiry of drx-HARQ-RTT-TimerSL_Rx.

In some implementations, the UE may, if a sidelink MAC PDU is transmitted in a configured sidelink grant:

2> start the drx-HARQ-RTT-TimerSL_Tx for the corresponding SL-HARQ process in the first symbol after the end of the transmission (or first repetition) of the corresponding PSSCH transmission.

2> stop the drx-RetransmissionTimerSL_Tx for the corresponding sidelink HARQ process.

In some implementations, the UE may, if a drx-HARQ-RTT-TimerSL_Tx expires:

2> start the drx-RetransmissionTimerSL_Tx for the corresponding SL-HARQ process in the first symbol after the expiry of drx-HARQ-RTT-TimerSL_Tx.

In some implementations, the UE may, if the MAC entity is in (PC5) Active Time and if the UE transmits SCI, which indicates an SL transmission, on a PSCCH:

3> start the drx-HARQ-RTT-TimerSL_Tx for the corresponding SL-HARQ process in the first symbol after the end of the first repetition of the corresponding PSSCH transmission; and 3> stop the drx-RetransmissionTimerSL_Tx for the corresponding SL-HARQ process.

In some implementations, a UE staying in SL-DRX On-Duration may:

1> if SL-drx-InactivityTimer expires or a DRX Command MAC CE (or an SL-DRX Command) is received:

2> if the Short SL-DRX cycle is configured:

3> start or restart SL-drx-ShortCycleTimer in the first symbol after the expiry of SL-drx-Inactivity-Timer or in the first symbol after the end of DRX Command MAC CE (or an SL-DRX Command) reception;

3> use the Short SL-DRX cycle (note: and the UE may move to the SL-DRX off-period).

2> else:

3> use the Long SL-DRX cycle (note: and the UE may move to the SL-DRX off-period).

1> if SL-drx-ShortCycleTimer expires:

2> use the Long SL-DRX cycle (note: and the UE may be still in the SL-DRX off-period).

1> if a Long SL-DRX Command (a Long DRX Command MAC CE) is received:

2> stop SL-drx-ShortCycleTimer;

2> use the Long SL-DRX cycle (note: and the UE may move to the SL-DRX off-period).

In some implementations, a UE staying in SL-DRX off-period may:

1> if the Short SL-DRX Cycle is used, and [(SFN×10)+ subframe number] modulo (SL-drx-ShortCycle)=(SL-drx-StartOffset) modulo (SL-drx-ShortCycle); or 1> if the Long SL-DRX Cycle is used, and [(SFN×10)+ subframe number] modulo (SL-drx-LongCycle)=SL-drx-StartOffset:

2> start SL-drx-onDurationTimer after SL-drx-Slot-Offset from the beginning of the subframe (note: and the UE may move to SL-DRX On-Duration).

In some implementations, the UE may wake up in the (LTE/NR) PC5 interface and (LTE/NR) Uu interface simultaneously (e.g., the UE may follow the C-DRX mechanism to decide whether to wake up in both the Uu interface and PC5 interface). In some implementations, the UE may keep the (LTE/NR) PC5 interface in Active Time during the Active Time in the associated (LTE/NR) Uu interface (e.g., drx-onDurationTimer, drx-InactivityTimer, drx-Retransmis-sionTimerDL, or drx-RetransmissionTimerUL is running in the associated Uu interface).

In some implementations, the UE may start SL-drx-onDurationTimer when drx-onDurationTimer is started or start drx-onDuration Timer when SL-drx-onDurationTimer is started.

In some implementations, the UE may start SL-drx-InactivityTimer when drx-InactivityTimer is started or start drx-InactivityTimer when SL-drx-InactivityTimer is started.

In some implementations, the UE may transit to C-DRX off-period and SL-DRX off-period in the PC5 interface and Uu interface simultaneously (e.g., the UE may follow the C-DRX mechanism to decide whether to transit to C-DRX/SL-DRX off-period in both the Uu interface and PC5 interface).

According to the above descriptions, details about the UE behaviors to implement SL-DRX mechanism are provided. It is noted that in some implementations, the UE may transmit an indicator to the serving cell (e.g., through UEAssistanceInformation transmission or through UE Capability Enquiry procedure through the (LTE/NR) Uu interface) to indicate whether the UE supports the SL-DRX mechanism or not. In some implementations, whether the UE supports the SL-DRX mechanism may be set as default. In addition, the UE capability of SL-DRX support may be stored in the UE AS (Inactive) Context on the UE side and the RAN side, respectively. In the UE mobility events (e.g., (inter-RAT/intra-RAT) handover procedure, MCG/SCG add/change, RAN Notification Area Update), the UE capability of SL-DRX support may be transmitted through inter-node message (e.g., through an Xn interface or X2 interface) as part of UE AS (Inactive) Context. In some implementations, the UE may also report its capability of SL-DRX support to other UE(s) through the PC5 interface (e.g., PC5-RRC signaling).

Sidelink Discontinuous Reception (SL-DRX)

The MAC entity may be configured by RRC with an SL-DRX functionality that controls the UE's sidelink packet reception (e.g., PSCCH monitoring) activities and/or the UE's sidelink packet transmission (e.g., PSSCH transmission) activities.

If the SL-DRX is configured, for all the associated side-link (unicast and/or group-cast and/or broadcast) groups, the MAC entity may monitor the PSCCH discontinuously using the SL-DRX operation specified in the above descriptions. Otherwise, the MAC entity may monitor the PSCCH for sidelink packet reception.

If SL-DRX is configured, for all the associated sidelink (unicast and/or group-cast and/or broadcast) groups, the MAC entity may transmit SCI on the configured PSCCH(s) discontinuously using the SL-DRX operation specified in the above descriptions.

The RRC may control SL-DRX operation by configuring the following parameters:

SL-drx-onDurationTimer: the duration at the beginning of an SL-DRX Cycle;

SL-drx-SlotOffset: the delay before starting the SL-drx-onDurationTimer;

SL-drx-InactivityTimer: the duration after the PSCCH occasion in which a PSCCH indicates a new SL transmission/reception for the concerned MAC entity;

drx-RetransmissionTimerSL_Rx　(e.g.,　for　each SL-HARQ reception process which the UE needs to transmit SL-HARQ feedback information to the associated SL-Tx UE): the maximum duration until a SL retransmission is received;

drx-RetransmissionTimerSL_Tx (e.g., per SL-HARQ transmission process which the UE needs to re-transmit SL MAC PDU based on the SL-HARQ feedback information replied by at least one SL-Rx UE): the maximum duration until a grant for SL retransmission is received;

SL-drx-LongCycleStartOffset: the Long SL-DRX cycle and drx-StartOffset which defines the subframe where the Long and Short SL-DRX cycle starts;

SL-drx-ShortCycle (optional): the Short SL-DRX cycle;

SL-drx-ShortCycleTimer (optional): the duration the UE may follow the Short SL-DRX cycle;

drx-HARQ-RTT-TimerSL_Rx (e.g., for each SL-HARQ reception process which UE needs to transmit SL-HARQ feedback information to the associated SL-Tx UE): the minimum duration before an SL assignment for SL-HARQ reception is expected by the MAC entity;

drx-HARQ-RTT-TimerSL_Tx (e.g., per SL-HARQ transmission process which the UE needs to re-transmit SL MAC PDU based on the SL-HARQ feedback information replied by at least one SL-Rx UE): the minimum duration before an SL-HARQ retransmission grant is expected by the MAC entity.

When an SL-DRX cycle is configured, the Active Time (in the PC5 interface) includes the time period while:

SL-drx-onDurationTimer, SL-drx-InactivityTimer, drx-RetransmissionTimerSL_Tx, or drx-Retransmission-TimerSL_Rx is running; or an SR for the of sidelink dynamic grant request is sent on PUCCH (Uu interface) and is pending; or a PSCCH indicating one (or more than one) new transmission addressed to at least one of the UE's MAC entities associated with the sidelink source identity and/or interested sidelink destination identity.

When SL-DRX is configured, the MAC entity may perform the following:

1> if a Sidelink MAC PDU is received in a configured sidelink assignment:

2> start the drx-HARQ-RTT-TimerSL_Rx for the corresponding sidelink HARQ process in the first symbol after the end of the corresponding transmission carrying the SL-HARQ feedback (e.g., if the UE is configured to transmit SL-HARQ feedback information on the corresponding sidelink HARQ process associated with corresponding destination identity);

2> stop the drx-RetransmissionTimerSL_Rx for the corresponding sidelink HARQ process.

1> if a sidelink MAC PDU is transmitted in a configured sidelink grant:

2> start the drx-HARQ-RTT-TimerSL_Tx for the corresponding SL-HARQ process in the first symbol after the end of the transmission (or the first repetition) of the corresponding PSSCH transmission;

2> stop the drx-RetransmissionTimerSL_Tx for the corresponding SL-HARQ process.

1> if a drx-HARQ-RTT-TimerSL_Rx expires:

2> if the data of the corresponding SL-HARQ process was not successfully decoded:

3> start the drx-RetransmissionTimerSL_Rx for the corresponding SL-HARQ process in the first symbol after the expiry of drx-HARQ-RTT-TimerSL_Rx.

1> if a drx-HARQ-RTT-TimerSL_Tx expires:

2> start the drx-RetransmissionTimerSL_Tx for the corresponding SL-HARQ process in the first symbol after the expiry of drx-HARQ-RTT-TimerSL_Tx.

1> if a DRX command MAC CE (or an SL-DRX Command) or a Long DRX Command MAC CE (or an SL-Long DRX Command MAC CE) is received from the serving cell (through the Uu interface) or from other UEs (through the PC5 interface):

2> stop SL-drx-onDurationTimer;

2> stop SL-drx-InactivityTimer.

1> if SL-drx-InactivityTimer expires or a DRX Command MAC CE (or an SL-DRX Command) is received:

2> if the Short SL-DRX cycle is configured:

3> start or restart SL-drx-ShortCycleTimer in the first symbol after the expiry of SL-drx-Inactivity-Timer or in the first symbol after the end of DRX Command MAC CE (or an SL-DRX Command) reception;

3> use the Short SL-DRX cycle.

2> else:

3> use the Long SL-DRX cycle.

1> if SL-drx-ShortCycleTimer expires:

2> use the Long SL-DRX cycle.

1> if a Long SL-DRX Command (a Long DRX Command MAC CE) is received:

2> stop SL-drx-ShortCycleTimer;

2> use the Long SL-DRX cycle.

1> if the Short SL-DRX cycle is used, and [(SFN×10)+ subframe number] modulo (SL-drx-ShortCycle)=(SL-drx-StartOffset) modulo (SL-drx-ShortCycle); or 1> if the Long SL-DRX cycle is used, and [(SFN×10)+ subframe number] modulo (SL-drx-LongCycle)=SL-drx-StartOffset:

2> start SL-drx-onDurationTimer after SL-drx-Slot-Offset from the beginning of the subframe.

1> if the MAC entity is in (PC5) Active Time:

2> monitor the PSCCH (continuously) of one (or more than one) sidelink frequency carrier;

2> if the PSCCH indicates an SL transmission:

3> start the drx-HARQ-RTT-TimerSL_Rx for the corresponding SL-HARQ process in the first symbol after the end of the corresponding transmission carrying the SL-HARQ feedback;

3> stop the drx-RetransmissionTimerSL_Rx for the corresponding SL-HARQ process.

2> if the UE transmits SCI, which indicates an SL transmission, on a PSCCH:

3> start the drx-HARQ-RTT-TimerSL_Tx for the corresponding SL-HARQ process in the first symbol after the end of the transmission (or the first repetition) of the corresponding PSSCH transmission;

3> stop the drx-RetransmissionTimerSL_Tx for the corresponding SL-HARQ process.

2> if the PSCCH indicates a new sidelink packet transmission (or indicates sidelink control signaling) to the UE or the UE transmits SCI on a PSCCH:

3> start or restart SL-drx-InactivityTimer in the first symbol after the end of the associated PSCCH.

In some implementations, the MAC entity need not monitor the PSCCH if it is not a complete PSCCH occasion (e.g., the Active Time starts or ends in the middle of a PSCCH occasion).

Vehicle-to-Everything (V2X) Services and PC5 Interface

V2X service is provided to support the information exchange between vehicles. In LTE protocols, V2X service could be supported in the air interface by Uu interface and PC5 interface. The PC5 interface covers the designs in Layer 2 and Layer 1. The airlink interface on PC5 interface is also called sidelink in LTE protocols. LTE network supports sidelink operations since Rel. 12.

Figure 9:
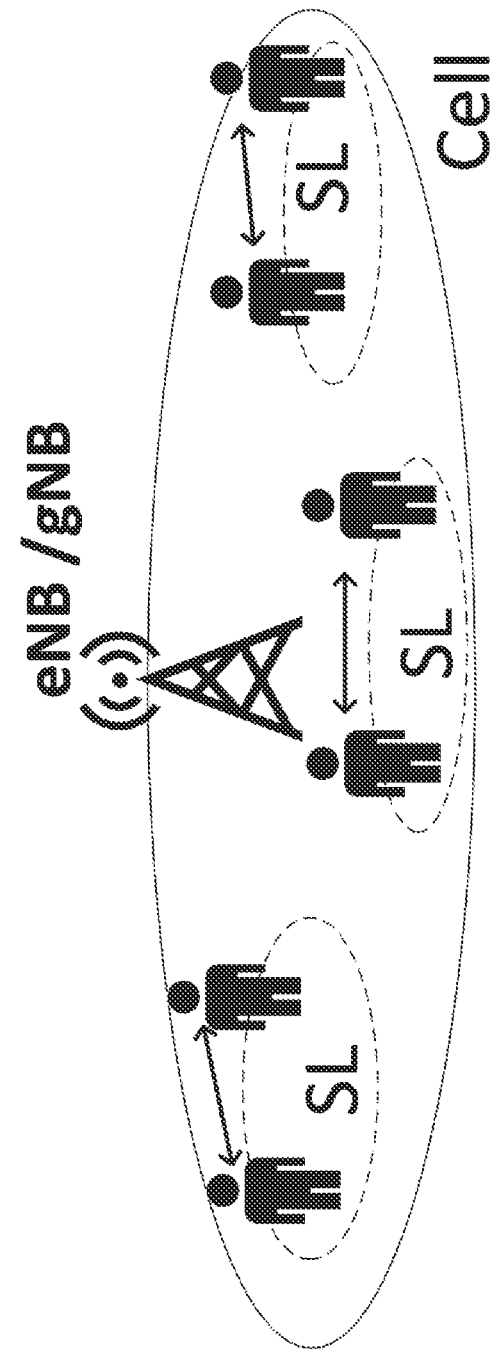
FIG. 9 is a schematic diagram illustrating a sidelink operation according to an example implementation of the present disclosure.

FIG. 9 is a schematic diagram illustrating a sidelink operation according to an example implementation of the present disclosure.

Referring to FIG. 9, with the sidelink operation, UEs can exchange data and control signaling directly without the relaying of the base station (e.g., eNB in LTE network or gNB in NR network). All of the UEs in the disclosure are capable and authorized to access V2X service and the PC5 interface with neighbor UEs and RAN.

The V2X service could be further categorized based on different cast-types, such as unicast, multi-cast and group cast.

For a unicast service, only two UEs are in a sidelink group and the formulation of the sidelink group may be achieved in the Non-Access-Stratum (NAS layer).

For a multi-cast (e.g., groupcast) service, more than two UEs are grouped in a sidelink group to exchange sidelink packets with all other members in the sidelink group. The sidelink groups may be formulated in the NAS layer (e.g., V2X application layer or PC5-S protocols) or AS layer (e.g., Sidelink RRC Layer signaling, PC5-RRC signaling).

For a broadcast service, no limitation is set to the sidelink group. A UE can broadcast message(s) and its neighbor UE(s) under the sidelink communication range can receive and decode the broadcasting message(s) successfully. In some implementations, the sidelink communication range may differ with Tx power, hardware sensitivity, etc.

To enable sidelink operation under the coverage of RANs (e.g., E-UTRAN or NR-RAN), (LTE/NR) cells may provide SL configuration and SL resource allocation to UEs. The UEs under the coverage of cellular networks need to perform sidelink operations based on the configuration of RANs. To enable sidelink operation under the coverage of a RAN, the serving cell (or camped cells) needs to provide SL configuration and SL resource allocation to UEs.

Two basic approaches are provided for SL resource allocation in LTE V2X service.

The first approach is a scheduled resource allocation. In this approach, the UE needs to be in (LTE/NR) RRC connected state for transmitting data. The UE requests SL resources from the eNB (by sending a sidelink buffer status report to the serving cell). The eNB schedules dedicated sidelink resources for the UE to transmit sidelink control information and sidelink data. To achieve this, the eNB may request the UE to report SL-BSR through the Uu interface. In addition, the UE may also trigger an SR on an uplink physical resource (e.g., PUCCH) or initiate a random access procedure while the UE wants to transmit SL-BSR to the eNB but a valid uplink resource is absent. It is noted that the SR resource (or configurations) and the SR procedure are common for both sidelink operations and uplink traffic.

The second approach is a UE autonomous resource selection from SL resource pools. The UE autonomous resource selection can be applied to UEs in RRC Connected state (e.g., through dedicated RRC signaling or through system information broadcasting), and to UEs in RRC inactive/idle state (e.g., through system information broadcasting). A resource pool is a set of (virtually continuous) resource blocks and the UE may decide which physical resource blocks that the UE wants to apply for SL packet transmission autonomously. The UE, on its own, may select resources from resource pools and perform transport format selection to transmit sidelink control information and data. The UE may perform sensing for (re)selection of sidelink resources before SL packet delivery. Based on the sensing results, the UE (re)selects some specific sidelink resources and reserves multiple sidelink resources. Up to two parallel (independent) resource reservation processes are allowed to be performed by the UE. The UE is also allowed to perform a single resource selection for its V2X sidelink transmission.

It is noted that, when a UE is out of coverage on the frequency used for V2X sidelink communication and if the eNB does not provide V2X sidelink configuration for that frequency, the UE may use a set of transmission and reception resource pools pre-configured in the UE. V2X sidelink communication resources may not be shared with other non-V2X data transmitted over sidelink. In some implementations, a UE may obtain the pre-configuration through the installed USIM, stored memory, or through RAN which the UE has been accessed earlier. Moreover, the UE may implement PC5 interface by synchronizing with Global Navigation Satellite System (GNSS) and applying pre-configuration. In this condition, the PC5 interface may be independent with RAN and (LTE/NR) Uu interface.

Figure 10:
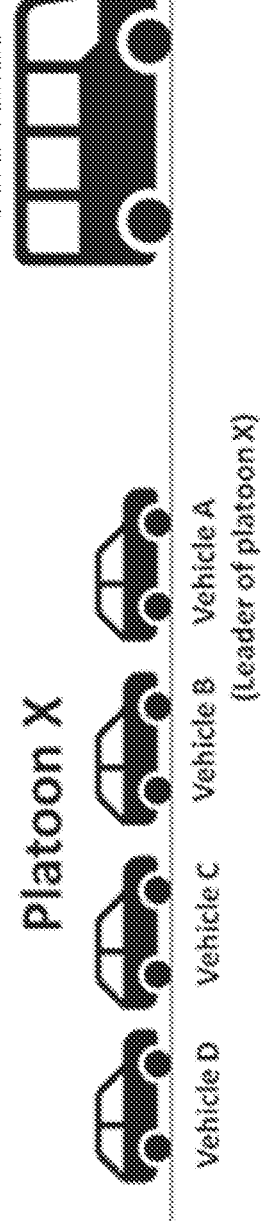
FIG. 10 is a schematic diagram illustrating a platoon scenario according to an example implementation of the present disclosure.

FIG. 10 is a schematic diagram illustrating a platoon scenario according to an example implementation of the present disclosure.

Referring to FIG. 10, the Platoon X is composed of Vehicle A, Vehicle B, Vehicle C, and Vehicle D. There may be at least one scheduler (e.g., Vehicle A) in the platoon X. In Platoon X, Vehicle A may configure sidelink resources to members (e.g., Vehicle B, Vehicle C, and Vehicle D) in the same platoon through various approaches such as Mode 1-like approach and Mode 2-like approach described below.

Mode 1-like approach: the scheduler may configure dynamic sidelink grants to members in the same platoon (e.g., dynamic sidelink grant through sidelink control information). In addition, the scheduler may also configure semi-periodic sidelink grant (e.g., configured sidelink grant) to the UE through sidelink control signaling (e.g., through PSBCH, or sidelink RRC signaling). To achieve the Mode 1-like approach, the scheduler may need UEs to provide feedback information through the PC5 interface.

Mode 2-like approach: the scheduler would configure sidelink resource pools to members in the same platoon. The UEs may select sidelink grant by the UEs themselves automatically (e.g., sidelink grant selection with/without sensing). The platoon scenario may be applied when the vehicles of the platoon are in-coverage (i.e., all of the vehicles in the platoon are under the coverage of a cellular radio access network), out-of-coverage (i.e., all of the vehicles in the platoon are out of the coverage of the cellular radio access network), or partial in-coverage (i.e., some of the UEs in the platoon are under the coverage of the cellular radio access network and the other UEs in the platoon are out of the coverage of the cellular radio access network).

In order to support the scheduler, in some implementations, the members in the Platoon may need to support the following progress to report their own statuses to the scheduler through the PC5 interface:

1) SL-SR configuration and report;
2) SL-BSR configuration and report; and
3) SL-PHR configuration and report.

FIG. 11 is a flowchart illustrating a method of partial sensing under an SL-DRX mechanism according to an example implementation of the present disclosure.

The method described with reference to FIG. 11 is performed by a UE. Several terms, configurations, operations, mechanisms, progress, and conceptions described in the previous descriptions are not repeated when describing the method.

Referring to FIG. 11, in action S1101, the UE may receive one or more first resource pool configurations for one or more sidelink transmission resource pools, where each first resource pool configuration includes a partial sensing indication of whether to perform partial sensing on a corresponding sidelink transmission resource pool in a Sidelink Discontinuous Reception (SL-DRX) inactive time. The SL-DRX inactive time may also be referred to as SL-DRX off-period in the disclosure.

Specifically, the UE in some cases may act as an SL-Tx UE that implements sidelink packet transmission, and it may be configured with a subset of sidelink transmission resource pools composed of one or more sidelink transmission resource pools for the sidelink packet transmission.

In some implementations, the UE implementing sidelink packet transmission may also implement an SL-DRX mechanism. In this case, a set of SL-DRX configurations including the SL-DRX configurations of multiple (other) UEs may be stored in at least one memory of the UE.

Specifically, the stored set of SL-DRX configurations may be associated with one or more Layer-2 Destination IDs each corresponds to a sidelink group (e.g., uni-cast, multi-cast, or broadcast group sidelink group).

For example, the (SL-Tx) UE may be in a first sidelink group with at least one first neighboring UE and a second sidelink group with at least one second neighboring UE, and the SL-DRX configurations of the at least one first neighboring UE and the at least one second neighboring UE may all be stored in the (SL-Tx) UE. In addition, the SL-DRX configuration(s) of the at least one first neighboring UE may be associated with a first Layer-2 Destination ID, and the SL-DRX configuration(s) of the at least one second neighboring UE may be associated with a second Layer-2 Destination ID.

In some implementations, whether the (SL-Tx) UE is in an SL-DRX inactive time may be associated with the set of SL-DRX configurations stored in the UE.

Specifically, the UE may determine whether it is in the SL-DRX inactive time based on one or more activated SL-DRX configurations in the set of SL-DRX configurations stored in the UE, where the one or more activated SL-DRX configurations may be associated with a Layer-2 Destination ID.

For example, the set of SL-DRX configurations stored in the UE may include the SL-DRX configuration(s) of the at least one first neighboring UE associated with the first Layer-2 Destination ID and the SL-DRX configuration(s) of the at least one second neighboring UE associated with the second Layer-2 Destination ID, and only the SL-DRX configuration(s) associated with the first Layer-2 Destination ID is currently activated. In this case, the UE may determine whether it is in the SL-DRX inactive time based on the currently activated SL-DRX configuration(s) associated with the first Layer-2 Destination ID.

For example, based on the currently activated SL-DRX configuration(s) associated with the first Layer-2 Destination ID in the memory, the (SL-Tx) UE may determine whether the corresponding at least one first neighboring UE is awake (e.g., monitoring a physical sidelink channel). In a case that the corresponding at least one first neighboring UE is awake, the (SL-Tx) UE may decide that it is not in the SL-DRX inactive time (e.g., decided by one or multiple SL-DRX off-periods). In a case that no first neighboring UE is awake, the (SL-Tx) UE may decide that it is in the SL-DRX inactive time.

In some implementations, in the action S1101, the (SL-Tx) UE may receive one or more first resource pool configurations corresponding to the configured one or more sidelink transmission resource pools, and each of the one or more first resource pool configurations may include an indication of whether to perform partial sensing on a corresponding sidelink transmission resource pool in the SL-DRX inactive time. For example, a first partial sensing indication corresponding to a first sidelink transmission resource pool may indicate "performing the partial sensing (on the first sidelink transmission resource pool) in the SL-DRX inactive time", while a second partial sensing indication corresponding to a second sidelink transmission resource pool may indicate "not performing the partial sensing (on the second sidelink transmission resource pool) in the SL-DRX inactive time".

It is noted that each of the configured sidelink transmission resource pools may be a sidelink normal transmission resource pool or a sidelink exceptional transmission resource pool. The difference between the sidelink normal transmission resource pool and the sidelink exceptional resource pool has been described in the previous descriptions, and therefore is not repeated herein.

It is also noted that the partial sensing mechanism has been described in the previous descriptions, and therefore is not repeated herein.

In some implementations, when performing the partial sensing on a sidelink transmission resource pool, the (SL-Tx) UE may, for example, performing sidelink packet reception of Physical Sidelink Control Channels (PSCCHs) and Sidelink Reference Signal Received Power (SL-RSRP) measurement associated with the sidelink transmission resource pool on which the partial sensing is performed.

In some implementations, each of the one or more first resource pool configurations may be received from a first source. The first source may be at least one of an SL pre-configuration, an SL configuration from a first serving cell through a first Uu interface via broadcasting system information or UE-specific dedicated control signaling, and an SL configuration from another UE via a PC5 air interface through Radio Resource Control (RRC) signaling. The first serving cell may be, for example, an E-UTRA cell or an NR cell. In a case that the first serving cell is an E-UTRA cell, the first Uu interface is an E-UTRA Uu interface; in a case that the first serving cell is an NR cell, the first Uu interface is an NR Uu interface.

In some implementations, the set of SL-DRX configurations may be received from a second source before being stored in the UE. The second source may be at least one of an SL pre-configuration, an SL configuration from a second serving cell through a second Uu interface via broadcasting system information or UE-specific dedicated control signaling, and an SL configuration from another UE via a PC5 air interface through Radio Resource Control (RRC) signaling. The second serving cell may be, for example, an E-UTRA cell or an NR cell. In a case that the second serving cell is the E-UTRA cell, the second Uu interface is an E-UTRA Uu interface; in a case that the second serving cell is an NR cell, the second Uu interface is an NR Uu interface. It is noted that the first serving cell and the second serving cell are independent. In other words, the above-mentioned first serving cell and the above-mentioned second serving cell can indicate to a same serving cell or to different serving cells.

It should be noted that the first source and the second source are independent. Specifically, the first source from which the one or more first resource pool configurations are received and the second source from which the set of SL-DRX configurations are received are not related to each other. In some implementations, the first source and the second source are the same. In some implementations, the first source and the second source are different.

Referring to FIG. 11, once the one or more first resource pool configurations are received, in action S1103, the UE may perform the partial sensing based on the one or more partial sensing indications in the one or more first resource pool configurations while the UE is implementing sidelink packet transmission (e.g., with the neighboring UE(s) corresponding to the activated SL-DRX configuration(s)).

Specifically, the one or more partial sensing indications are used to configure the partial sensing operations on the configured subset of sidelink transmission resource pools (e.g., configured one or more sidelink transmission resource pools) in an SL-DRX inactive time. Accordingly, based on the one or more partial sensing indications, the UE may perform partial sensing on the sidelink transmission resource pool(s) that corresponds to the partial sensing indication(s) of "performing partial sensing in the SL-DRX inactive time" in the SL-DRX inactive time decided, and not perform partial sensing on the sidelink transmission resource pool(s) that corresponds to the partial sensing indication(s) of "not performing partial sensing in the SL-DRX inactive time" in the SL-DRX inactive time decided.

In some implementation, a resource pool configuration absent of the partial sensing indication may be considered by a UE to be an indication to perform partial sensing in the SL-DRX inactive time. Specifically, the partial sensing on a specific sidelink transmission resource pool in the SL-DRX inactive time may be (re)started by a reception of a specific resource pool configuration which corresponds to the specific sidelink transmission resource pool and is absent of the partial sensing indication.

Taking the process illustrated in FIG. 11 as an example, the UE may receive a specific first resource pool configuration for a specific sidelink transmission resource pool (e.g., action S1101), in which the partial sensing indication indicates "not performing partial sensing in the SL-DRX inactive time". Based on the received specific first resource pool configuration, the UE may not perform partial sensing on the specific sidelink transmission resource pool in the SL-DRX inactive time (e.g., action S1103).

After that, the UE may receive another resource pool configuration (i.e., a second resource pool configuration) for the specific sidelink transmission resource pool, and the received second resource pool configuration is absent of the partial sensing indication. Upon the reception of the second resource pool configuration absent of the partial sensing indication, the UE may restart performing partial sensing on the specific sidelink transmission resource pool in the SL-DRX inactive time.

However, the partial sensing configuration (e.g., in the SL-DRX inactive time) of the resource pool configuration absent of the partial sensing indication is not limited in the disclosure. In some other implementations, a resource pool configuration absent of the partial sensing indication may be considered by a UE to be an indication to not perform partial sensing in the SL-DRX inactive time.

Figure 12:
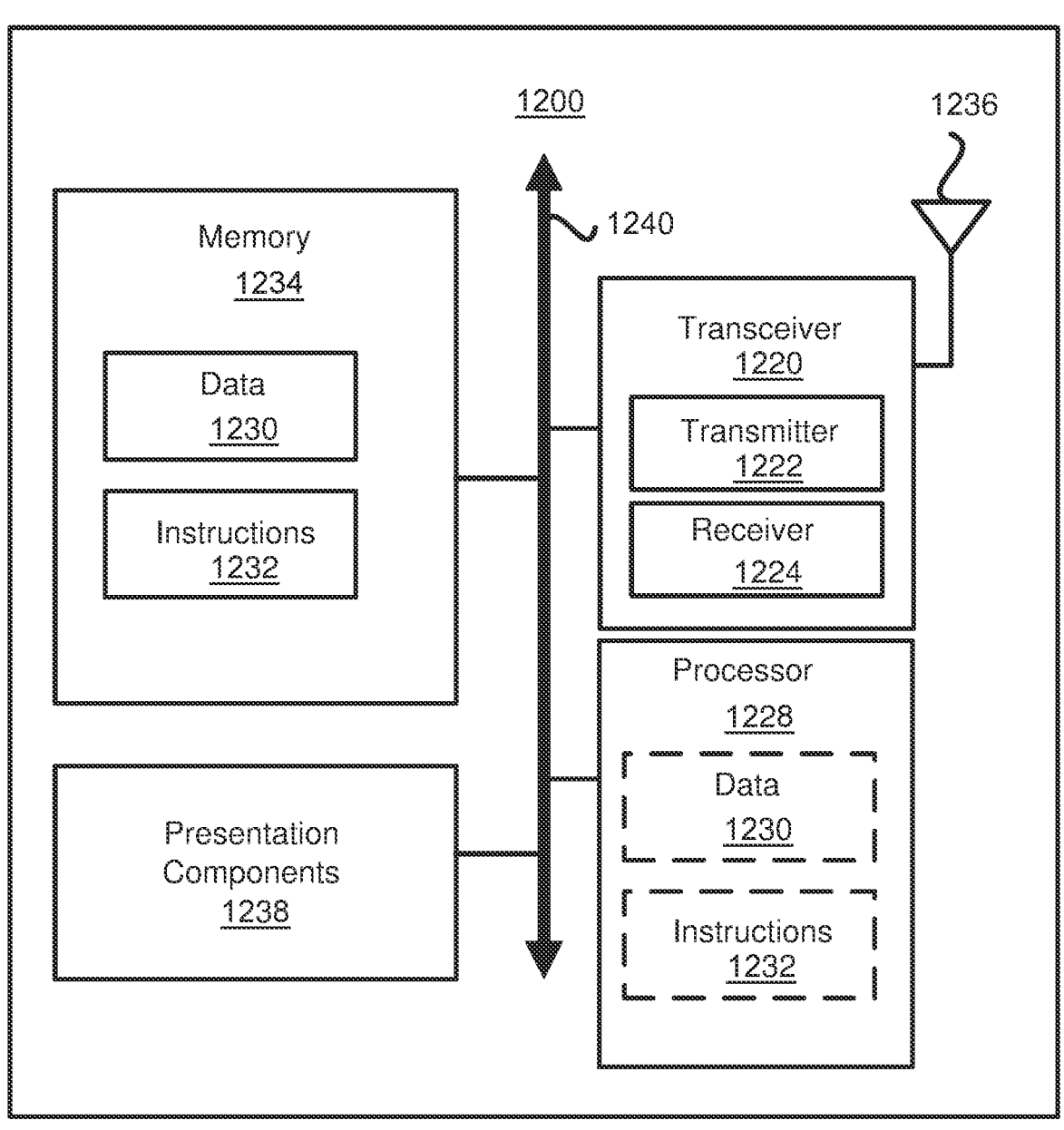
FIG. 12 is a block diagram illustrating a node for wireless communication according to an example implementation of the present disclosure.

FIG. 12 is a block diagram illustrating a node for wireless communication according to an example implementation of the present disclosure. As illustrated in FIG. 12, the node 1200 may include a transceiver 1220, a processor 1228, a memory 1234, one or more presentation components 1238, and at least one antenna 1236. The node 1200 may also include an RF spectrum band module, a BS communications module, a network communications module, and a system communications management module, Input/Output (I/O) ports, I/O components, and a power supply (not explicitly illustrated in FIG. 12). Each of these components may be in communication with each other, directly or indirectly, over one or more buses 1240. In some implementations, the node 1200 may be a UE or a BS that performs various functions described herein, for example, with reference to FIGS. 1 through 11.

The transceiver 1220 having a transmitter 1222 (e.g., transmitting/transmission circuitry) and a receiver 1224 (e.g., receiving/reception circuitry) may be configured to transmit and/or receive time and/or frequency resource partitioning information. In some implementations, the transceiver 1220 may be configured to transmit in different types of subframes and slots, including, but not limited to, usable, non-usable and flexibly usable subframes and slot formats. The transceiver 1220 may be configured to receive data and control channels.

The node 1200 may include a variety of computer-readable media. Computer-readable media can be any available media that can be accessed by the node 1200 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 1234 may include computer storage media in the form of volatile and/or non-volatile memory. The memory 1234 may be removable, non-removable, or a combination thereof. For example, the memory 1234 may include solid-state memory, hard drives, optical-disc drives, etc. As illustrated in FIG. 12, the memory 1234 may store computer-readable and/or computer-executable instructions 1232 (e.g., software code(s) or computer-executable program(s)) that are configured to, when executed, cause the processor 1228 to perform various functions described herein, for example, with reference to FIGS. 1 through 11. Alternatively, the instructions 1232 may not be directly executable by the processor 1228 but may be configured to cause the node 1200 (e.g., when compiled and executed) to perform various functions described herein.

The processor 1228 (e.g., having processing circuitry) may include an intelligent hardware device, a Central Processing Unit (CPU), a microcontroller, an ASIC, etc. The processor 1228 may include memory. The processor 1228 may process the data 1230 and the instructions 1232 received from the memory 1234, and information through the transceiver 1220, the baseband communications module, and/or the network communications module. The processor 1228 may also process information to be sent to the transceiver 1220 for transmission through the antenna 1236, to the network communications module for transmission to a CN.

One or more presentation components 1238 may present data indications to a person or other devices. Examples of presentation components 1238 may include a display device, speaker, printing component, vibrating component, etc.

According to the above disclosure, partial sensing operations and configurations for a UE implementing an SL-DRX mechanism may be achieved by adopting the methods introduced in the disclosure. In this way, full sensing is not the only option for the UE implementing the SL-DRX mechanism and as such the power saving may be enhanced.

From the present disclosure, it is manifested that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method performed by a User Equipment (UE), the method comprising:

receiving one or more first resource pool configurations for one or more sidelink transmission resource pools, each first resource pool configuration comprising a partial sensing indication of whether to perform a partial sensing procedure on a corresponding sidelink transmission resource pool during a Sidelink Discontinuous Reception (SL-DRX) inactive time, the SL-DRX inactive time being determined based on a set of SL-DRX configurations stored in the UE; and performing, based on the partial sensing indication of each first resource pool configuration, the partial sensing procedure on the corresponding sidelink transmission resource pool while the UE is performing a sidelink packet transmission.

2. The method of claim 1, wherein performing, based on the partial sensing indication of each first resource pool configuration, the partial sensing procedure on the corresponding sidelink transmission resource pool comprises:

during the SL-DRX inactive time, not performing the partial sensing procedure on the sidelink transmission resource pool that corresponds to the partial sensing indication of not performing the partial sensing procedure during the SL-DRX inactive time.

3. The method of claim 2, wherein performing, based on the partial sensing indication of each first resource pool configuration, the partial sensing procedure on the corresponding sidelink transmission resource pool further comprises:

during the SL-DRX inactive time, performing the partial sensing procedure on the sidelink transmission resource pool that corresponds to the partial sensing indication of performing the partial sensing procedure during the SL-DRX inactive time.

4. The method of claim 1, wherein performing, based on the partial sensing indication of each first resource pool configuration, the partial sensing procedure on the corresponding sidelink transmission resource pool comprises performing sidelink packet reception of Physical Sidelink Control Channels (PSCCHs) and Sidelink Reference Signal Received Power (SL-RSRP) measurement associated with the corresponding sidelink transmission resource pool.

5. The method of claim 1, wherein each sidelink transmission resource pool is a sidelink normal transmission resource pool or a sidelink exceptional transmission resource pool.

6. The method of claim 1, further comprising:

receiving a second resource pool configuration for a specific sidelink transmission resource pool of the one or more sidelink transmission resource pools after receiving the one or more first resource pool configurations; and in a case that the second resource pool configuration does not include the partial sensing indication and the specific sidelink transmission resource pool corresponds to the first resource pool configuration comprising the partial sensing indication of not performing the partial sensing procedure, restarting to perform the partial sensing procedure on the specific sidelink transmission resource pool during the SL-DRX inactive time.

7. The method of claim 1, further comprising:

determining whether the UE is in the SL-DRX inactive time based on one or more activated SL-DRX configurations in the set of SL-DRX configurations, wherein the one or more activated SL-DRX configurations in the set of SL-DRX configurations are associated with a Layer-2 Destination ID (identifier) stored in the UE.

8. The method of claim 1, wherein:

each first resource pool configuration is received from a first source associated with at least one of:

an SL pre-configuration, an SL configuration from a first serving cell through a first Uu interface via broadcasting system information or UE-specific dedicated control signaling, or an SL configuration from another UE via a PC5 air interface through Radio Resource Control (RRC) signaling, the method further comprises receiving the set of SL-DRX configurations from a second source associated with at least one of:

the SL pre-configuration, the SL configuration from a second serving cell through a second Uu interface via broadcasting system information or UE-specific dedicated control signaling, or the SL configuration from another UE via the PC5 air interface through RRC signaling, and the first source and the second source are independent.

9. The method of claim 8, wherein the first serving cell is an Evolved Universal Terrestrial Radio Access (E-UTRA) cell or a New Radio (NR) cell, the second serving cell is an E-UTRA cell or an NR cell, the first Uu interface is an E-UTRA Uu interface or an NR Uu interface, and the second Uu interface is an E-UTRA Uu interface or an NR Uu interface, wherein the first serving cell and the second serving cell are independent.

10. A User Equipment (UE), comprising:

one or more non-transitory computer-readable media storing one or more computer-executable instructions; and at least one processor coupled to the one or more non-transitory computer-readable media, and configured to execute the one or more computer-executable instructions to cause the UE to:

receive, using the transceiver, one or more first resource pool configurations for one or more sidelink transmission resource pools, each first resource pool configuration comprising a partial sensing indication of whether to perform a partial sensing procedure on a corresponding sidelink transmission resource pool during a Sidelink Discontinuous Reception (SL-DRX) inactive time, the SL-DRX inactive time being determined based on a set of SL-DRX configurations stored in the memory; and perform, based on the partial sensing indication of each first resource pool configuration, the partial sensing procedure on the corresponding sidelink transmission resource pool while the UE is performing a sidelink packet transmission.

11. The UE of claim 10, wherein the UE performing, based on the partial sensing indication of each first resource pool configuration, the partial sensing procedure on the corresponding sidelink transmission resource pool comprises:

during the SL-DRX inactive time, not performing partial sensing procedure on the sidelink transmission resource pool that corresponds to the partial sensing indication of not performing partial sensing procedure in the SL-DRX inactive time.

12. The UE of claim 11, wherein the UE performing, based on the partial sensing indication of each first resource pool configuration, the partial sensing procedure on the corresponding sidelink transmission resource pool further comprises:

during the SL-DRX inactive time, performing the partial sensing procedure on the sidelink transmission resource pool that corresponds to the partial sensing indication of performing the partial sensing procedure during the SL-DRX inactive time.

13. The UE of claim 10, wherein the UE performing, based on the partial sensing indication of each first resource pool configuration, the partial sensing procedure on the corresponding sidelink transmission resource pool comprises performing sidelink packet reception of Physical Sidelink Control Channels (PSCCHs) and Sidelink Reference Signal Received Power (SL-RSRP) measurement associated with the corresponding sidelink transmission resource pool.

14. The UE of claim 10, wherein each sidelink transmission resource pool is a sidelink normal transmission resource pool or a sidelink exceptional transmission resource pool.

15. The UE of claim 10, wherein the one or more computer-executable instructions, when executed by the at least one processor, further cause the UE to:

receive, using the transceiver, a second resource pool configuration for a specific sidelink transmission resource pool of the one or more sidelink transmission resource pools after receiving the one or more first resource pool configurations; and in a case that the second resource pool configuration does not include the partial sensing indication and the specific sidelink transmission resource pool corresponds to the first resource pool configuration comprising the partial sensing indication of not performing the partial sensing procedure, restart to perform the partial sensing procedure on the specific sidelink transmission resource pool during the SL-DRX inactive time.

16. The UE of claim 10, wherein the one or more computer-executable instructions, when executed by the at least one processor, further cause the UE to:

determine whether the UE is in the SL-DRX inactive time based on one or more activated SL-DRX configurations in the set of SL-DRX configurations stored in the memory, wherein the one or more activated SL-DRX configurations in the set of SL-DRX configurations are associated with one a Layer-2 Destination ID (identifier) stored in the memory.

17. The UE of claim 10, wherein:

each first resource pool configuration is received from a first source associated with at least one of:

an SL pre-configuration, an SL configuration from a first serving cell through a first Uu interface via broadcasting system information or UE-specific dedicated control signaling, or an SL configuration from another UE via a PC5 air interface through Radio Resource Control (RRC) signaling, the computer-executable instructions, when executed by the processing circuitry, further cause the UE to receive the set of SL-DRX configurations from a second source associated with at least one of:

the SL pre-configuration, the SL configuration from a second serving cell through a second Uu interface via broadcasting system information or UE-specific dedicated control signaling, or the SL configuration from another UE via the PC5 air interface through RRC signaling, and the first source and the second source are independent.

18. The UE of claim 17, wherein the first serving cell is an Evolved Universal Terrestrial Radio Access (E-UTRA) cell or a New Radio (NR) cell, the second serving cell is an E-UTRA cell or an NR cell, the first Uu interface is an E-UTRA Uu interface or an NR Uu interface, and the second Uu interface is an E-UTRA Uu interface or an NR Uu interface, wherein the first serving cell and the second serving cell are independent.

* * * * *